United States Patent
Oka et al.

(10) Patent No.: US 12,548,972 B2
(45) Date of Patent: Feb. 10, 2026

(54) LIGHT SOURCE MODULE, DISTANCE-MEASURING APPARATUS, AND MOBILE OBJECT

(71) Applicants: Yuuki Oka, Miyagi (JP); Kazuma Izumiya, Miyagi (JP); Takumi Satoh, Miyagi (JP)

(72) Inventors: Yuuki Oka, Miyagi (JP); Kazuma Izumiya, Miyagi (JP); Takumi Satoh, Miyagi (JP)

(73) Assignee: RICOH COMPANY, LTD., Tokyo (JP)

( * ) Notice: Subject to any disclaimer, the term of this patent is extended or adjusted under 35 U.S.C. 154(b) by 985 days.

(21) Appl. No.: 17/687,680

(22) Filed: Mar. 7, 2022

(65) Prior Publication Data

US 2022/0299607 A1  Sep. 22, 2022

(30) Foreign Application Priority Data

Mar. 16, 2021  (JP) ................ 2021-042909

(51) Int. Cl.
*H01S 3/00* (2006.01)
*H01S 5/024* (2006.01)
(Continued)

(52) U.S. Cl.
CPC ...... *H01S 5/02469* (2013.01); *H01S 5/02476* (2013.01); *H01S 5/026* (2013.01);
(Continued)

(58) Field of Classification Search
CPC .. H01S 5/02469; H01S 5/02476; H01S 5/026; H01S 5/042; H01S 5/0422; H01S 5/0428; H01S 5/183
See application file for complete search history.

(56) References Cited

U.S. PATENT DOCUMENTS 10,522,973 B2 * 12/2019 Burroughs ............ H10F 71/00
2003/0034498 A1  2/2003 Takagi
(Continued)

FOREIGN PATENT DOCUMENTS

CN   111224317 A   6/2020
JP   2003-060281 A  2/2003
(Continued)

OTHER PUBLICATIONS

Office Action issued Sep. 10, 2024 in Japanese Patent Application No. 2021-042909, 8 pages.
(Continued)

*Primary Examiner* — Kinam Park
(74) *Attorney, Agent, or Firm* — XSENSUS LLP

(57) ABSTRACT

A light source module, a distance-measuring apparatus, and a mobile object. The light source module includes a first substrate, a light source disposed on the first substrate to emit light, the light source having a first terminal and a second terminal, a field-effect transistor disposed on the first substrate, the field-effect transistor having a third terminal and a fourth terminal, and a charge storage unit disposed on the first substrate, the charge storage unit having a fifth terminal and a sixth terminal. In the light source module, the first terminal and the sixth terminal are coupled to each other, the second terminal and the third terminal are coupled to each other. In the light source module, the fourth terminal and the fifth terminal are at an equivalent electrical potential. The distance-measuring apparatus includes the light source module. The includes the distance-measuring apparatus.

17 Claims, 32 Drawing Sheets

(51) Int. Cl.
*H01S 5/026* (2006.01)
*H01S 5/042* (2006.01)
*H01S 5/183* (2006.01)
*G01S 7/481* (2006.01)
*G01S 17/88* (2006.01)

(52) U.S. Cl.
CPC ............ *H01S 5/042* (2013.01); *H01S 5/0422* (2013.01); *H01S 5/0428* (2013.01); *H01S 5/183* (2013.01); *G01S 7/4811* (2013.01); *G01S 17/88* (2013.01)

(56) References Cited

U.S. PATENT DOCUMENTS

| | | | | |
|---|---|---|---|---|
| 2003/0038344 | A1* | 2/2003 | Palmer | H01L 23/15 |
| | | | | 257/E21.597 |
| 2006/0039658 | A1 | 2/2006 | Furuyama et al. | |
| 2018/0045882 | A1* | 2/2018 | Chojnacki | G02B 6/4236 |
| 2018/0254218 | A1* | 9/2018 | Cheng | H10D 84/0144 |
| 2018/0301872 | A1* | 10/2018 | Burroughs | H01S 5/18394 |
| 2020/0303896 | A1 | 9/2020 | Ohta et al. | |
| 2020/0328576 | A1 | 10/2020 | Sakai et al. | |
| 2021/0399523 | A1 | 12/2021 | Ishida et al. | |
| 2022/0037853 | A1 | 2/2022 | Oka et al. | |
| 2022/0115836 | A1 | 4/2022 | Minamiru et al. | |
| 2022/0131339 | A1* | 4/2022 | Ohara | H01S 5/02234 |
| 2022/0158418 | A1 | 5/2022 | Satoh et al. | |
| 2023/0411926 | A1* | 12/2023 | Al Abbas | H01L 25/0753 |

FOREIGN PATENT DOCUMENTS

| | | |
|---|---|---|
| JP | 2006-059867 A | 3/2006 |
| JP | 2013-142730 | 7/2013 |
| JP | 2015-179436 | 10/2015 |
| JP | 2020-123710 | 8/2020 |
| JP | 2020-155403 A | 9/2020 |
| JP | 2020-155771 A | 9/2020 |
| JP | 2020-174166 A | 10/2020 |
| JP | 2021-025964 A | 2/2021 |
| JP | 2022-025692 | 2/2022 |
| WO | 2021/005844 A1 | 1/2021 |

OTHER PUBLICATIONS

Extended European Search Report issued Jul. 20, 2022 in European Patent Application No. 22155923.0, 8 pages.

* cited by examiner

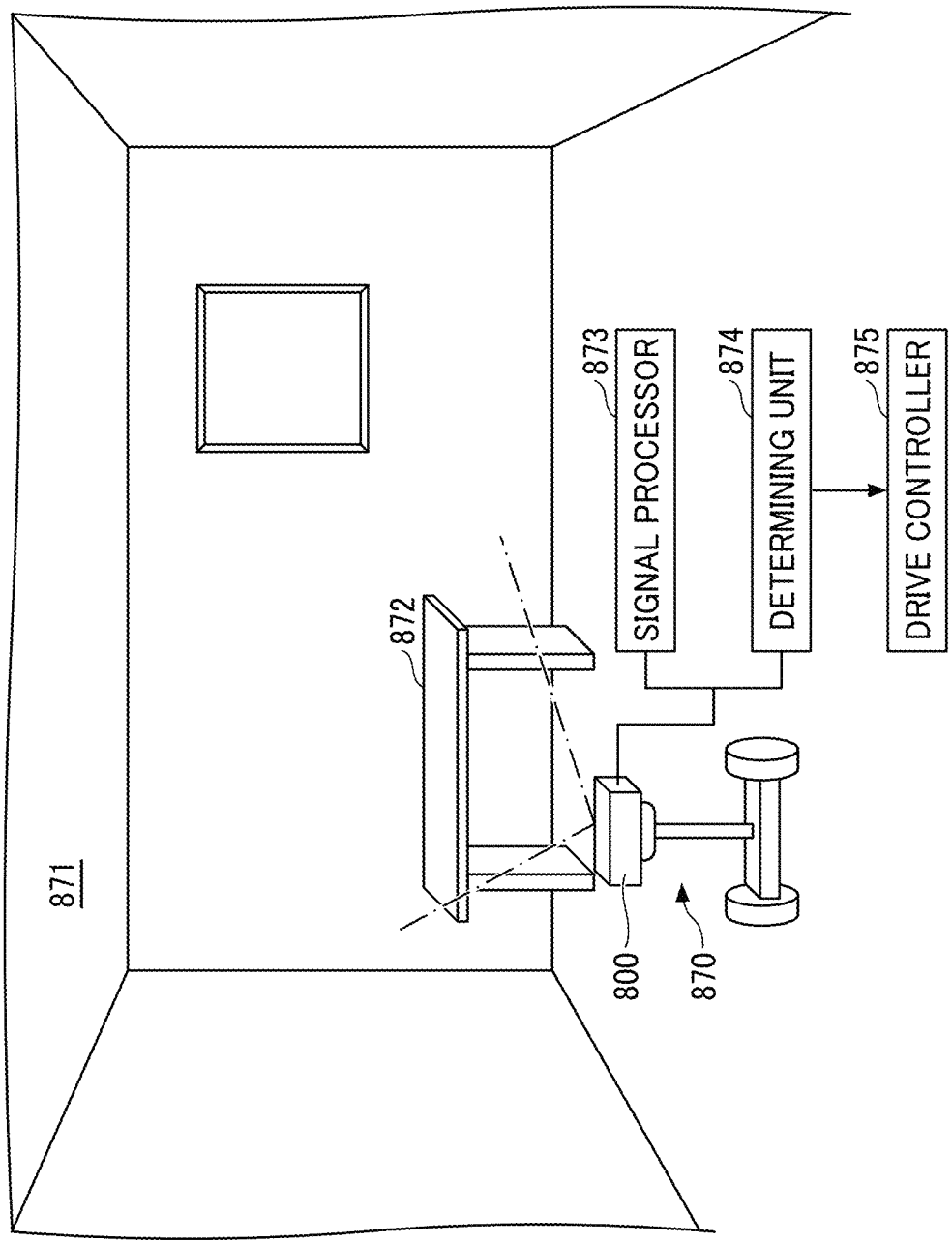

LIGHT SOURCE MODULE, DISTANCE-MEASURING APPARATUS, AND MOBILE OBJECT

CROSS-REFERENCE TO RELATED APPLICATION

This patent application is based on and claims priority pursuant to 35 U.S.C. § 119(a) to Japanese Patent Application No. 2021-042909, filed on Mar. 16, 2021, in the Japan Patent Office, the entire disclosure of which is hereby incorporated by reference herein.

BACKGROUND

Technical Field

Embodiments of the present disclosure relate to a light source module, a distance-measuring apparatus, and a mobile object.

Background Art

Some technologies have been proposed to dissipate the heat efficiently that is generated by the driver circuit of an integrated circuit (IC) used to drive a plurality of surface-emitting laser devices of a light source module.

SUMMARY

Embodiments of the present disclosure described herein provide a light source module, a distance-measuring apparatus, and a mobile object. The light source module includes a first substrate, a light source disposed on the first substrate to emit light, the light source having a first terminal and a second terminal, a field-effect transistor disposed on the first substrate, the field-effect transistor having a third terminal and a fourth terminal, and a charge storage unit disposed on the first substrate, the charge storage unit having a fifth terminal and a sixth terminal. In the light source module, the first terminal and the sixth terminal are coupled to each other, the second terminal and the third terminal are coupled to each other. In the light source module, the fourth terminal and the fifth terminal are at an equivalent electrical potential. The distance-measuring apparatus includes the light source module. The includes the distance-measuring apparatus.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 40 is a diagram illustrating a case in which a detection device including a light source module according to an embodiment of the present disclosure is applied to an autonomous traveling system of a mobile object.

Figure 1:
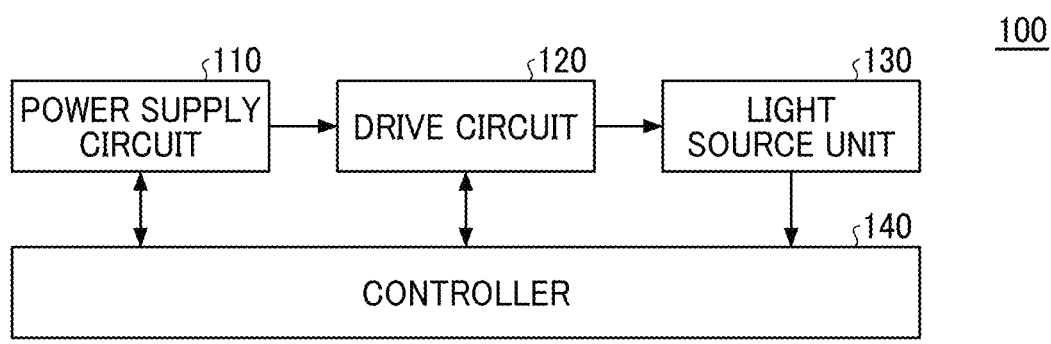
FIG. 1 is a schematic diagram of a light source module according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below in detail with reference to the accompanying drawings. In the description and the drawings of the embodiments of the present disclosure, like reference signs may be given to like elements with substantially the same functional configuration. Accordingly, overlapping descriptions are omitted where appropriate.

First Embodiment

Firstly, a first embodiment of the present disclosure is described below. The first embodiment of the present disclosure relates to a light source module 100.

FIG. 1 is a schematic diagram of the light source module 100 according to the first embodiment of the present disclosure.

The light source module 100 according to the first embodiment of the present disclosure is a device that can stably output high-power and high-speed light. For example, the light source module 100 according to the present embodiment may be used for a light source device that performs distance sensing using a time-of-flight (TOF) method.

As illustrated in FIG. 1, the light source module 100 according to the present embodiment includes a power supply circuit 110, a drive circuit 120, a light source unit 130, and a controller 140.

Figure 2:
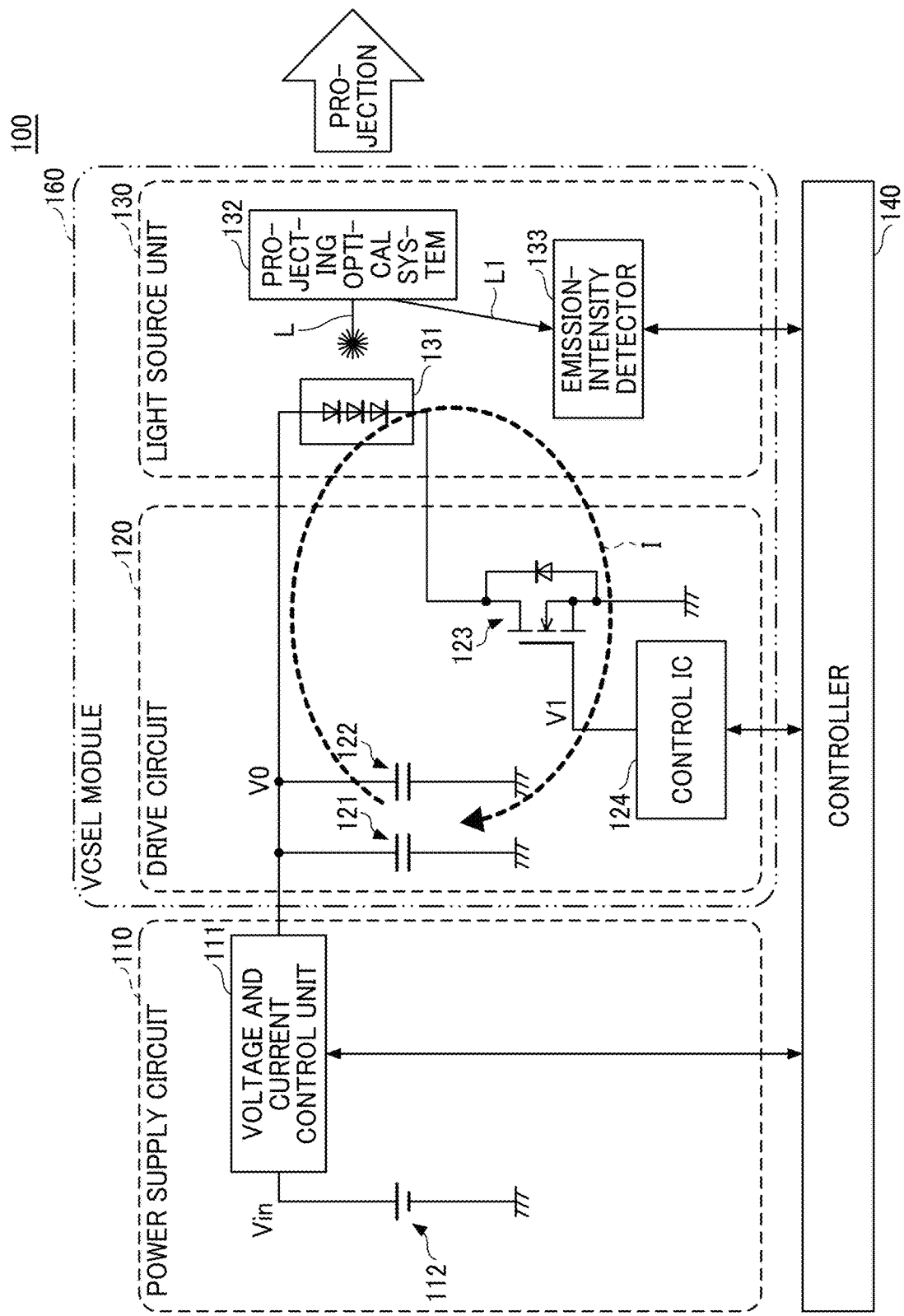
FIG. 2 is a diagram illustrating the circuitry of a light source module according to the first embodiment of the present disclosure.

The power supply circuit 110 generates an output voltage and an output current by using power supplied from an external power supply 112 (see FIG. 2). The power supply circuit 110 supplies the generated output voltage and output current to the drive circuit 120. The controller 140 controls the voltage value of the output voltage and the current value of the output current supplied to the drive circuit 120.

The drive circuit 120 according to the present embodiment uses the output voltage and the output current supplied from the power supply circuit 110 to supply, to the light source unit 130, a current required for the light emission of the laser beam source 131 (see FIG. 2) included in the light source unit 130. The degree of such a current is determined according to the illuminance and the timing of light emission. The controller 140 controls the current value of the current supplied to the drive circuit 120.

The light source unit 130 according to the present embodiment includes a laser beam source 131. The laser beam source 131 is driven by a current supplied from the drive circuit 120, and the light source unit 130 emits a laser beam (pulsed light) from the laser beam source 131. The laser beam source 131 according to the present embodiment serves as a light source.

The controller 140 according to the present embodiment controls the light emission timing of the laser beam source 131 in accordance with the exposure timing of a light-receptive sensor such as a TOF sensor. The controller 140 performs feedback control or stop control of the current flowing through each block based on a detection signal such as a decrease in the light amount of the laser beam source 131 or an abnormality in the output of the laser beam source 131. For example, the controller 140 includes an integrated circuit (IC) chip such as a large-scale integrated (LSI) circuit chip and a microprocessor, and a logic device such as a field-programmable gate array (FPGA). The controller 140 may further include a light-receptive sensor such as a TOF sensor.

The circuitry of the light source module 100 is described below.

FIG. 2 is a diagram illustrating the circuitry of the light source module 100 according to the first embodiment of the present disclosure.

As illustrated in FIG. 2, the power supply circuit 110 includes a voltage and current control unit 111. The voltage and current control unit 111 performs step-up control or step-down control on the voltage Vin supplied from the external power supply 112, and outputs a DC voltage V0 having a voltage value or a current value set by the controller 140. The voltage and current control unit 111 is, for example, a switching control type DC-DC converter capable of performing one or both of step-up control and step-down control on the basis of an output voltage or an output current.

The drive circuit 120 according to the present embodiment includes a capacitor 121, a capacitor 122, a field-effect transistor (FET) 123, and a control integrated circuit (IC) 124.

One terminal of each of the capacitor 121 and the capacitor 122 is grounded, and the other terminal thereof is coupled to the output of the voltage and current control unit 111. One terminal of each of the capacitor 121 and the capacitor 122 according to the present embodiment serves as a fifth terminal, and the other terminal according to the present embodiment serves as a sixth terminal. The capacitor 121 and the capacitor 122 accumulate electric charges in accordance with the DC voltage V) supplied from the voltage and current control unit 111. The capacitor 121 and the capacitor 122 is, for example, a multilayer ceramic capacitor of equivalent series inductance (ESL) and a electrolytic capacitor. The capacitor 121 and the capacitor 122 assist the voltage and current control unit 111 to drive the light source module 100 at high speed and high output power. The capacitor 121 and the capacitor 122 according to the present embodiment serves as a charge storage unit.

The gate of the FET 123 according to the present embodiment is coupled to the control IC 124. The drain of the FET 123 according to the present embodiment is coupled to a cathode of the laser beam source 131 included in the light source unit 130. The source of the FET 123 according to the present embodiment is grounded. In other words, the FET 123 is electrically connected in series between the cathode of the laser beam source 131 and the ground. The drain of the FET 123 according to the present embodiment serves as a third terminal, and the source of the FET 123 according to the present embodiment serves as a fourth terminal.

The FET 123 may be, for example, a small semiconductor switch comprising a high band gap material. The FET 123 is, for example, a gallium nitride field-effect transistor (FET) that includes gallium nitride (GaN) having a band gap of 3.4 electron-volt (eV) as materials for a band gap. Due to such configurations as described above, the light source module 100 can drive the laser beam source 131 at a relatively high drive frequency (several hundred MHz) and enhances the speed of the rise time during driving of the laser beam source 131. The FET 123 may include a plurality of FETs connected in parallel or in series.

The control IC 124 is connected between the controller 140 and the gate of the FET 123. The control IC 124 controls a voltage value V1 of the gate of the FET 123 to switch on and off of the FET 123. The FET 123 controls the pulse width of the current flowing through the laser beam source 131 by switching on and off. Preferably, the control IC 124 has a high-speed and high-powered gate drive circuit used to charge the gate voltage of the FET 123 at high speed. The gate drive circuit has a pre-drive function. When the control IC 124 includes a gate drive circuit having a pre-drive function, the control IC 124 can easily drive the FET 123 even when a capacitance is parasitic on the gate of the FET 123.

The light source unit 130 according to the present embodiment includes a laser beam source 131, a projection optical system 132, and an emission-intensity detector 133. The laser beam source 131 according to the present embodiment has an anode and a cathode. The anode of the laser beam source 131 is coupled to the output of the voltage and current control unit 111, and the cathode is coupled to the drain of the FET 123. In other words, the laser beam source 131 is electrically connected in series between the voltage and current control unit 111 and the FET 123. The anode of the laser beam source 131 according to the present embodiment serves as a first terminal, and the cathode according to the present embodiment serves as a second terminal.

The current that is controlled by the FET 123 drives the laser beam source 131, and the laser beam source 131 emits light. The laser beam source 131 is, for example, a vertical-cavity surface-emitting laser (VCSEL) of a back emission type. The laser beam source 131 may be a single light source that includes, for example, an edge emitting laser (EEL), a VCSEL, and light-emitting diode (LED). The laser beam source 131 may include a plurality of light sources (130) that are simultaneously emitted, for example, a VCSEL array light source. The projection optical system 132 according to the present embodiment changes, for example, the angle of view and the irradiation field of the laser beam emitted by the laser beam source 131. The projection optical system 132 is, for example, a lens optical system or a micro optical system. The micro optical system deflects some of the light emitted from the laser beam source 131 by at least one of diffraction, diffusion, and refraction. The micro optical system includes, for example, a diffractive-optical element (DOE) and a diffusing board. The emission-intensity detector 133 according to the present embodiment may include, for example, a photodiode (PD) and an avalanche photodiode (APD). The emission-intensity detector 133 receives a reflected light L1 that is some of the laser beam emitted by the laser beam source 131, to detect the radiation intensity of light of the light output from the laser beam source 131 or to detect the timing of pulse output. The results of the detection that is performed by the emission-intensity detector 133 are fed back to the controller 140, and the controller 140 uses the results of detection to, for example, determine whether or not the projection optical system 132 is present, detect shifting or deviation, and to detect the radiation intensity of light outside the light source unit 130.

A layout of the light source module 100 is described below.

Figure 3:
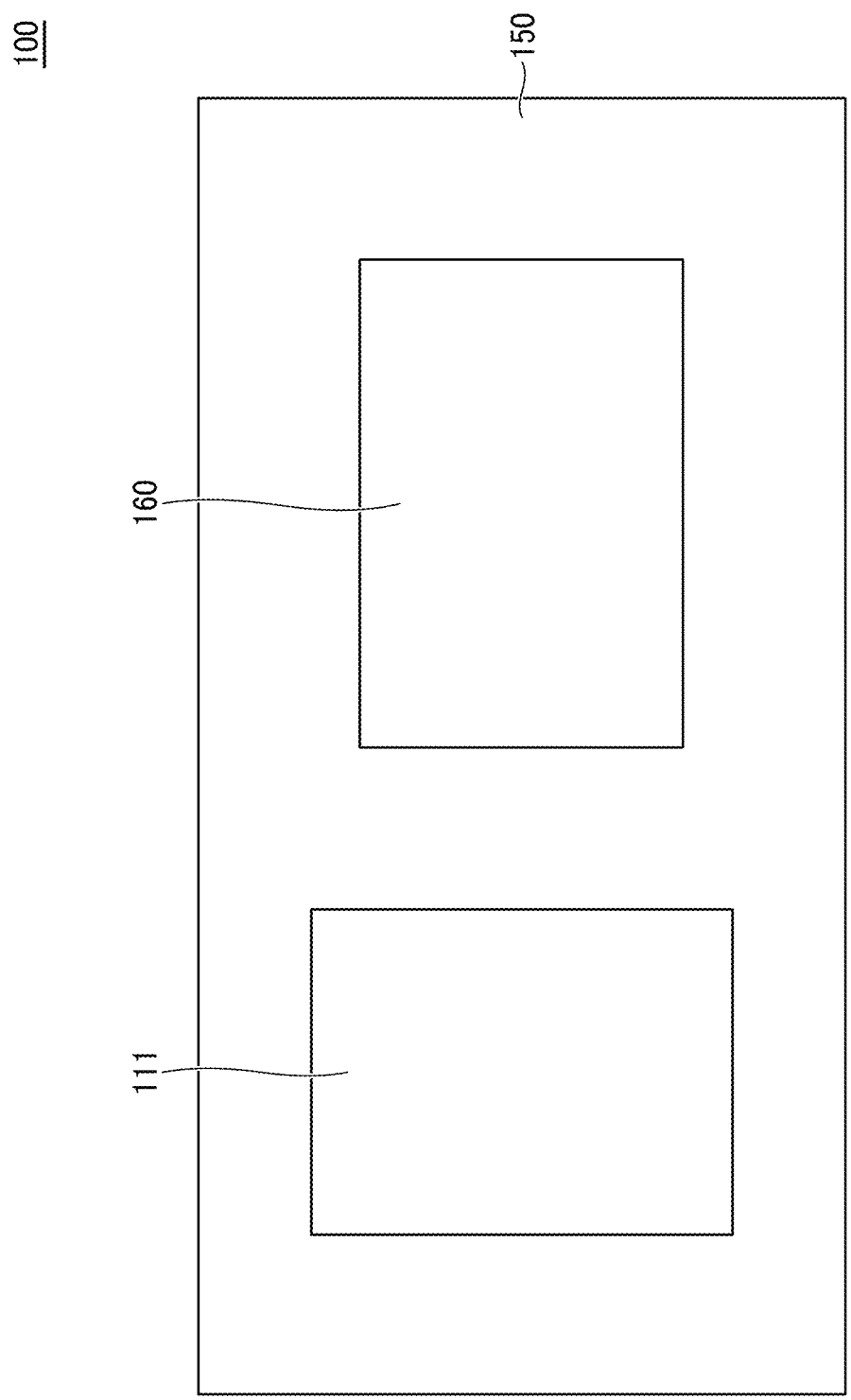
FIG. 3 is a top view of a light source module, illustrating its layout, according to the first embodiment of the present disclosure.

FIG. 3 is a top view of the light source module 100, illustrating its layout, according to the first embodiment of the present disclosure.

Figure 4:
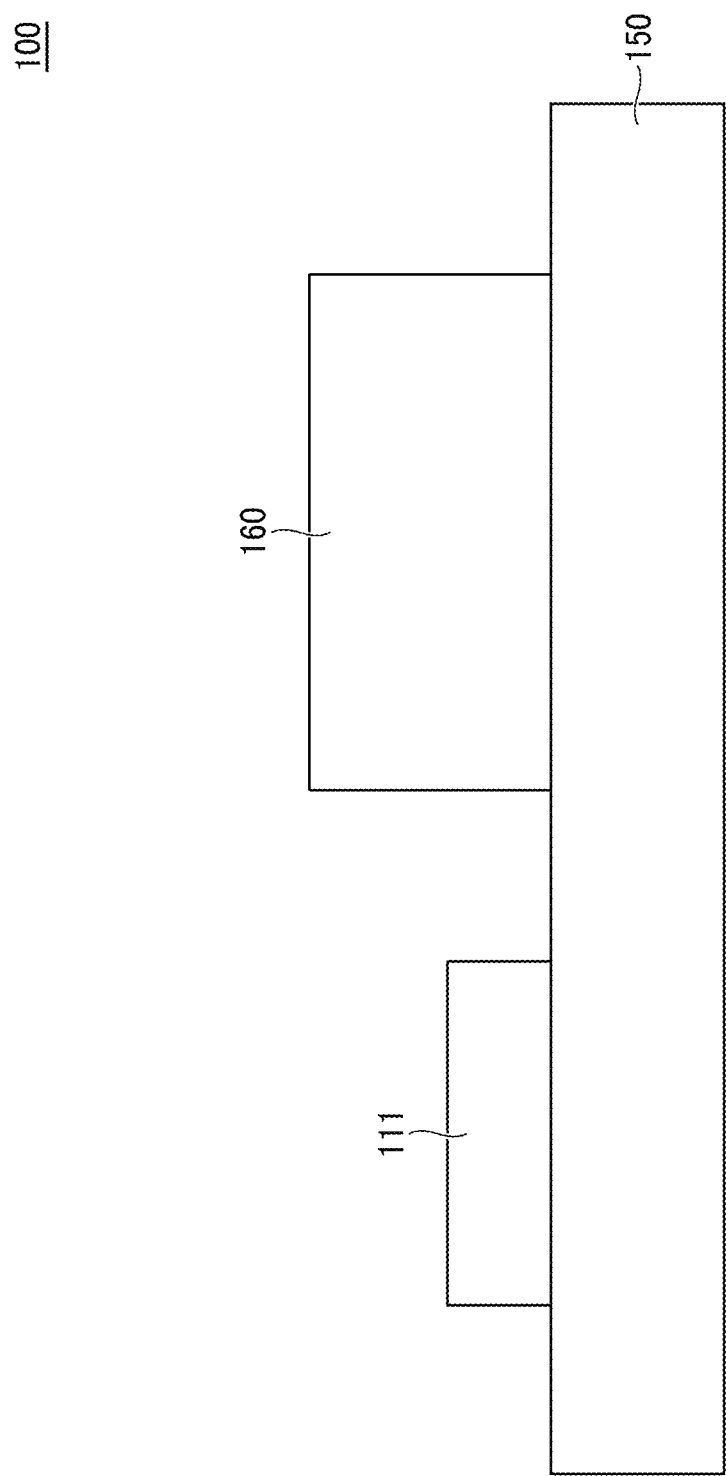
FIG. 4 is a side view of a light source module, illustrating its layout, according to the first embodiment of the present disclosure.

FIG. 4 is a side view of the light source module 100, illustrating its layout, according to the first embodiment of the present disclosure.

As illustrated in FIG. 3 and FIG. 4, the light source module 100 includes a base substrate 150 and a VCSEL module 160. In the first embodiment, the voltage and current control unit 111 of the power supply circuit 110 and the VCSEL module 160 are disposed on the base substrate 150.

The base substrate 150 is, for example, a metal-based substrate. The metal base substrate includes a heat sink made of copper or aluminum, an insulating layer on a surface of the heat sink, and a copper foil on the insulating layer. The copper foil makes up a circuit pattern. The base substrate 150 may include a glass epoxy substrate and a circuit pattern on a surface of the glass epoxy substrate. The base substrate 150 according to the present embodiment serves as a second substrate.

The base substrate 150 may further include a connector used for the external power supply 112 of the power supply circuit 110 and a connector used for the controller 140.

The VCSEL module 160 is described below.

Figure 5:
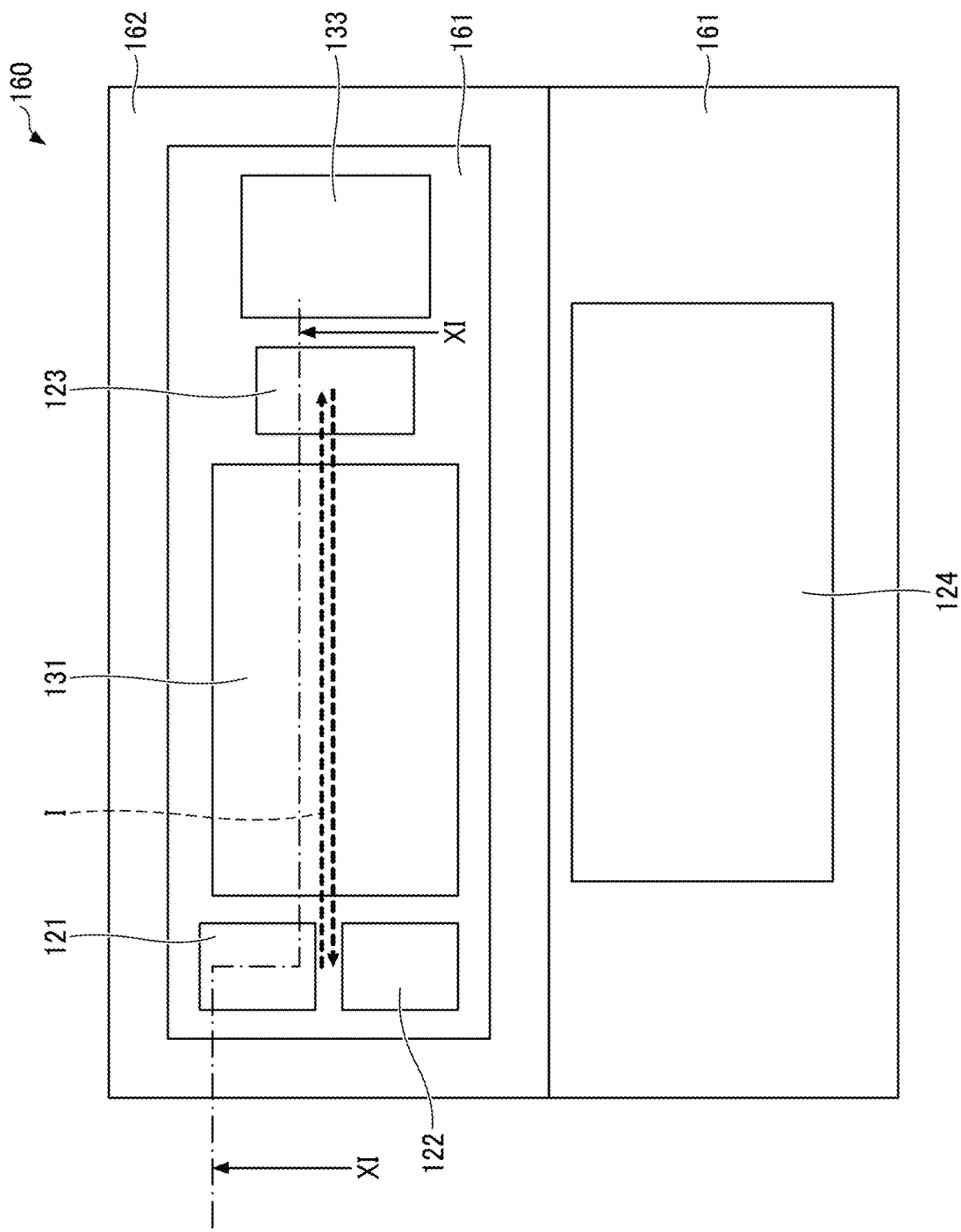
FIG. 5 is a top view of a vertical-cavity surface-emitting lasers (VCSEL) module in a light source module, according to the first embodiment of the present disclosure.

FIG. 5 is a top view of the VCSEL module 160 in the light source module 100, according to the first embodiment of the present disclosure.

Figure 6:
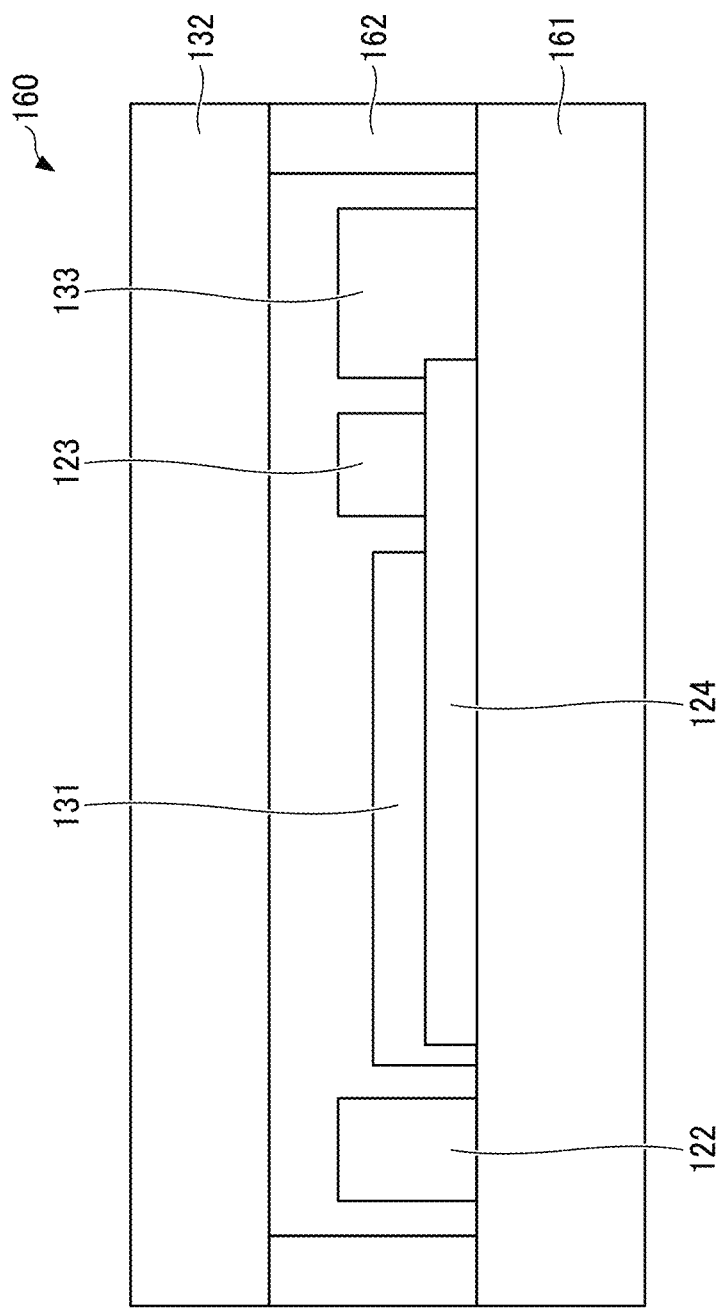
FIG. 6 is a side view of a VCSEL module in a light source module, according to the first embodiment of the present disclosure.

FIG. 6 is a side view of the VCSEL module 160 in the light source module 100, according to the first embodiment of the present disclosure.

In FIG. 5, the projection optical system 132 is omitted. In FIG. 6, a portion of the fixation member 162 between the control IC 124 and the laser beam source 131 is omitted.

As illustrated in FIG. 2, FIG. 5, and FIG. 6, the VCSEL module 160 includes a submount substrate 161, the capacitor 121, the capacitor 122, the FET 123, the control IC 124, the laser beam source 131, the projection optical system 132, the emission-intensity detector 133, and the fixation member 162. The VCSEL module 160 may further include, for example, a thermometer used to measure the temperature of the VCSEL module 160.

The capacitor 121, the capacitor 122, the FET 123, the control IC 124, the laser beam source 131, and the emission-intensity detector 133 are implemented on the submount substrate 161. A fixation member 162 fixes the projection optical system 132 to the submount substrate 161. The material of the fixation member 162 is, for example, a nonmetal material such as resin, glass, and ceramic. The fixation member 162 may include a metal material whose contact portion with the submount substrate 161 is electrically insulated. For example, in a plan view, the fixation member 162 is shaped like a frame, and the capacitor 121, the capacitor 122, the FET 123, the laser beam source 131, and the emission-intensity detector 133 are arranged inside the fixation member 162. Moreover, the control IC 124 is arranged outside the fixation member 162. The submount substrate 161 according to the present embodiment serves as a first substrate.

The submount substrate 161 may have a cavity for accommodating the capacitor 121, the capacitor 122, the FET 123, the laser beam source 131, and the emission-intensity detector 133. When the projection optical system 132 is composed of only lenses, the projection optical system 132 may be implemented on the base substrate 150.

As illustrated in FIG. 5, the laser beam source 131 is located between the pair of capacitor 121 and the capacitor 122 and the FET 123, and the FET 123 is located between the laser beam source 131 and the emission-intensity detector 133. In other words, in a plan view in a direction perpendicular to the front side of the submount substrate 161, the pair of capacitor 121 and the capacitor 122, the laser beam source 131, the FET 123, and the emission-intensity detector 133 are arranged in a straight line in the order listed. By arranging the laser beam source 131 and the FET 123 so as to be adjacent to each other, the current path can be shortened. By arranging the laser beam source 131 and the emission-intensity detector 133, which receives the reflected light L1 that is some of the laser beam emitted by the laser beam source 131, at a certain distance, the radiation intensity of the reflected light L1 that is received by the emitted light quantity detection means 133 can be increased, and an appropriate radiation intensities of received light can be obtained. In view of such circumstances, by arranging the FET 123 between the laser beam source 131 and the emission-intensity detector 133, the current path can be shortened, and the laser beam source 131 and the emission-intensity detector 133 can be arranged at a certain distance. As a result, a downsized light source module with high speed and high output power can be implemented. It is desired that the projection optical system 132 be arranged so as to overlap with at least the laser beam source 131, the FET 123, and the emission-intensity detector 133 in a planar view.

A configuration or structure of the laser beam source 131 is described below.

Figure 7A:
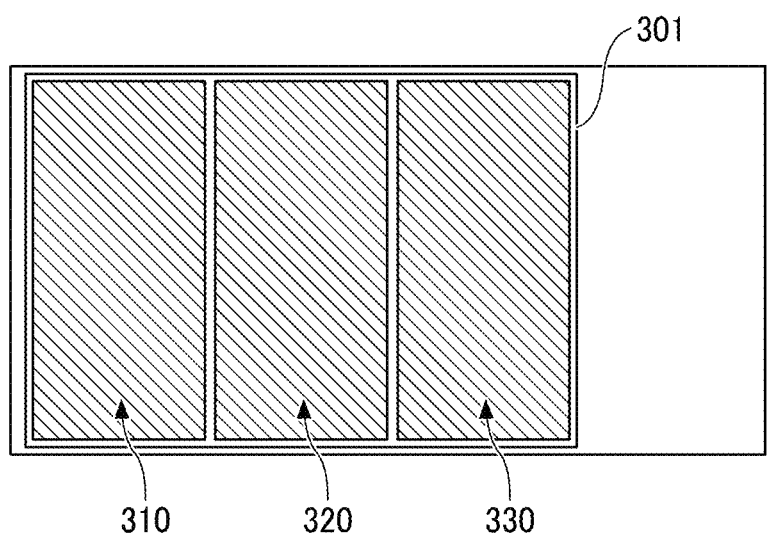
FIG. 7A and FIG. 7B are diagrams each illustrating a configuration of a laser beam source in a light source module, according to the first embodiment of the present disclosure.
Figure 7B:
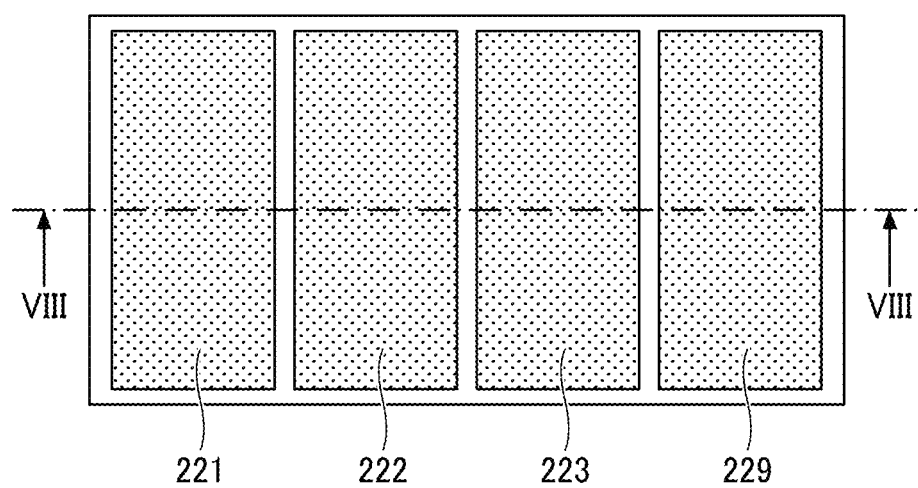

FIG. 7A and FIG. 7B are diagrams each illustrating a configuration of the laser beam source 131 in the light source module 100, according to the first embodiment of the present disclosure.

More specifically, FIG. 7A is a top view, and FIG. 7B is a bottom view.

Figure 8:
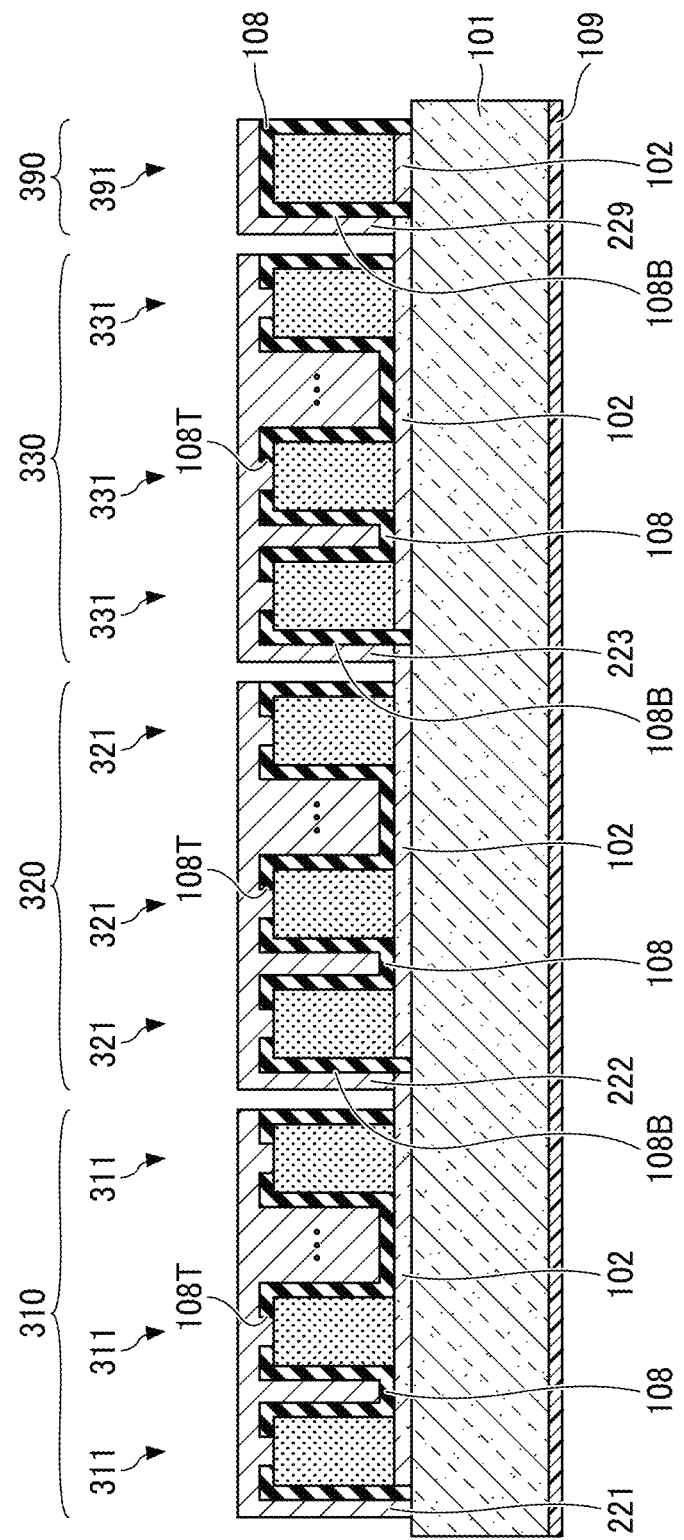
FIG. 8 is a cross-sectional view of a laser beam source in a light source module, according to the first embodiment of the present disclosure.

FIG. 8 is a cross-sectional view of the laser beam source 131 in the light source it module 100, according to the first embodiment of the present disclosure.

The cross-sectional view in FIG. 8 corresponds to a cross section along line VIII-VIII in FIG. 7B.

Figure 9:
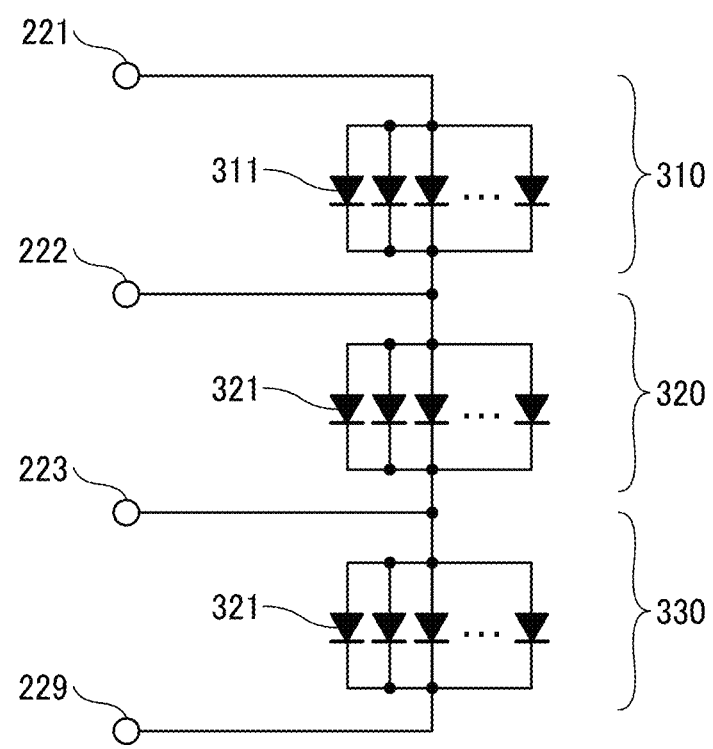
FIG. 9 is an equivalent circuit diagram of a laser beam source in a light source module, according to the first embodiment of the present disclosure.

FIG. 9 is an equivalent circuit diagram of the laser beam source 131 in a light source module 100, according to the first embodiment of the present disclosure.

As illustrated in FIG. 7A, FIG. 7B, FIG. 8, and FIG. 9, the laser beam source 131 according to the present embodiment includes the substrate 101, and the first sub-array 310, the second sub-array 320, the third sub-array 330, and the cathode pad portion 390 that are disposed on the substrate 101. As illustrated in FIG. 9, the first sub-array 310, the second sub-array 320, and the third sub-array 330 are coupled to each other in series. The first sub-array 310 includes a plurality of VCSEL devices 311 that emit light L through the substrate 101. The second sub-array 320 includes a plurality of VCSEL devices 321 that emit light L through the substrate 101. The third sub-army 330 includes a plurality of VCSEL devices 331 that emit light L through the substrate 101. In the first sub-array 310, the multiple VCSEL devices 311 are electrically coupled to each other in parallel. Similarly, in the second sub-array 320, the multiple VCSEL devices 321 are electrically coupled to each other in parallel. In the third sub-array 330, the multiple VCSEL devices 331 are electrically coupled to each other in parallel. The cathode pad portion 390 according to the present embodiment includes a quasi-VCSEL device 391. The substrate 101 is, for example, a non-doped semi-insulating GaAs substrate. The substrate 101 according to the present embodiment serves as a third substrate.

The number of each of the VCSEL device 311, the VCSEL device 321, and the VCSEL device 331 is approximately 100 to 1000. The numbers of VCSEL devices 311, 321 and 331 are preferably equal to each other. When the numbers of the VCSEL device 311, the VCSEL device 321, and the VCSEL device 331 are equal to each other, the magnitudes of currents flowing through the VCSEL device 311, the VCSEL device 321, and the VCSEL device 331 are equal to each other, and an even radiation intensity of light can be obtained.

The VCSEL device 331 according to the present embodiment is described below.

Figure 10:
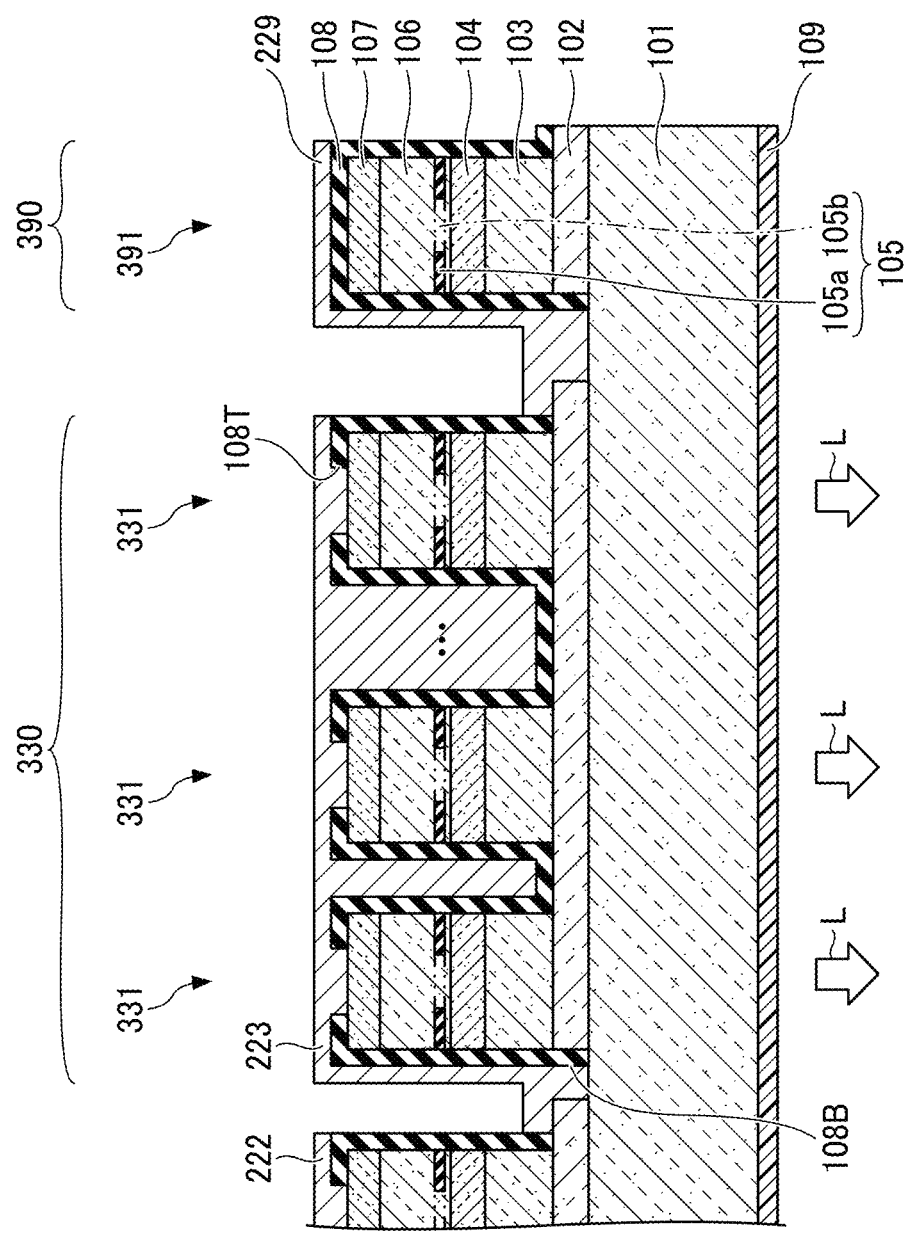
FIG. 10 is a cross-sectional view of a vertical cavity-surface emitting laser (VCSEL) device according to an embodiment of the present disclosure.

FIG. 10 is a sectional view of the VCSEL devices 331 included in the third sub-array 330, according to an embodiment of the present embodiment.

Each one of the VCSEL devices 331 includes a first contact layer 102 of first conductivity, a first multilayer reflector 103 of first conductivity, a resonator 104, a second multilayer reflector 106 having second conductivity, and a second contact layer 107 having second conductivity.

The first contact layer 102 overlies the substrate 101. The first contact layer 102 is, for example, a highly doped GaAs layer. The multiple VCSEL devices 331 that are included in the third sub-array 330 share one of the first contact layers 102.

The first multilayer reflector 103 overlies the first contact layer 102. The first multilayer reflector 103 alternately includes two types of layers having different refractive indexes. For example, one of such a pair of layers is a high refractive index layer of $Al_{0.2}Ga_{0.8}As$, and the other layer of such a pair of layers is a low refractive index layer of $Al_{0.9}Ga_{0.1}As$. The first multilayer reflector 103 includes a gradient-composition layer in which the composition continuously changes between the high refractive index layer and the low refractive index layer, and the optical thickness of each layer up to the center of the gradient-composition layer is $\lambda/4$ where $\lambda$ denotes the oscillation wavelength of the laser.

The resonator 104 overlies the first multilayer reflector 103. The resonator 104 includes a lower spacer layer, an active layer over the lower spacer layer, and an upper spacer layer over the active layer.

$\lambda$ denotes the optical length of the resonator 104. For example, the oscillation wavelength $\lambda$ is 940 nm.

The second multilayer reflector 106 overlies the resonator 104. The second multilayer reflector 106 alternately includes two types of layers having different refractive indexes. For example, one of such a pair of layers is a high refractive index layer of $Al_{0.2}Ga_{0.8}As$, and the other layer of such a pair of layers is a low refractive index layer of $Al_{0.9}Ga_{0.1}As$. The second multilayer reflector 106 includes a gradient-composition layer in which the composition continuously changes between the high refractive index layer and the low refractive index layer, and the optical thickness of each layer up to the center of the gradient-composition layer is $\lambda/4$ where $\lambda$ denotes the oscillation wavelength of the laser. The number of pairs of high refractive index layers and low refractive index layers in the second multilayer reflector 106 is larger than the number of pairs of high refractive index layers and low refractive index layers in the first multilayer reflector 103. Due to such a configuration, the VCSEL device 331 can emit light L through the substrate 101.

The second multilayer reflector 106 includes a selective oxidized layer 105. The selective oxidized layer 105 includes an oxidized area 105a and a non-oxidized area 105b. The degree of Al composition of the selective oxidized layer 105 is higher than that of the layers around, and for example, the selective oxidized layer 105 is an AlAs layer.

The second contact layer 107 overlies the second multilayer reflector 106. The second contact layer 107 is, for example, a highly doped GaAs layer.

The VCSEL device 311, the VCSEL device 321, and the quasi-VCSEL device 391 have a multilayered structure similar to that of the VCSEL device 331.

The laser beam source 131 includes an insulating layer 108 that covers the VCSEL device 311, the VCSEL device 321, the VCSEL device 331, and the quasi-VCSEL device 391. The insulating layer 108 is, for example, a SiN layer or a $SiO_2$ layer. The insulating layer 108 has an opening 108T that individually exposes the VCSEL device 311, the VCSEL device 321, and the second contact layer 107 of the VCSEL device 331. The insulating layer 108 does not have an opening that exposes the second contact layer 107 of the quasi-VCSEL device 391. The insulating layer 108 has an opening 108B that separately exposes the multiple first contact layers 102.

The laser beam source 131 includes an electrode 221, an electrode 222, an electrode 223, and an electrode 229 above the insulating layer 108. The electrode 221 contacts the second contact layer 107 of the multiple VCSEL devices 331 included in the first sub-array 310 through the opening 108T. The electrode 222 contacts the second contact layer 107 of the multiple VCSEL devices 321 included in the second sub-array 320 through the opening 108T. The electrode 223 contacts the second contact layer 107 of the multiple VCSEL devices 331 included in the third sub-array 330 through the opening 108T. The electrode 222 also contacts the first contact layer 102 included in the first sub-array 310 in a contact region between the first sub-array 310 and the second sub-array 320

The electrode 223 also contacts the first contact layer 102 included in the second sub-array 320 in a contact region between the second sub-array 320 and the third sub-array 330. The electrode 229 overlies the insulating layer 108 in the cathode pad portion 390 but does not contact the second contact layer 107 of the quasi-VCSEL device 391. The electrode 229 contacts the first contact layer 102 included in the third sub-array 330 in a contact region between the third sub-array 330 and the cathode pad portion 390. Each of the electrode 221, the electrode 222, the electrode 223, and the electrode 229 is, for example, a layered product provided with a Ti film, a Pt film on the Ti film, and an Au film on the Pt film. A base layer for ohmic connection with the first contact layer 102 and a base layer for ohmic connection with the second contact layer 107 may be different from each other.

The laser beam source 131 has an antireflection film 109 on the rear side of the substrate 101 from which light is emitted. The optical thickness of the antireflection film 109 is indicated by $\lambda/4$.

In the laser beam source 131, an electrode 222 electrically connects the first contact layer 102 in the first sub-array 310 and the second contact layer 107 in the second sub-array 320. Accordingly, the first sub-array 310 and the second sub-array 320 are directly connected. An electrode 223 electrically connects the first contact layer 102 in the second sub-array 320 and the second contact layer 107 in the third sub-array 330. Accordingly, the second sub-array 320 and the third sub-array 330 are directly connected. Accordingly, according to the first embodiment of the present disclosure, the driving current can be reduced to approximately one third as compared with the case where all the VCSEL devices 311, 321, and 331 are coupled to each other in parallel.

When a potential difference is applied between the electrode 221 and the electrode 229, the laser beam source 131 can be driven. Accordingly, it is not necessary to arrange an anode pad and a cathode pad for electrical conduction in each of the first sub-array 310, the second sub-array 320, and the third sub-array 330. Such a configuration allows desired miniaturization. Moreover, the interval between all pairs of the light-emitting units of the VCSEL devices 311, 321, and 331 can be reduced to prevent the unevenness in light emission.

For example, the planar shape of the contact region is rectangular, and the length of one side of the contact region is equal to the length of one side of the light-emitting region 301 in which the VCSEL device 311, the VCSEL device 321, and the VCSEL device 331 are arranged. Preferably, the difference in distance to the contact region is small in the multiple VCSEL devices (311, 321, 331) in one sub-array. This is because the difference in brightness based on a difference in resistance can be reduced.

The oscillation wavelengths λ of the VCSEL device 311, the VCSEL device 321, and the VCSEL device 331 may be, for example, a 980 nm band, a 1.3 μm band, or a 1.5 μm band. The materials of the VCSEL device 311, the VCSEL device 321, and the VCSEL device 331 are not limited, and for example, AlGaInAs and GaInPAs may be included in the VCSEL device 311, the VCSEL device 321, and the VCSEL device 331. The composition of each compound semiconducting layer is also not particularly limited.

A configuration of the submount substrate 161 is described below.

Figure 11:
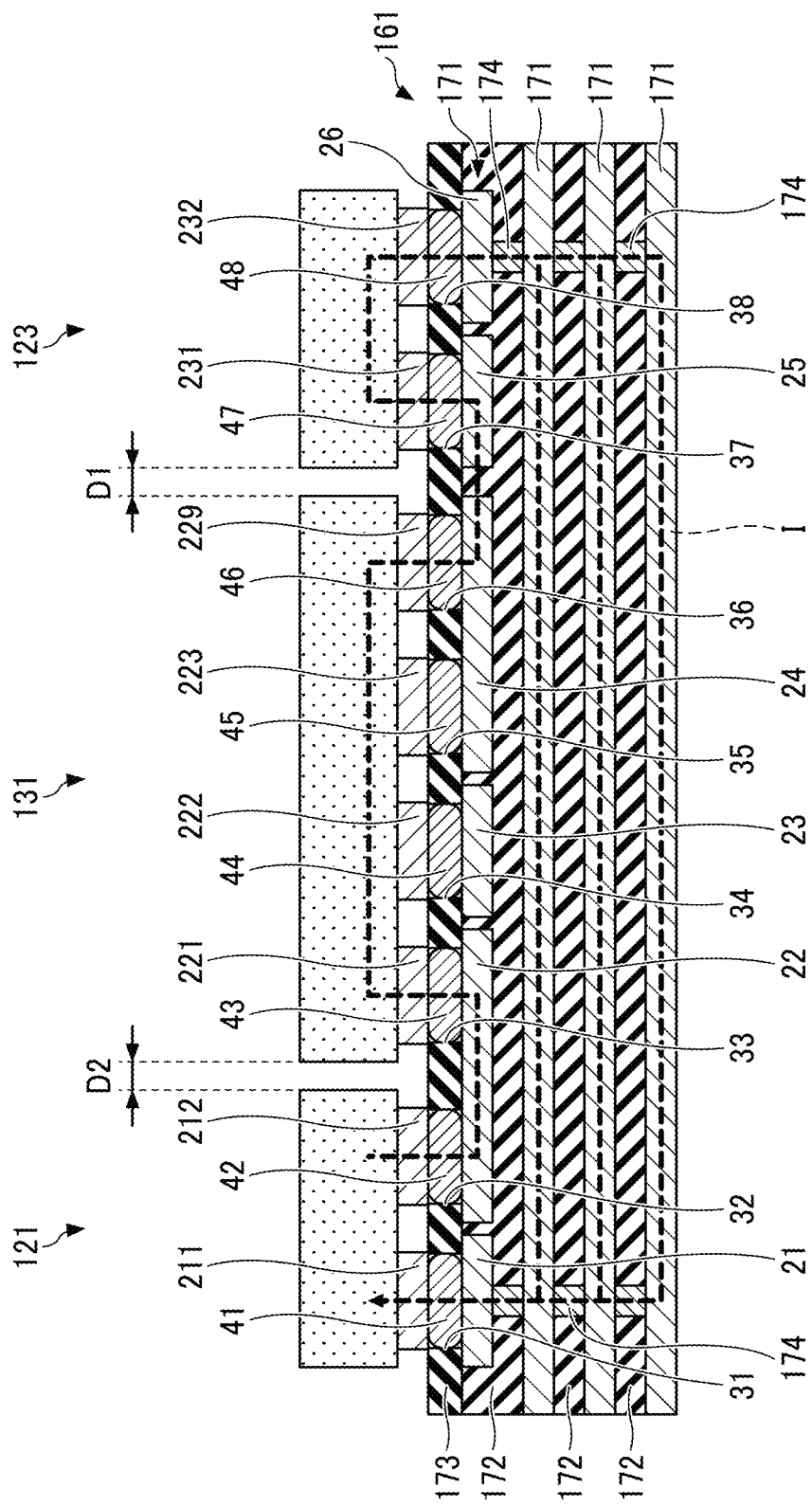
FIG. 11 is a sectional view of a submount substrate in a light source module 100, according to the first embodiment of the present disclosure.

FIG. 11 is a sectional view of the submount substrate 161 in the light source module 100, according to the first embodiment of the present disclosure.

The cross-sectional view in FIG. 11 corresponds to a cross section along line XI-XI in FIG. 5.

The submount substrate 161 includes, for example, four conductive layers 171, three insulating layers 172, and a solder resist layer 173. There is one insulating layer 172 between two conductive layers 171. The insulating layer 172 is preferably an aluminum nitride layer. The insulating layer 172 may be an alumina layer. The thickness of the insulating layer 172 is about 100 micrometers (μm) to 200 μm. The conductive layer 171 is, for example, a copper layer or a tungsten layer. The uppermost one of the four conductive layers 171 has a thickness of about 20 μm to 100 μm. The remaining thickness of the four conductive layers 171 is approximately 15 μm to 30 μm. On the uppermost one of the four conductive layers 171, a solder resist layer 173 is arranged. For example, the multiple conductive layers 171 are electrically coupled to each other through the vias 174. It is not necessary for the submount substrate 161 to include the solder resist layer 173.

The uppermost one of the four conductive layers 171 includes a first area 21, a second area 22, a third area 23, a fourth area 24, a fifth area 25, and a sixth area 26.

The first area 21 is coupled to one electrode 211 of the capacitor 121 and one electrode 211 of the capacitor 122. The electrode 211 according to the present embodiment is grounded, and serves as a fifth terminal. The second area 22 is coupled to the other electrode 212 of the capacitor 121 and the other electrode 212 of the capacitor 122. The electrode 212 according to the present embodiment is an electrode that is coupled to the voltage and current control unit 111 and to which the DC voltage V0 is applied, and serves as a sixth terminal.

The second area 22 is also coupled to the electrode 221 of the first sub-array 310 of the laser beam source 131. The electrode 221 according to the present embodiment is an anode electrode of the laser beam source 131, and serves as a first terminal. The third area 23 is also coupled to the electrode 222 of the second sub-array 320 of the laser beam source 131. The electrode 222 is an electrically floating electrode. The fourth area 24 is coupled to the electrode 223 of the third sub-array 330 of the laser beam source 131. The electrode 222 is an electrically floating electrode. The fifth area 25 is coupled to the electrode 229 of the cathode pad portion 390 of the laser beam source 131. The electrode 229 according to the present embodiment is a cathode electrode of the laser beam source 131, and serves as a second terminal.

The fifth area 25 is also coupled to the drain electrode 231 of the FET 123. The drain electrode 231 according to the present embodiment serves as a third terminal. The sixth area 26 is coupled to the source electrode 232 on the FET 123. The source electrode 232 according to the present embodiment serves as a fourth terminal.

The solder resist layer 173 has two first openings 31, two second openings 32, a third opening 33, a fourth opening 34, a fifth opening 35, a sixth opening 36, a seventh opening 37, and an eighth opening 38. A part of the first area 21 is exposed from the first opening 31. A part of the second area 22 is exposed from the second opening 32. Another part of the second area 22 is exposed from the third opening 33. A part of the third area 23 is exposed from the fourth opening 34. A part of the fourth area 24 is exposed from the fifth opening 35. A part of the fifth area 25 is exposed from the sixth opening 36. Another part of the fifth area 25 is exposed from the seventh opening 37. A part of the sixth area 26 is exposed from the eighth opening 38.

The VCSEL module 160 includes two first bonding materials 41, two second bonding materials 42, a third bonding material 43, a fourth bonding material 44, a fifth bonding material 45, a sixth bonding material 46, a seventh bonding material 47, and an eighth bonding material 48. The materials of the first bonding material 41, the second bonding material 42, the third bonding material 43, the fourth bonding material 44, the fifth bonding material 45, the sixth bonding material 46, the seventh bonding material 47, and the eighth bonding material 48 are, for example, a conductive paste or solder.

The one first bonding material 41 connects the first area 21 and the electrode 211 of the capacitor 121 inside the one first opening 31. The other first bonding material 41 connects the first area 21 and the electrode 211 of the capacitor 122 inside the other first opening 31. The one second bonding material 42 connects the second area 22 and the electrode 212 of the capacitor 121 inside the one second opening 32. The other second bonding material 42 connects the second area 22 and the electrode 212 of the capacitor 122 inside the other second opening 32.

The third bonding material 43 connects the second area 22 and the electrode 221 of the first sub-array 310 inside the third opening 33. The fourth bonding material 44 connects the third area 23 and the electrode 222 of the second sub-array 320 inside the fourth opening 34. The fifth bonding material 45 connects the fourth area 24 and the electrode 223 of the third sub-array 330 inside the fifth opening 35. The sixth bonding material 46 connects the fifth area 25 and the electrode 229 of the cathode pad portion 390 inside the sixth opening 36.

The seventh bonding material 47 connects the fifth area 25 and the drain electrode 231 on the FET 123 inside the seventh opening 37. The eighth bonding material 48 connects the sixth area 26 and the source electrode 232 on the FET 123 inside the eighth opening 38.

The capacitor 121 and the capacitor 122, the laser beam source 131, and the FET 123 may be bonded to the submount substrate 161 using metal bonding with heat or ultrasound. In such cases, it is not necessary for the VCSEL module 160 to include the two first bonding materials 41, the two second bonding materials 42, the third bonding material 43, the fourth bonding material 44, the fifth bonding material 45, the sixth bonding material 46, the seventh bonding material 47, and the eighth bonding material 48.

As described above, the capacitor 121 and the capacitor 122, the FET 123, and the laser beam source 131 are disposed on the submount substrate 161 on the submount substrate 161. The capacitor 121 and the capacitor 122, the FET 123, and the laser beam source 131 are electrically coupled to each other through the conductive layer 171 of the submount substrate 161. The capacitor 121 and the capacitor 122, the FET 123, and the laser beam source 131 may be coupled to each other not only through the outermost surface layer of the conductive layer 171 of the submount substrate 161 but also through the via 174 and another conductive layer 171.

Some advantageous effects of the light source module 100 according to the first embodiment are described below.

In the light source module 100, the controller 140 controls the power supply circuit 110, the drive circuit 120, and the light source unit 130 so that a current I flows through the laser beam source 131 and the FET 123 as illustrated in FIG. 2, FIG. 5, and FIG. 11. One end of the capacitor 121, one end of the capacitor 122, and the source of the FET 123 are grounded. In other words, the potential at one end of the capacitor 121 and the capacitor 122 is equal to the potential at the source of the FET 123. Accordingly, the current I flows in a loop shape via the capacitor 121 and the capacitor 122.

In the light source module 100, a laser beam source 131 and a FET 123 are disposed on the submount substrate 161. Accordingly, the wiring between the laser beam source 131 and the FET 123 can be shortened. By shortening the length of wiring, the inductance parasitic to the wiring can be reduced, and the light source module 100 can be driven to flash or blink at high speed. For example, the light source module 100 can flash or blink at the frequency of 100 megahertz (MHz) when the output is 10 watts (W).

The laser beam source 131 is located between the capacitor 121 and the capacitor 122 and the FET 123 in plan view. In other words, the capacitor 121 and the capacitor 122, the laser beam source 131, and the FET 123 are arranged in the order listed in a straight line in common. Accordingly, as illustrated in FIG. 11, the conductive layer 171 of the ground potential connecting the capacitor 121 and the capacitor 122 and the FET 123 is wide, and the inductance of the path through which the current I flows is easily reduced. As the number of conductive layers 171 of the ground potential that are included in the submount substrate 161 is greater, the inductance is more likely to be reduced.

As the capacitor 121 and the capacitor 122 are also on the submount substrate 161, wiring between the capacitor 121 and the capacitor 122 and the laser beam source 131 can also be shortened. Further, as the control IC 124 is also on the submount substrate 161, the wiring between the control IC 124 and the FET 123 can be shortened.

Preferably, the distance D1 between the laser beam source 131 and the FET 123 is small, and the distance D2 between the FET 123 and the capacitor 121 and the capacitor 122 is also small.

The laser beam source 131 generates heat with the operation of the light source module 100. The heat that is generated by the laser beam source 131 is conducted to the submount substrate 161 and diffused in the submount substrate 161. The heat that is diffused in the submount substrate 161 is conducted to the base substrate 150. When the insulating layer 172 included in the submount substrate 161 is an aluminum nitride layer, the heat is easily diffused in the submount substrate 161, and is easily conducted to the base substrate 150. In other words, the light source module 100 has a desirable heat dissipation performance. Accordingly, the temperature of the laser beam source 131 is less likely to increase, and the optical output of the laser beam source 131 can be improved.

The base substrate 150 can be easily thermally connected to a housing having, for example, a heat sink or a heat-dissipating mechanism. In view of the above circumstances, for example, heat-dissipating grease or a heat-dissipating sheet may be sandwiched between the base substrate 150 and the heat sink or the housing, and then the base substrate 150 may be screwed onto the heat sink or the housing.

In particular, the laser beam source 131 is a back emission type VCSEL, and the distance between the active layer and the electrode 221, the electrode 222, and the electrode 223 is small in each of the VCSEL device 311, the VCSEL device 321, and the VCSEL device 331. Accordingly, the heat that is generated in the active layer is easily conducted to the submount substrate 161. Furthermore, as the electrodes 222 and 223 that are electrically floating are bonded to the third area 23 and the fourth area 24 by the fourth bonding material 44 and the fifth bonding material 45, respectively, heat is easily conducted from the laser beam source 131 to the submount substrate 161.

A laser beam source 131 has a first sub-array 310, a second sub-array 320 and a third sub-array 330 connected in series with each other. Accordingly, compared with a case where all of the VCSEL device 311, the VCSEL device 321, and the VCSEL device 331 are connected to each other in parallel, the current that is flowing through the laser beam source 131 is reduced, and the amount of heat generation can be reduced. The degree of parasitic capacitance is reduced compared with when all of the VCSEL device 311, the VCSEL device 321, and the VCSEL device 331 are connected to each other in parallel. Due to the reduction in current and parasitic capacitance, the driving current can flow at high speed.

When the insulating layer 172 that is included in the submount substrate 161 is an aluminum nitride layer and the substrate 101 of the laser beam source 131 is a GaAs substrate, the difference in linear expansion coefficient between the submount substrate 161 and the laser beam source 131 is small. Due to such a configuration, the thermal stress on the bonding portion between the submount substrate 161 and the laser beam source 131 can be reduced, and favorable reliability can be obtained at the bonding portion.

According to the present embodiment, the laser beam source 131 can be driven at high speed, and can flash or blink at high speed and high output power.

Accordingly, the distance-measurable range and the accuracy of distance measurement of the distance-measuring apparatus that serves as a range finder and is provided with the light source module 100 according to the first embodiment are improved.

Some characteristics or features of the light source module 100 according to the first embodiment are described below.

Figure 12:
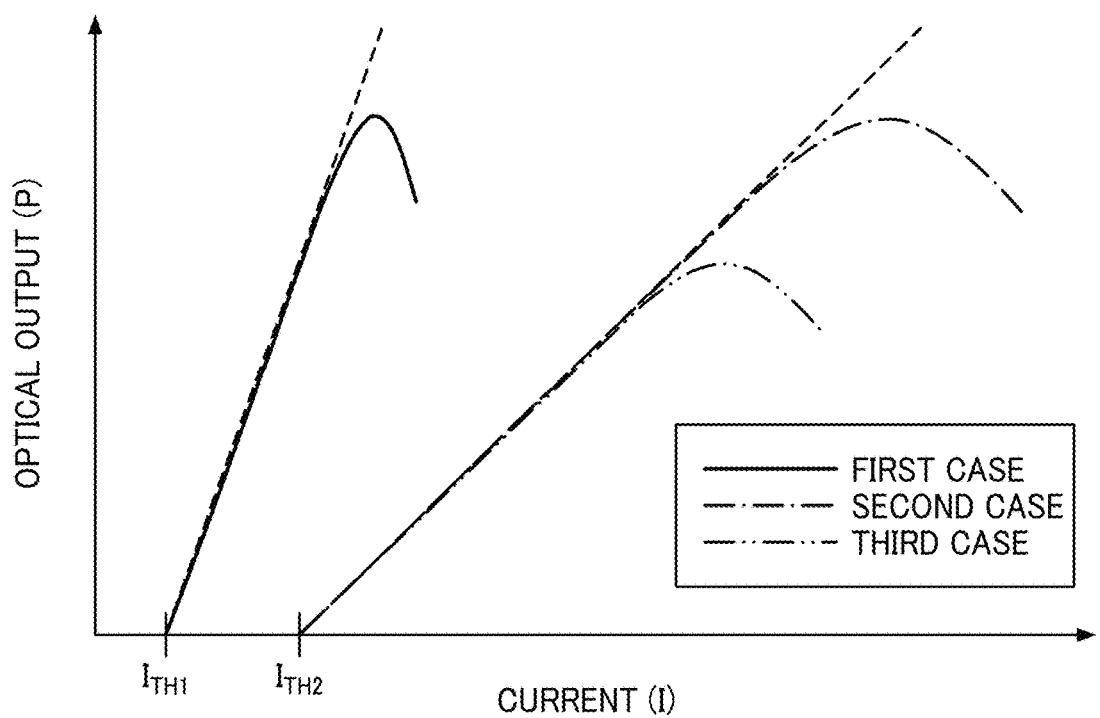
FIG. 12 is a graph illustrating the relation between the current and the optical output of a laser beam source, in a first case, a second case, and a third case according to the present disclosure.

FIG. 12 is a graph illustrating the relation between the current (I) and the optical output (P) of the laser beam source, in the first case, the second case, and the third case according to the present disclosure.

The solid line in FIG. 12 indicates the features or characteristics of the first case according to the present disclosure, and the dot-and-dash line in FIG. 12 indicates the features or characteristics of the second case according to the present disclosure. Moreover, the dot-dot-dash line in FIG. 12 indicates the features or characteristics of the third case according to the present disclosure. In the first case according to the present disclosure, the insulating layer that is included in the submount substrate is an aluminum nitride layer, and a plurality of VCSEL devices (311, 321, 331) that are included in the laser beam source make up three sub-arrays that are coupled to each other in series. In the second case according to the present disclosure, the insulating layer that is included in the submount substrate is an aluminum nitride layer, and the multiple VCSEL devices (311, 321, 331) that are included in the laser beam source are coupled to each other in parallel. In the third case according to the present disclosure, the insulating layer that is included in the submount substrate is an alumina layer, and the multiple VCSEL devices (311, 321, 331) that are included in the laser beam source are coupled to each other in parallel. The thermal conductivity of alumina is lower than that of aluminum nitride by about two orders of magnitude.

As illustrated in FIG. 12, in the second case according to the present disclosure in which the insulating layer is an aluminum nitride layer, a higher saturation output is obtained than in the third case according to the present disclosure in which the insulating layer is an alumina layer, and the maximum value of the optical output increases. In the second case according to the present disclosure, the output current is larger than that in the third case according to the present disclosure.

In the first case according to the present disclosure in which the multiple VCSEL devices (311, 321, 331) make up three sub-arrays, the slope efficiency is improved about three times compared with the second case according to the present disclosure in which the multiple VCSEL devices (311, 321, 331) are coupled to each other in parallel, and the threshold current of laser oscillation is reduced to about one third. For example, the threshold current $I_{TH1}$ in the first case according to the present disclosure is approximately one-third of the threshold current $I_{TH2}$ in the second case according to the present disclosure. As described above, when the number of the sub-arrays connected in series is N, the slope efficiency is improved about N times, and the threshold current is reduced to about 1/N times. The slope efficiency indicates the ratio ($\Delta P/\Delta I$ (W/A)) of the amount of change in optical output ($\Delta P$) to the amount of change in current ($\Delta I$), and corresponds to the slope of the broken line in FIG. 12.

According to the first case according to the present disclosure, the amount of current is reduced compared with the second case according to the present disclosure. Accordingly, the amount of heat generated in the path of the driving current can be reduced. As the threshold current of laser oscillation can be reduced, the current that contributes to the light emission can be increased, and the amount of heat generated in the path of the driving current can be reduced.

As described above, according to the first case according to the present disclosure, a high output power can be obtained with a small current.

Figure 13:
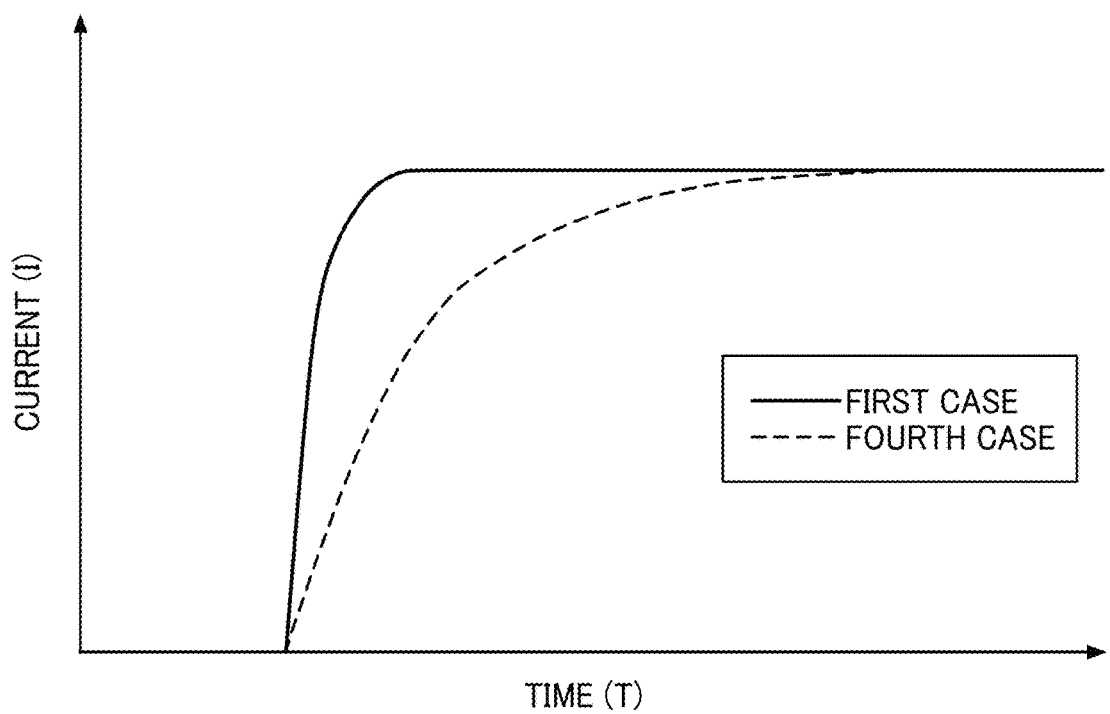
FIG. 13 is a graph illustrating the relation between time and current, in a first case and a fourth case according to the present disclosure.

FIG. 13 is a graph illustrating the relation between time (T) and current (I), in the first case and the fourth case according to the present disclosure.

Figure 14:
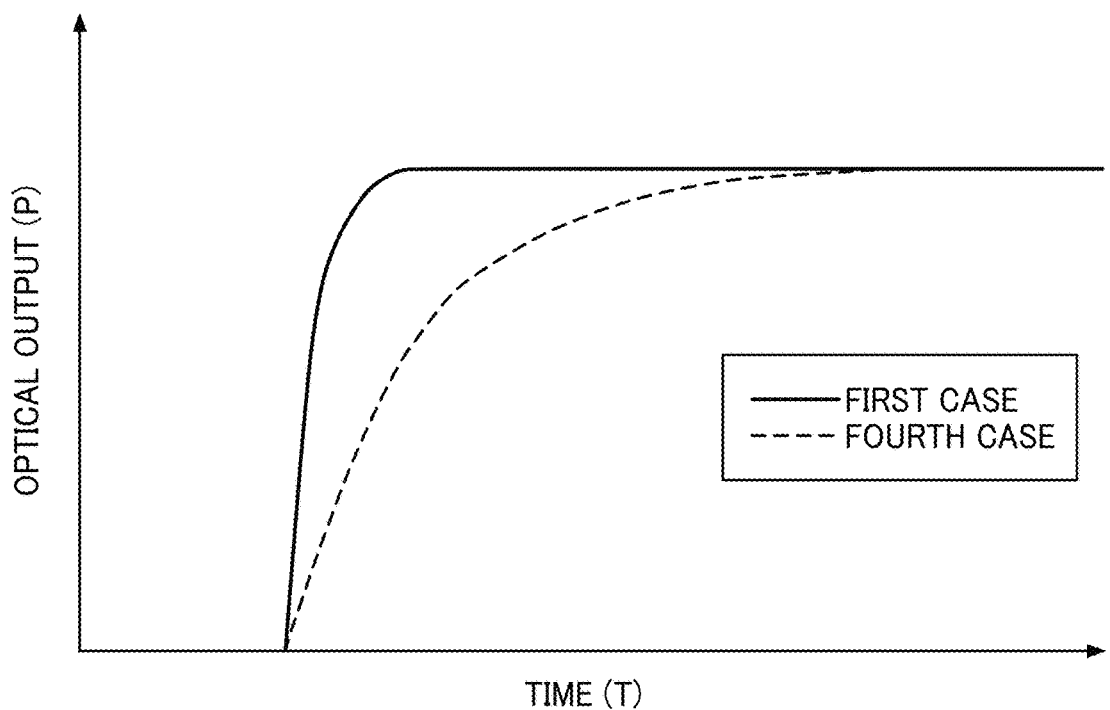
FIG. 14 is a graph illustrating the relation between time and optical output, in a first case and a fourth case according to the present disclosure.

FIG. 14 is a graph illustrating the relation between time (T) and optical output (P), according to the first case and the fourth case according to the present disclosure.

The solid lines in FIG. 13 and FIG. 14 indicate the features or characteristics in the above first case according to the present disclosure, and the broken lines in FIG. 13 and FIG. 14 indicate the features or characteristics in the fourth case according to the present disclosure. The fourth case according to the present disclosure differs from the first case according to the present disclosure in that the FET is disposed on a substrate different from the submount substrate and that the FET and the laser beam source are coupled to each other via a bonding wire.

As illustrated in FIG. 13, in the first case according to the present disclosure, the inductance parasitic to the wiring is low compared with the fourth case according to the present disclosure. Accordingly, the length of time it takes until the driving current is saturated is short. Accordingly, as illustrated in FIG. 14, the length of time it takes until the optical output is saturated is also short. In other words, according to the first case according to the present disclosure, driving can be performed at higher speed than in the fourth case according to the present disclosure.

Figure 15:
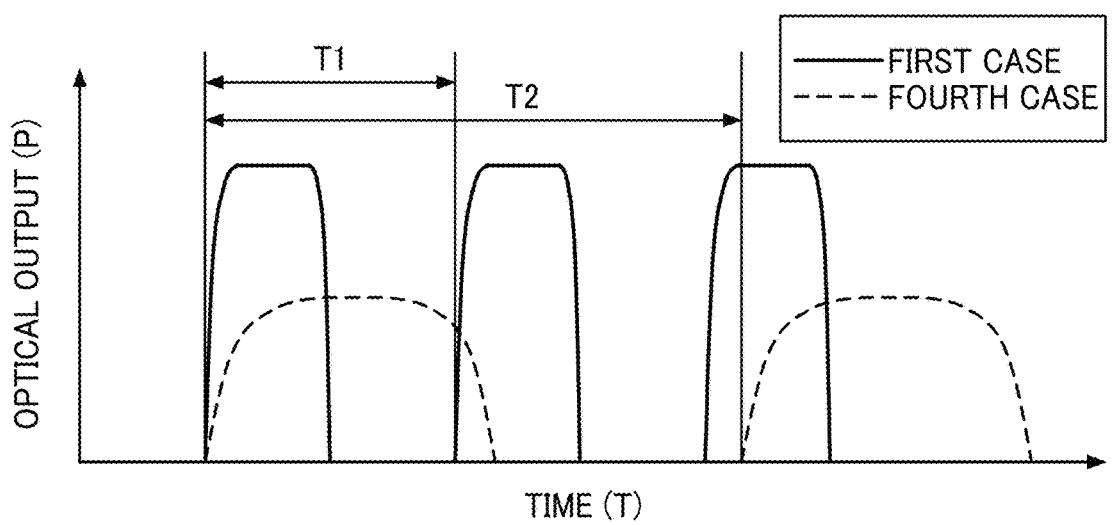
FIG. 15 is a graph illustrating the relation between time and optical output when the optical output is turned on and off in alternating sequence, in a first case and a fourth case according to the present disclosure.

FIG. 15 is a graph illustrating the relation between time (T) and optical output (P) when the optical output is turned on and off in alternating sequence, in the first case and the fourth case according to the present disclosure.

The solid lines in FIG. 15 indicate the features or characteristics in the above first case according to the present, and disclosure, and the broken lines in FIG. 15 indicate the features or characteristics in the above fourth case according to the present disclosure. In both of the first case and the fourth case according to the present disclosures, the rise time of light and the fall time of light when the turning on and turning off of the optical output is switched are set to be equal to each other.

As illustrated in FIG. 15, the cycle T1 in the first case according to the present disclosure is shorter than the cycle T2 in the fourth case according to the present disclosure. In other words, the frequency in the first case according to the present disclosure is higher than the frequency in the fourth case according to the present disclosure. In the first case according to the present disclosure, driving at high frequency is implemented as the frequency is relatively high, and the light source module can flash or blink at high speed. The light source module that can flash or blink at high speed is suitable for the illumination of a three-dimensional TOF (3D-TOF) camera, and such a 3D-TOF camera that includes the light source module can improve the range resolution while the distance is being measured.

Preferably, the center of light emission of the laser beam source 131 is around the center in the longer-side direction or the shorter-side direction of the laser beam source 131 in plan view. Due to such a configuration, the volume of the housing of the laser beam source 131 can easily be reduced.

It is not necessary for the light source module 100 to include the fourth bonding material 44 and the fifth bonding material 45. When the light source module 100 does not include the fourth bonding material 44 and the fifth bonding material 45, it is easy to reduce the size of the laser beam source 131.

Second Embodiment

A second embodiment of the present disclosure is described below.

Figure 16:
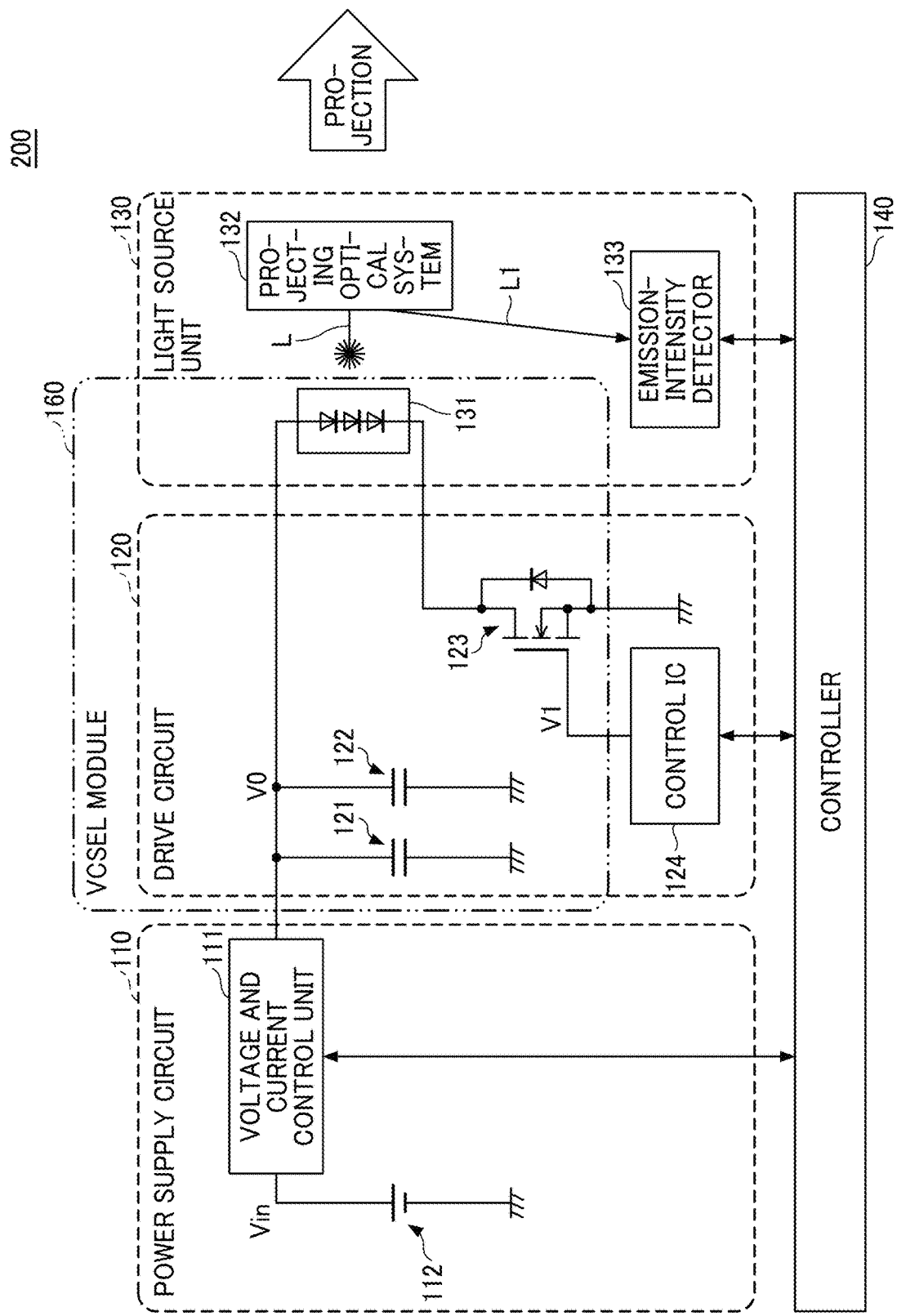
FIG. 16 is a diagram illustrating circuitry of a light source module according to a second embodiment of the present disclosure.

FIG. 16 is a diagram illustrating the circuitry of a light source module 200 according to the second embodiment of the present disclosure.

Figure 17:
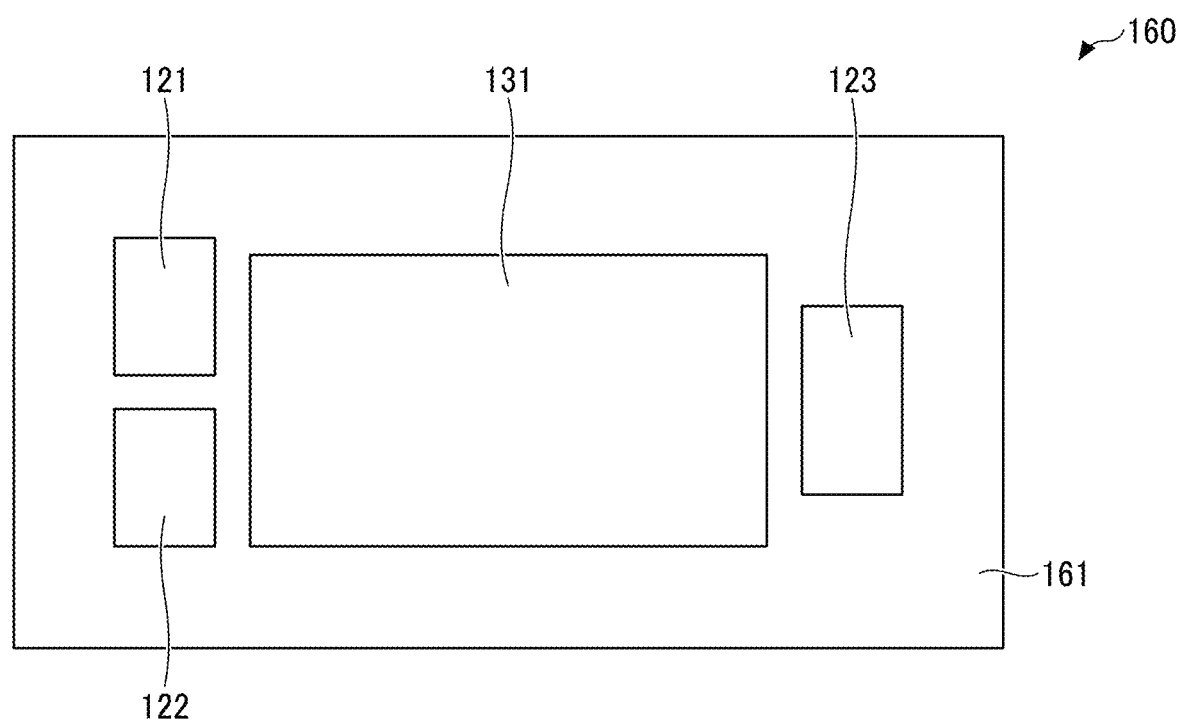
FIG. 17 is a top view of a VCSEL module in a light source module, according to the second embodiment of the present disclosure.

FIG. 17 is a top view of the VCSEL module 160 in the light source module 200, according to the second embodiment of the present disclosure.

Figure 18:
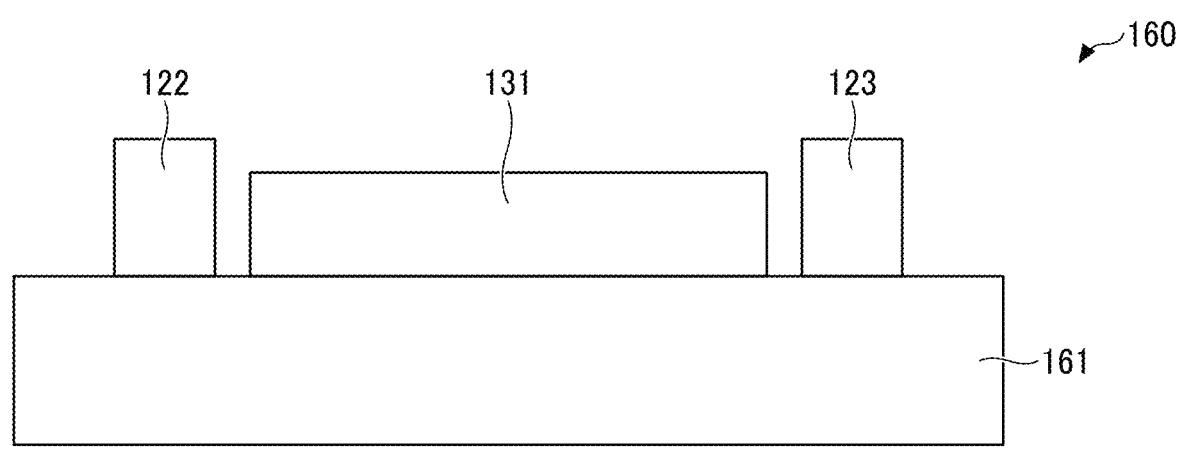
FIG. 18 is a side view of a VCSEL module in a light source module, according to the second embodiment of the present disclosure.

FIG. 18 is a side view of the VCSEL module 160 in the light source module 200, according to the second embodiment of the present disclosure.

In FIG. 18, a portion of the fixation member 162 is omitted.

As illustrated in FIG. 16 to FIG. 18, in the light source module 200 according to the second embodiment, the VCSEL module 160 includes a submount substrate 161, capacitor 121 and the capacitor 122, a FET 123, and a laser beam source 131. The control IC 124, the projection optical system 132, and the emission-intensity detector 133 are arranged outside the VCSEL module 160. For example, the control IC 124, the projection optical system 132, and the emission-intensity detector 133 are disposed on the base substrate 150.

Also in the second embodiment, the laser beam source 131 is disposed between the pair of capacitor 121 and the capacitor 122 and the FET 123. In other words, in a plan view in a direction perpendicular to the front side of the submount substrate 161, the pair of capacitor 121 and the capacitor 122, the laser beam source 131, and the FET 123 are arranged in a straight line in the order listed.

The other aspects of the configuration according to the present embodiment are equivalent to those of the first embodiment as described above.

Also with the configuration or structure according to the second embodiment of the present disclosure, advantageous effects similar to those of the first embodiment as described above can be achieved. According to the second embodiment of the present disclosure, the size of the VCSEL module 160 can be reduced. The reduction in size of the VCSEL module 160 leads to the reduction in size of the submount substrate 161. When the submount substrate 161 is mounted on the base substrate 150, reflow using solder is performed. When the amount of thermal deformation on the submount substrate 161 is large, there is some concern that cracks, crazing, or peeling may occur in the solder when cooled in the reflow. As the amount of thermal deformation is reduced due to the miniaturization of the submount substrate 161, it is easy to prevent the occurrence of these cracks, crazing, or peeling.

Third Embodiment

A third embodiment of the present disclosure is described below.

Figure 19:
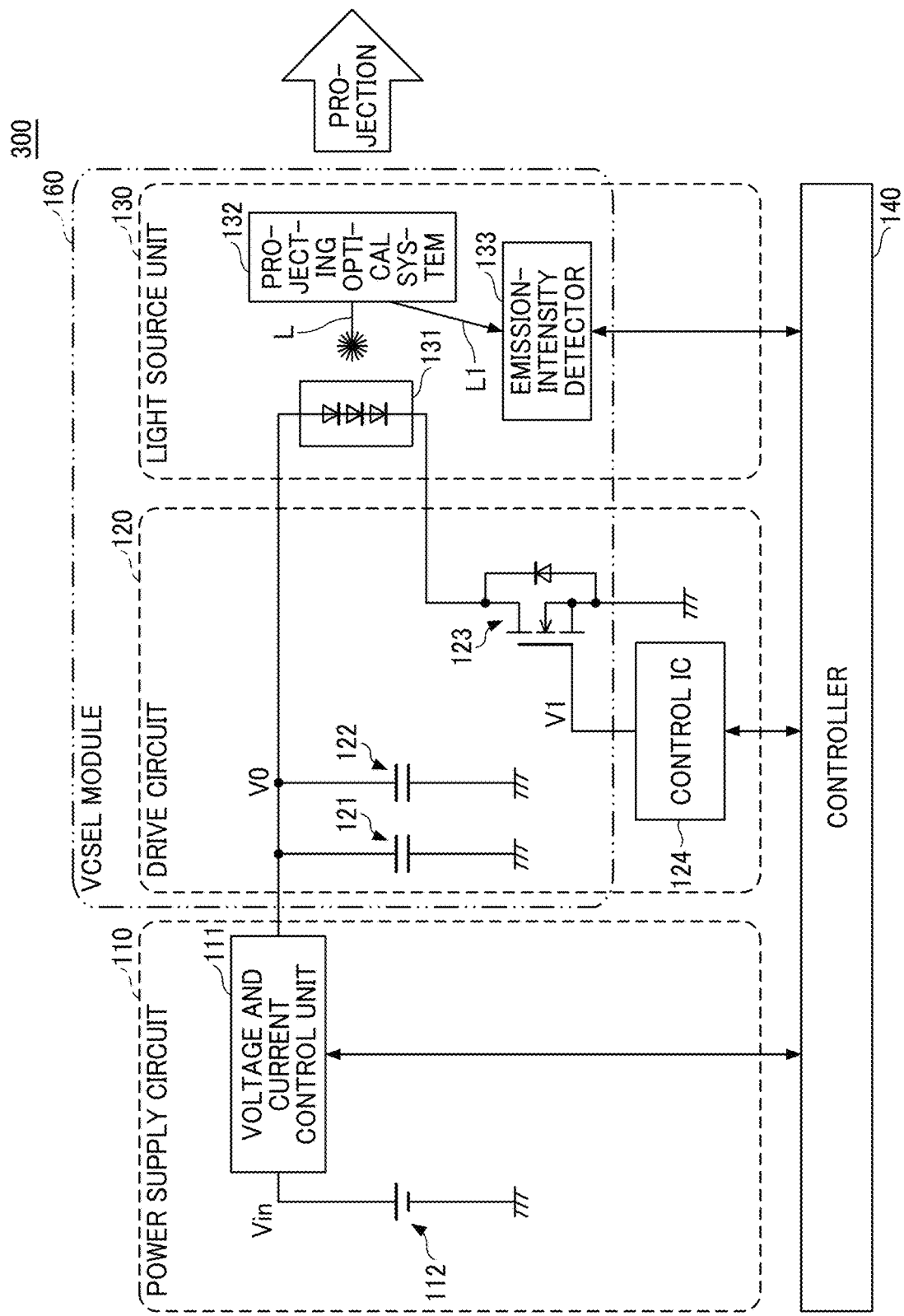
FIG. 19 is a diagram illustrating circuitry of a light source module according to a third embodiment of the present disclosure.

FIG. 19 is a diagram illustrating the circuitry of a light source module 300 according to the third embodiment of the present disclosure.

Figure 20:
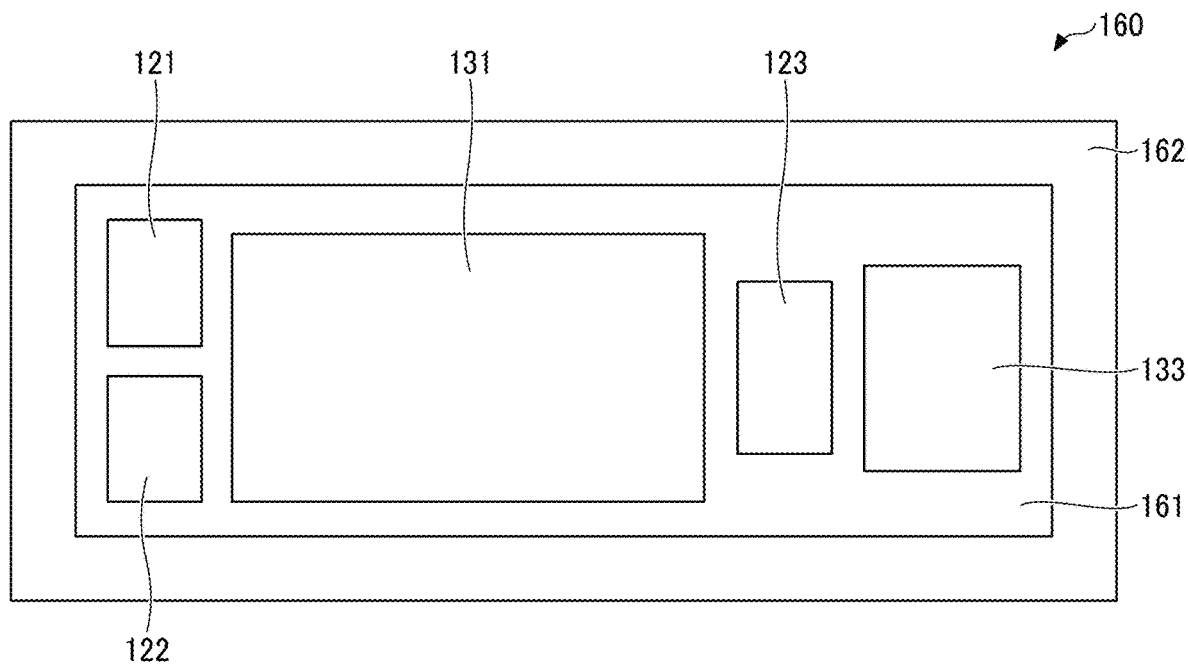
FIG. 20 is a top view of a VCSEL module in a light source module, according to the third embodiment of the present disclosure.

FIG. 20 is a top view of the VCSEL module 160 in the light source module 300, according to the third embodiment of the present disclosure.

Figure 21:
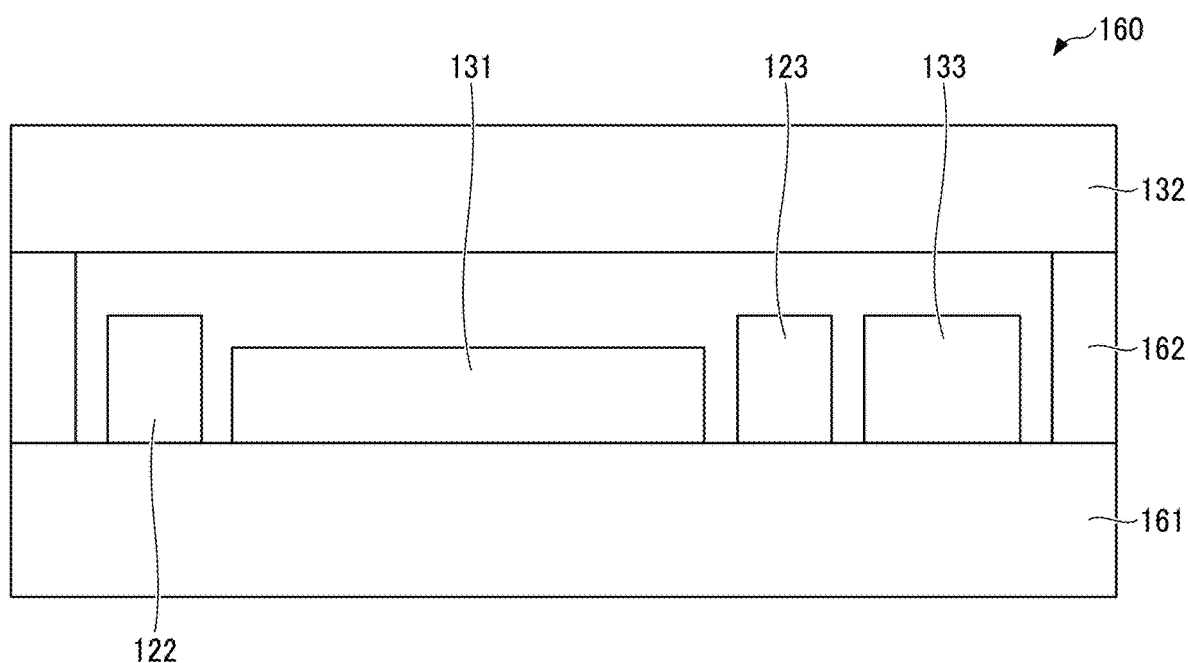
FIG. 21 is a side view of a VCSEL module in a light source module, according to the third embodiment of the present disclosure.

FIG. 21 is a side view of the VCSEL module 160 in the light source module 300, according to the third embodiment of the present disclosure.

In FIG. 20, the projection optical system 132 is omitted.
In FIG. 21, a portion of the fixation member 162 is omitted.

As illustrated in FIG. 19 to FIG. 21, in the light source module 300 according to the third embodiment of the present disclosure, the VCSEL module 160 includes the submount substrate 161, the capacitor 121, the capacitor 122, the FET 123, and a laser beam source 131, the projection optical system 132, the emission-intensity detector 133, and the fixation member 162. The control IC 124 is external to the VCSEL module 160. For example, the control IC 124 is disposed on the base substrate 150.

Also in the third embodiment, the laser beam source 131 is disposed between the pair of capacitor 121 and the capacitor 122 and the FET 123. In other words, in a plan view in a direction perpendicular to the front side of the submount substrate 161, the pair of capacitor 121 and the capacitor 122, the laser beam source 131, and the FET 123 are arranged in a straight line in the order listed.

The other aspects of the configuration according to the present embodiment are equivalent to those of the first embodiment as described above.

Also with the configuration or structure according to the third embodiment of the present disclosure, advantageous effects similar to those of the first embodiment of the present disclosure as described above can be achieved. According to the third embodiment of the present disclosure, the size of the VCSEL module 160 can be reduced.

Fourth Embodiment

A fourth embodiment of the present disclosure is described below.

Figure 22:
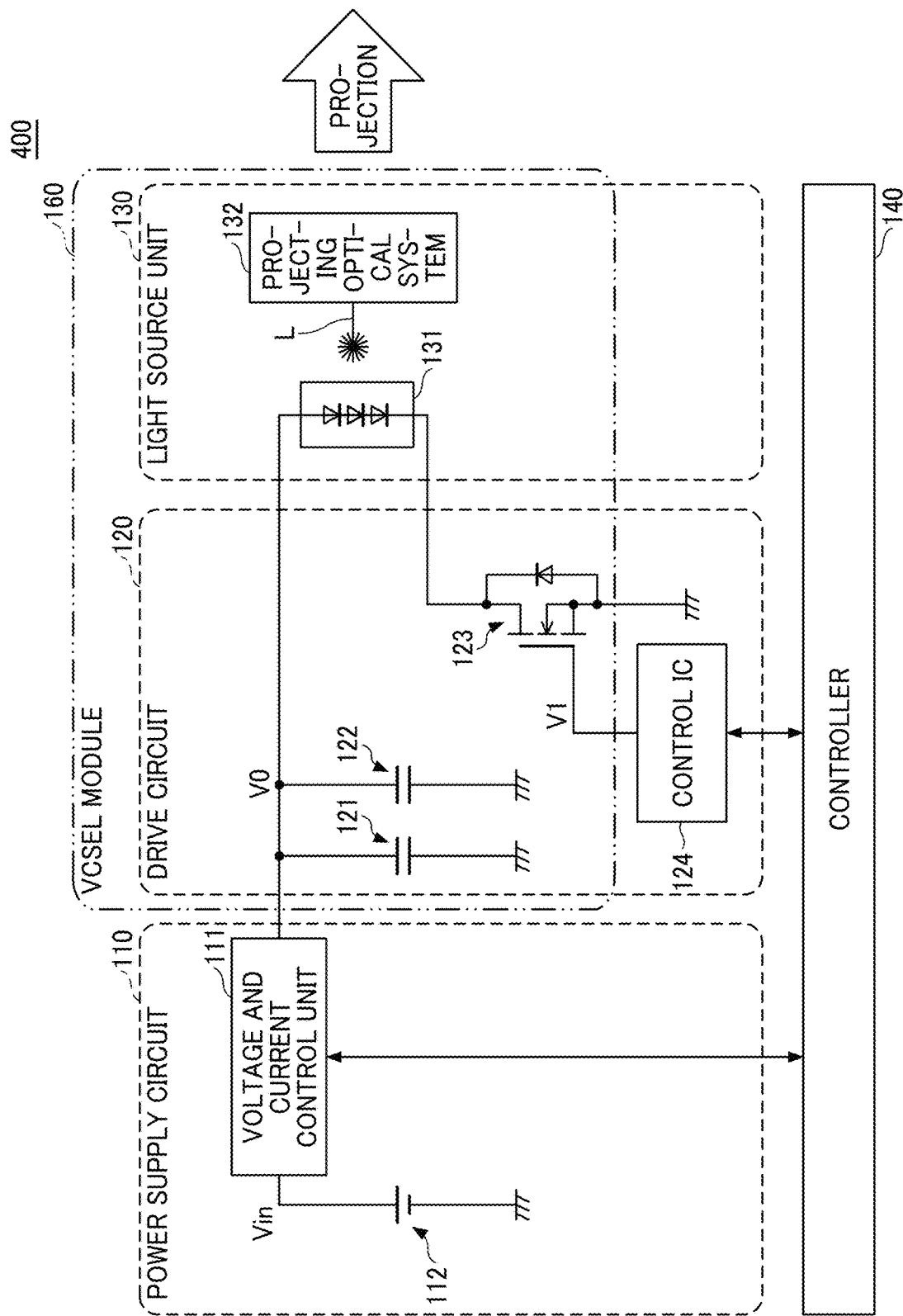
FIG. 22 is a diagram illustrating circuitry of a light source module according to a fourth embodiment of the present disclosure.

FIG. 22 is a diagram illustrating the circuitry of a light source module 400 according to the fourth embodiment of the present disclosure.

Figure 23:
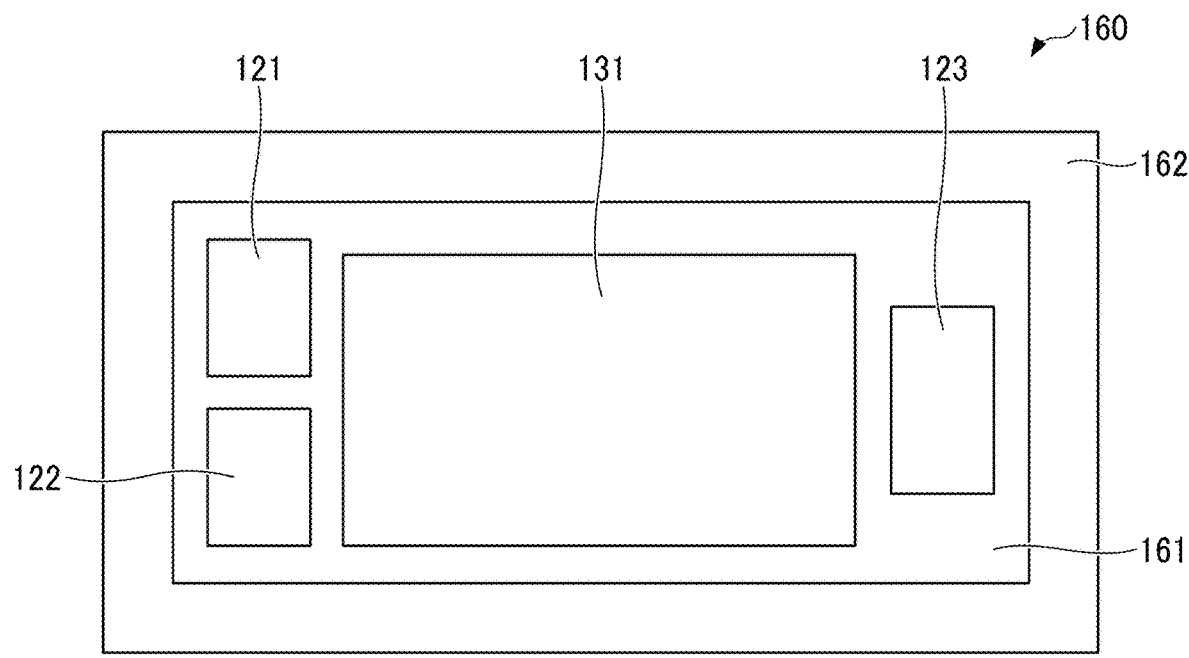
FIG. 23 is a top view of a VCSEL module in a light source module, according to the fourth embodiment of the present disclosure.

FIG. 23 is a top view of the VCSEL module 160 in the light source module 400, according to the fourth embodiment of the present disclosure.

Figure 24:
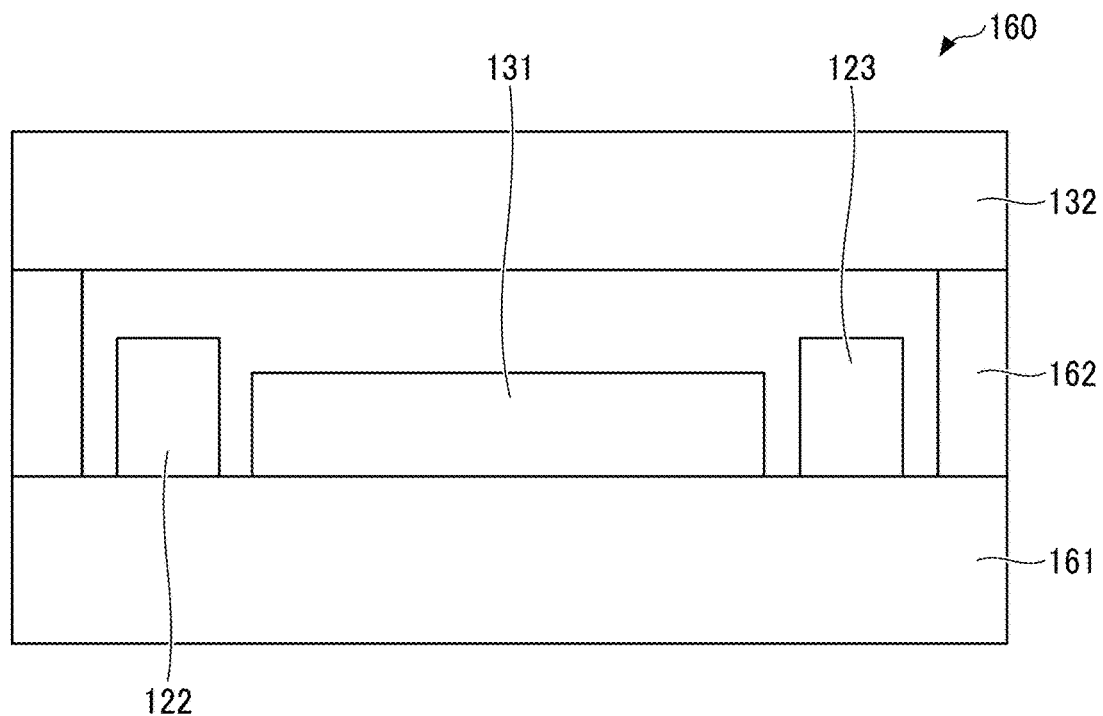
FIG. 24 is a side view of a VCSEL module in a light source module, according to the fourth embodiment of the present disclosure.

FIG. 24 is a side view of the VCSEL module 160 in the light source module 400, according to the fourth embodiment of the present disclosure.

In FIG. 23, the projection optical system 132 is omitted.
In FIG. 24, a portion of the fixation member 162 is omitted.

As illustrated in FIG. 22 to FIG. 24, in the light source module 400 according to the fourth embodiment, the light source unit 130 does not include the emission-intensity detector 133. The VCSEL module 160 according to the present embodiment includes the submount substrate 161, the capacitor 121, the capacitor 122, the FET 123, the laser beam source 131, the projection optical system 132, and the fixation member 162. The control IC 124 is arranged outside the VCSEL module 160. For example, the control IC 124 is disposed on the base substrate 150.

Also in the fourth embodiment, the laser beam source 131 is disposed between the pair of capacitor 121 and the capacitor 122 and the FET 123. In other words, in a plan view in a direction perpendicular to the front side of the submount substrate 161, the pair of capacitor 121 and the capacitor 122, the laser beam source 131, and the FET 123 are arranged in a straight line in the order listed.

The other aspects of the configuration according to the present embodiment are equivalent to those of the first embodiment as described above.

Also with the configuration or structure according to the fourth embodiment of the present disclosure, advantageous effects similar to those of the first embodiment as described above can be achieved. According to the fourth embodiment of the present disclosure, the size of the VCSEL module 160 can be reduced.

Fifth Embodiment

A fifth embodiment of the present disclosure is described below.

Figure 25:
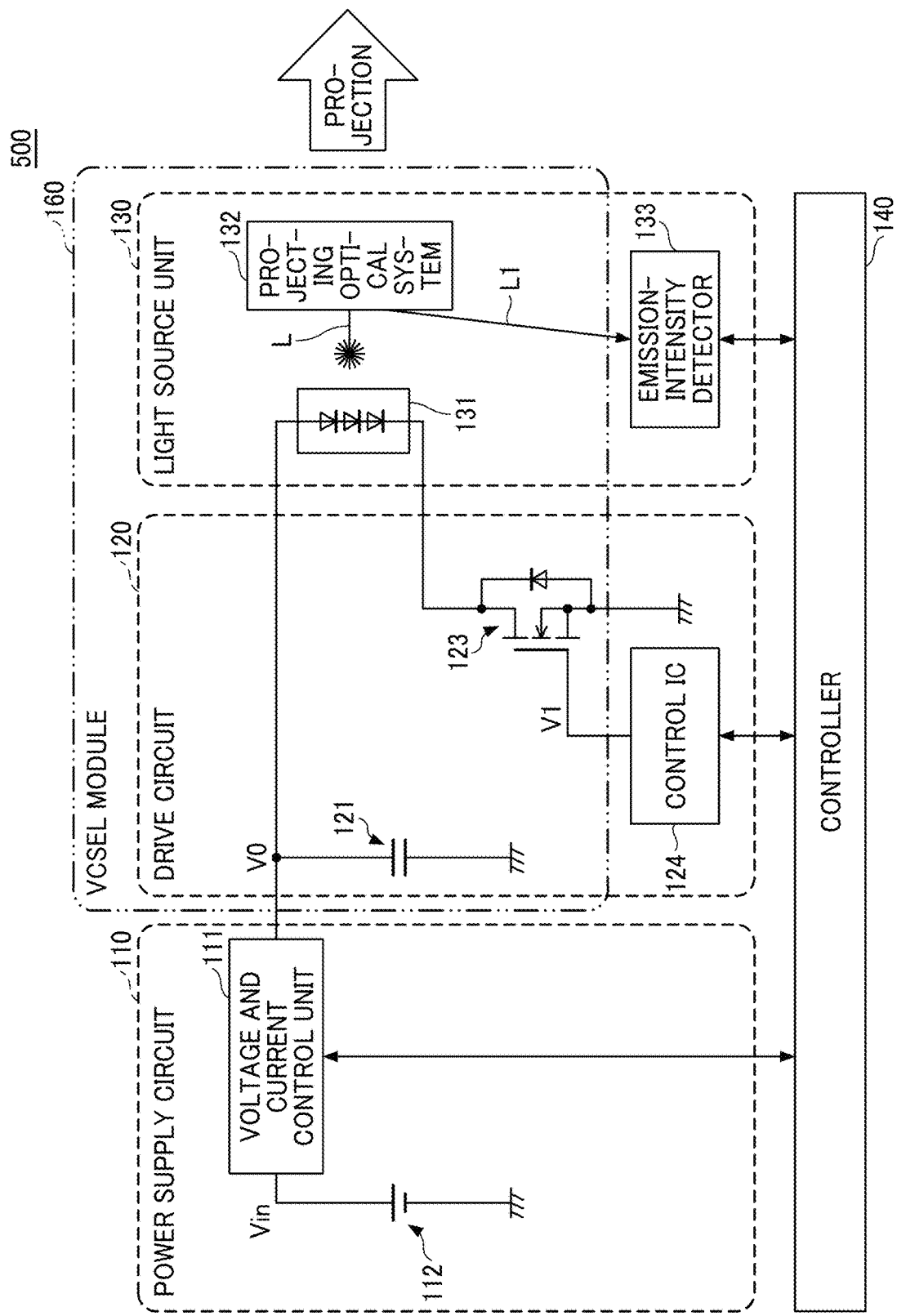
FIG. 25 is a diagram illustrating circuitry of a light source module according to a fifth embodiment of the present disclosure.

FIG. 25 is a diagram illustrating the circuitry of a light source module 500 according to the fifth embodiment of the present disclosure.

Figure 26:
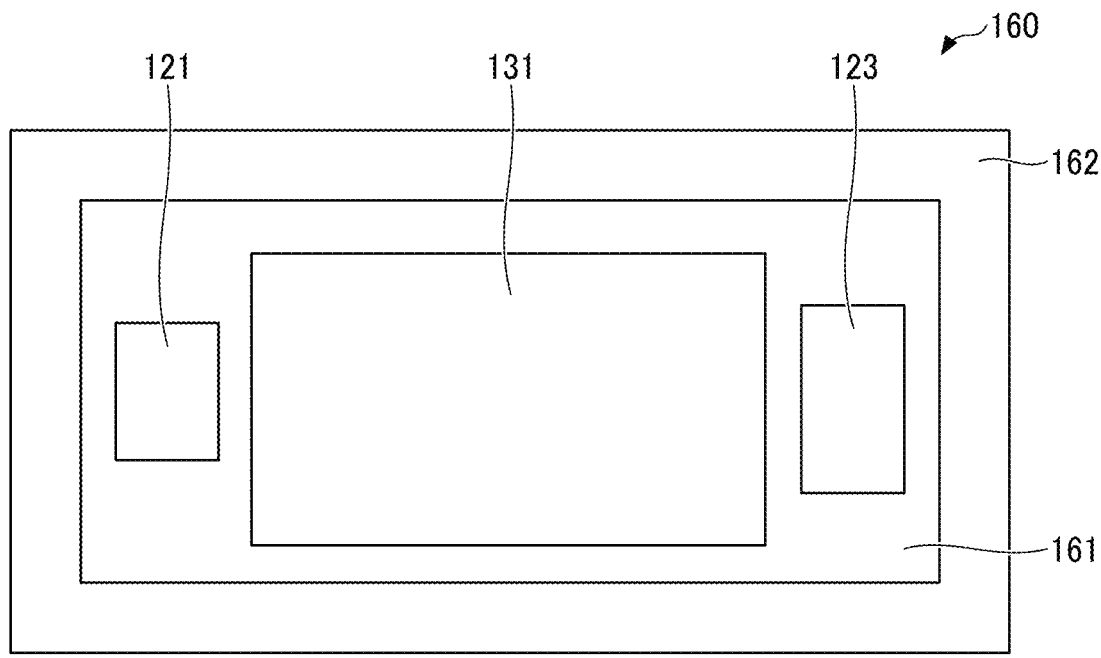
FIG. 26 is a top view of a VCSEL module in a light source module, according to the fifth embodiment of the present disclosure.

FIG. 26 is a top view of the VCSEL module 160 in the light source module 500, according to the fifth embodiment of the present disclosure.

Figure 27:
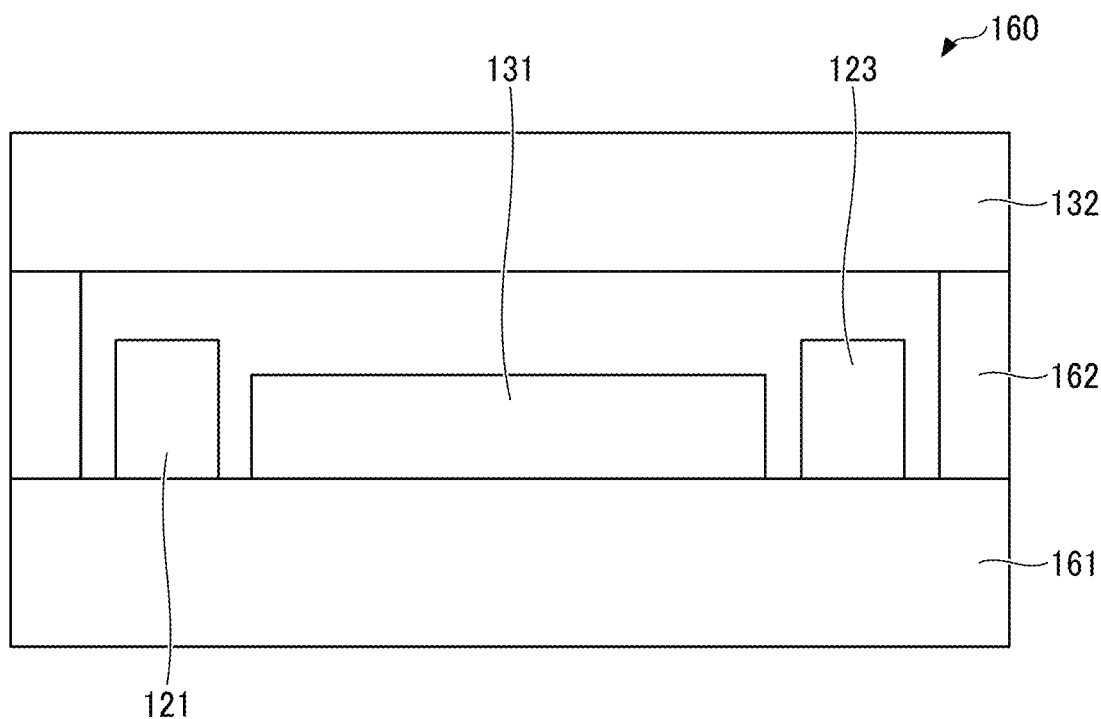
FIG. 27 is a side view of a VCSEL module in a light source module, according to the fifth embodiment of the present disclosure.

FIG. 27 is a side view of the VCSEL module 160 in the light source module 500, according to the fifth embodiment of the present disclosure.

In FIG. 26, the projection optical system 132 is omitted. In FIG. 27, a portion of the fixation member 162 is omitted.

As illustrated in FIG. 25 to FIG. 27, in the light source module 500 according to the fifth embodiment, the drive circuit 124) does not include the capacitor 122. The VCSEL module 160 according to the present embodiment includes the submount substrate 161, the capacitor 121, the FET 123, the laser beam source 131, the projection optical system 132, and the fixation member 162. The control IC 124 and the emission-intensity detector 133 are arranged outside the VCSEL module 160. For example, the control IC 124 and the emission-intensity detector 133 are disposed on the base substrate 150.

In the fifth embodiment of the present disclosure, the laser beam source 131 is disposed between the capacitor 121 and the FET 123. In other words, in a plan view in a direction perpendicular to the front side of the submount substrate 161, the pair of capacitor 121, the laser beam source 131, and the FET 123 are arranged in a straight line in the order listed.

The other aspects of the configuration according to the present embodiment are equivalent to those of the first embodiment as described above.

Also with the configuration or structure according to the fifth embodiment of the present disclosure, advantageous effects similar to those of the first embodiment of the present disclosure as described above can be achieved. According to the fifth embodiment of the present disclosure, the size of the VCSEL module 160 can be reduced.

Sixth Embodiment

A sixth embodiment of the present disclosure is described below.

Figure 28:
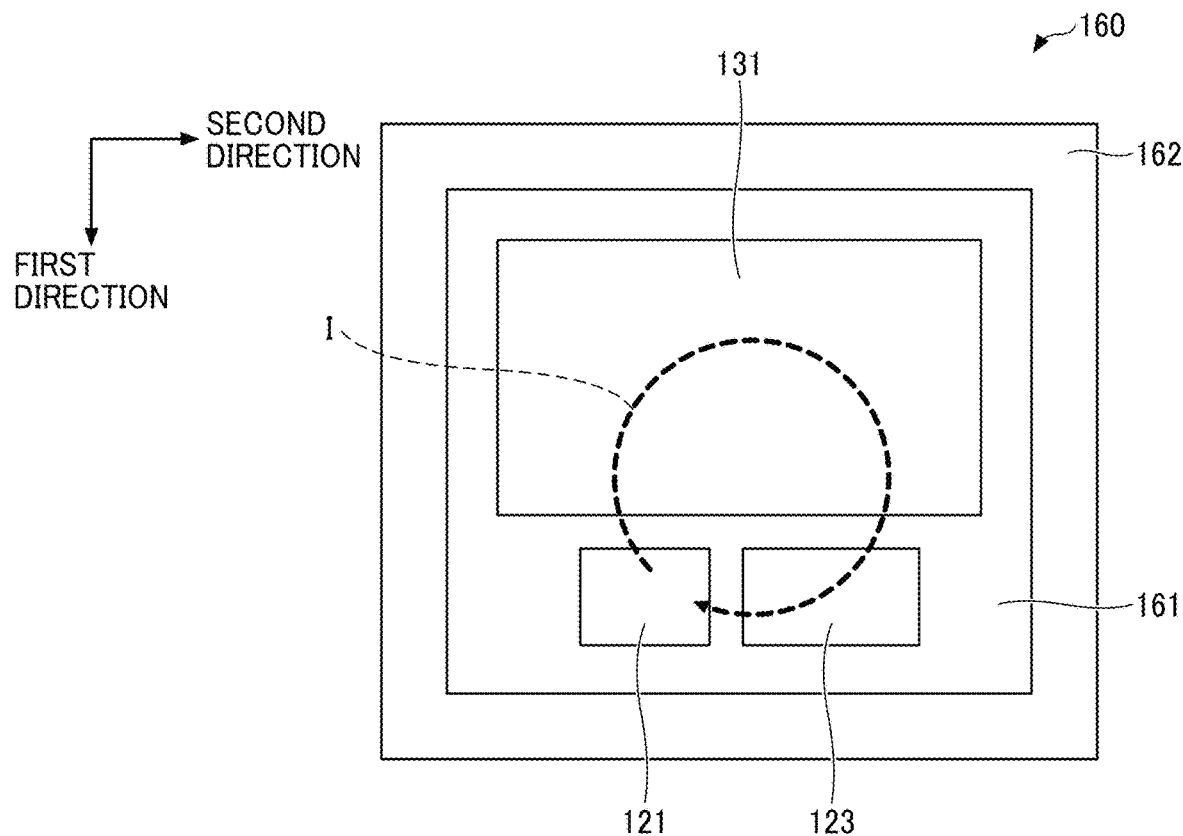
FIG. 28 is a top view of a VCSEL module in a light source module, according to a sixth embodiment of the present disclosure.

FIG. 28 is a top view of the VCSEL module 160 in a light source module, according to the sixth embodiment of the present disclosure.

Figure 29:
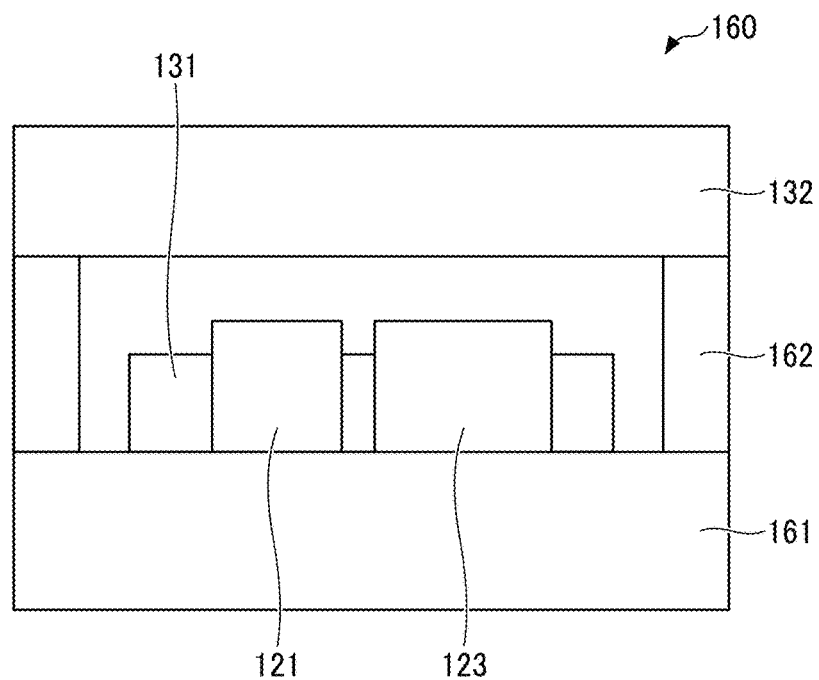
FIG. 29 is a side view of a VCSEL module in a light source module, according to the sixth embodiment of the present disclosure.

FIG. 29 is a side view of the VCSEL module 160 in a light source module, according to the sixth embodiment of the present disclosure.

In FIG. 28, the projection optical system 132 is omitted. In FIG. 29, a portion of the fixation member 162 is omitted.

As illustrated in FIG. 28 and FIG. 29, in plan view in a direction perpendicular to the front face of the submount substrate 161, the capacitor 121 and the FET 123 are located on the first direction side of the laser beam source 131, and the capacitor 121 and the FET 123 are aligned in a row in rows in a second direction perpendicular to the first direction.

The other aspects of the configuration according to the present embodiment are equivalent to those of the fifth embodiment as described above.

In the sixth embodiment of the present disclosure, the path of the current I is in an annular shape in plan view. Due to such a configuration, in a similar manner to the first embodiment of the present disclosure, the inductance parasitic to the wiring can be reduced, and advantageous effects similar to those of the first embodiment of the present disclosure as described above can be achieved. In the sixth embodiment of the present disclosure, it is easy to form the planar shape of the submount substrate 161 into a shape close to a square.

Accordingly, the anisotropy of the planar shape of the submount substrate 161 can be reduced, and the anisotropy of the thermal deformation amount at the time of reflow can be reduced. Accordingly, the reliability of mounting can be improved.

In the first to sixth embodiments of the present disclosure, it is not necessary for the drive circuit 120 to include the control IC 124, and the controller 140 may include the control IC 124.

The projection optical system 132 in some cases according to the present disclosure is described below.

Figure 30A:
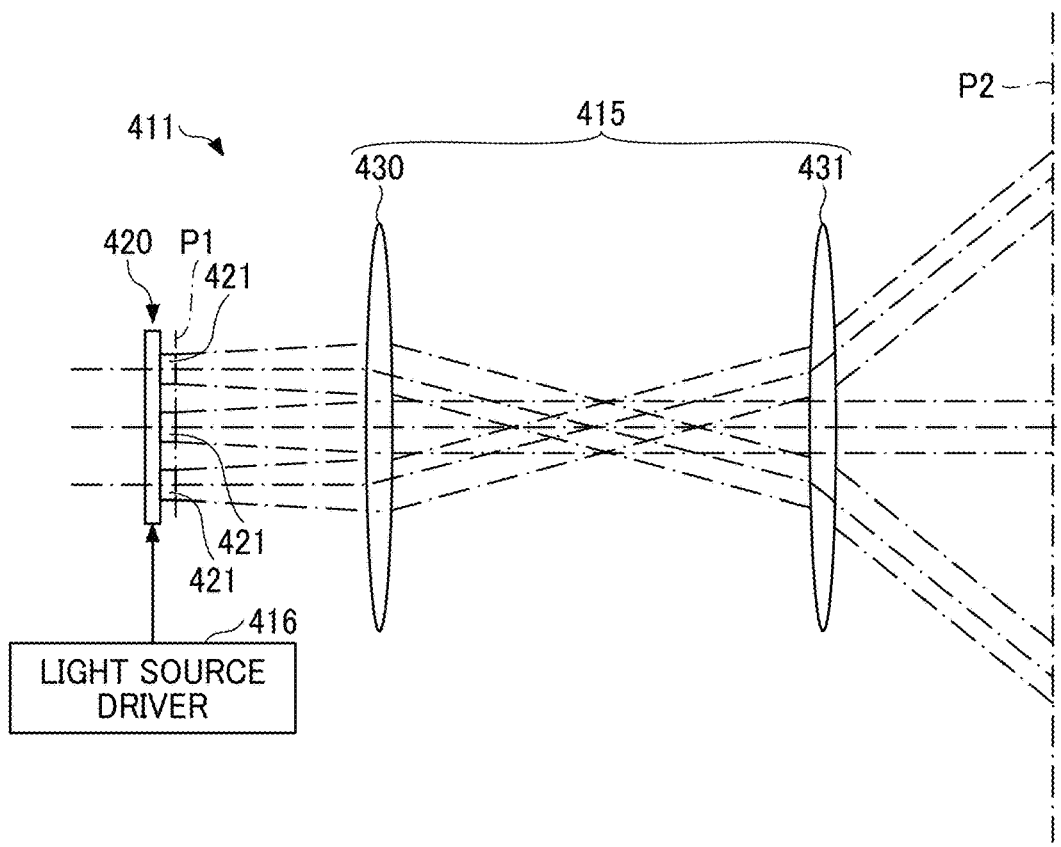
FIG. 30A and FIG. 30B are diagrams each illustrating a reference state of a projection optical system in a first case according to the present disclosure.
Figure 30B:
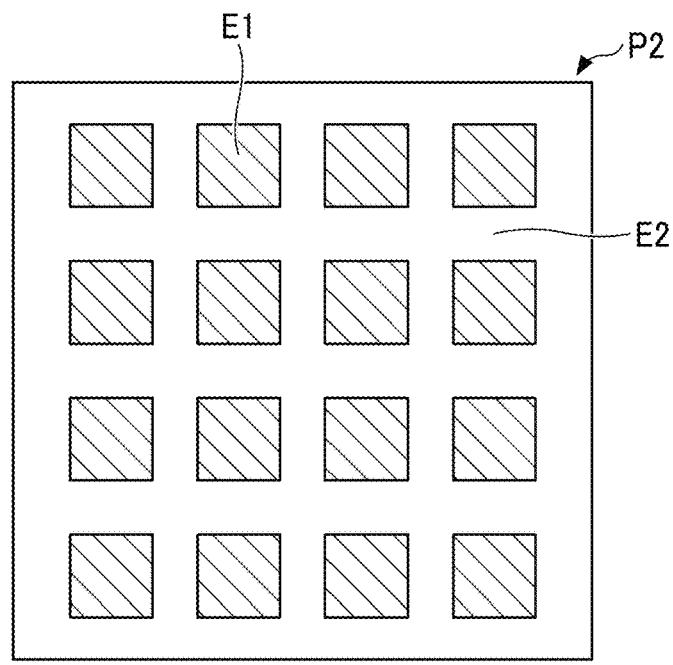

FIG. 30A and FIG. 30B are diagrams each illustrating a reference state of the projection optical system 415 in a first case according to the present disclosure.

More specifically, FIG. 30A illustrates a configuration or structure of the light source module that includes the projection optical system 415, and FIG. 30B illustrates an state of irradiation on an irradiation face P2 by the light source module, in the first case according to the present disclosure.

Figure 31A:
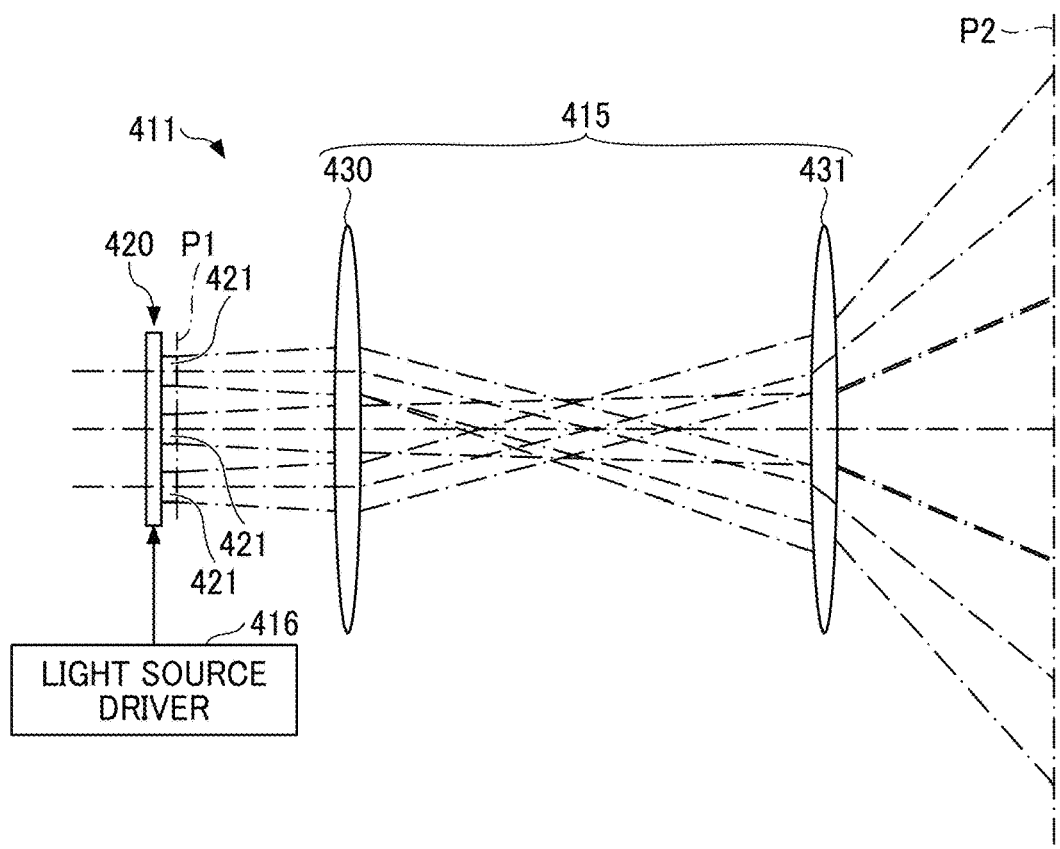
FIG. 31A and FIG. 31B are diagrams each illustrating how an irradiation area of a projection optical system is adjusted, in the first case according to the present disclosure.
Figure 31B:
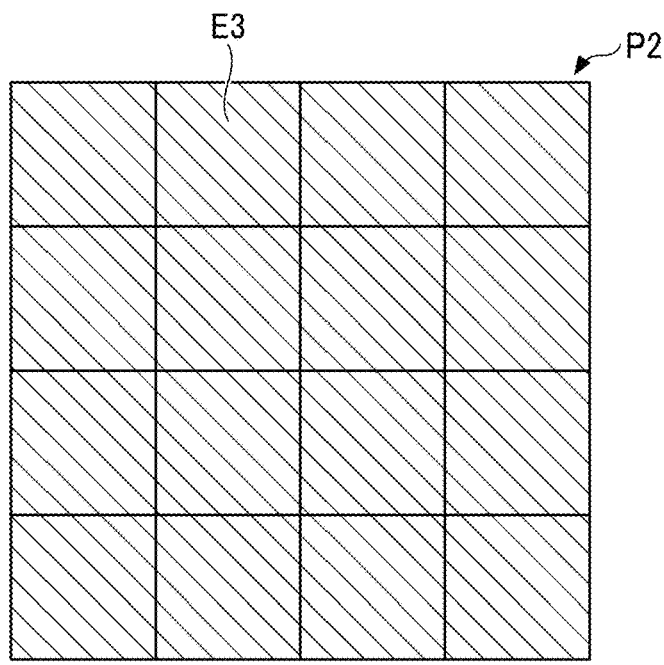

FIG. 31A and FIG. 31B are diagrams each illustrating how an irradiation area of the projection optical system 415 is adjusted, in the first case according to the present disclosure.

More specifically, FIG. 31A illustrates a configuration or structure of the light source module that includes the projection optical system 415, and FIG. 31B illustrates an state of irradiation on the irradiation face P2 by the light source module.

As illustrated in FIG. 30A and FIG. 31A, the projection optical system 415 includes a condenser lens 430 that serves as a condensing optical element and a projector lens 431 that serves as a magnifying optical element. The condenser lens 430 is a lens having positive power, and can form a conjugate image of each one of the multiple surface-emitting laser devices 421 by preventing a divergence angle of light emitted from each one of the multiple surface-emitting laser devices 421 of the surface-emitting laser 420. The multiple surface-emitting laser devices 421 correspond to the VCSEL device 311, the VCSEL device 321, and the VCSEL device 331, and the surface-emitting laser 420 corresponds to the laser beam source 131. The projector lens 431 is a lens having a negative power, and projects the light transmitted through the condenser lens 430 with a widened illuminating angle to a wider irradiation area than that of the light-emitting surface P1 of the surface-emitting laser 420. The range of the irradiation area and the degree of magnification of the conjugate image are determined by the curvature of the lens surface of the projector lens 431.

The configuration or structure of the projection optical system 415 is not limited to the first case according to the present disclosure as illustrated in FIG. 30A and FIG. 31A. The condensing optical element that makes up the projection optical system 415 is satisfactory as long as it can control the divergence angle of the light emitted from the surface-emitting laser 420 of the light source, and for example, a diffraction grating may be used in addition to or in place of the lens. When a lens is used as the condensing optical element, the condensing optical element may be, for example, a common lens that can transmit light from the multiple surface-emitting laser devices 421, and a microlens array including a plurality of lenses that correspond to the surface-emitting laser devices 421 on a one-by-one basis. The light projecting optical element in the projection optical system 415 may be any element as long as it spreads light, and for example, a double-concave lens, a negative meniscus lens, and a diffusing board may be used. When lenses are used in both the condensing optical element and the light projecting optical element, the lenses that are arranged in the optical-axis direction may be a single lens or a lens group consisting of a plurality of lenses.

FIG. 30A illustrates a light source module 411 in which the focal distance of the condenser lens 430 is equal to the distance between the light-emitting surface P1 of the surface-emitting laser 420 to the condenser lens 430. Such a state as illustrated in FIG. 30A is referred to as a reference state of the projection optical system 415 in the light source module 411. When the projection optical system 415 is in the reference state, the light that is emitted from each one of the multiple surface-emitting laser devices 421 of the surface-emitting laser 420 is collimated by the condenser lens 430, and a conjugate image of each one of the multiple surface-emitting laser devices 421 is formed at any position on the optical path after the light has passed through the condenser lens 430. In other words, the light-emitting surface P1 and the irradiation face P2 are approximately in a conjugate relation. The irradiation face P2 is a virtual plane set to facilitate understanding of an optical state, and an actual object to be detected is not limited to a plane but may have various kinds of shapes. The light source module 411 in the first case according to the present disclosure is equivalent to the light source module according to any one of the first to sixth embodiments of the present disclosure.

FIG. 30B illustrates an irradiation area on the irradiation face P2 in the reference state of the projection optical system 415, in the first case according to the present disclosure. In the surface-emitting laser 420, there are gaps between each pair of the multiple surface-emitting laser devices 421. Accordingly, in a reference state where a conjugate image of each one of the multiple surface-emitting laser devices 421 is formed, discrete irradiation areas E1 having gaps therebetween appear on the irradiation face P2. More specifically, the multiple irradiation regions E1 are regions irradiated with light on the irradiation face P2, and the multiple irradiation regions E1 are present in a positional relation corresponding to the arrangement of the multiple surface-emitting laser devices 421 of the surface-emitting laser 420. A non-irradiation area E2 that is not irradiated with light and has a degree of illuminance lower than that of each of the irradiation areas E1 exists in the space among the discretely-arranged multiple irradiation areas E1. The non-irradiation area E2 is a region corresponding to a space portion between the multiple surface-emitting laser devices 421 in the surface-emitting laser 420. In other words, when the projection optical system 415 is in the reference state, the illuminance increases discretely on the irradiation plane P2 of the irradiation face, and even illuminance cannot be obtained.

FIG. 31A illustrates a state in which the condenser lens 430 is slightly shifted toward the object and the light-emitting surface P1 in the optical-axis direction from the reference state (see FIG. 30A) of the projection optical system 415. Such a state is referred to as an adjustment state of the irradiation area of the projection optical system 415 in the light source module 411. In the adjustment state of the irradiation area, the condenser lens 430 is shifted. By so doing, the light that is emitted from each one of the multiple surface-emitting laser devices 421 is not completely collimated and diverges. As a result, the image of each one of the multiple surface-emitting laser devices 421 is spread compared with the above-described reference state. As a result, as illustrated in FIG. 31B, an entire irradiation area E3 that is irradiated with light so as to fill the regions corresponding to the gaps among the multiple surface-emitting laser devices 421 is obtained on the irradiation face P2.

How much the condenser lens 430 is shifted from the reference state to be led to the adjustment state of the irradiation area varies depends on the specifications and various kinds of conditions of the projection optical system 415 and the surface-emitting laser 420. In the configuration of the light source module 411, the condenser lens 430 is shifted toward the object and the light-emitting surface P1 within a range of 15% to 24% with respect to the distance from the light-emitting surface P1 of the surface-emitting laser 420 to the condenser lens 430 in the reference state, which corresponds to the focal distance of the condenser lens 430. As a result, the entire irradiation area E3 having a wide angle and even illuminance can be obtained. When the amount of shifting of the condenser lens 430 falls below the lower limit (15%) of the above range, the irradiation area on the irradiation face P2 corresponding to each one of the multiple surface-emitting laser devices 421 is narrowed, and a non-irradiation area E2 as illustrated in FIG. 30B appears. If the amount of shifting of the condenser lens 430 exceeds the upper limit (24%) of the above range, the angle of incidence of the light on the projector lens 431 may become too wide. As a result, the influence of aberration in the irradiation area on the irradiation face P2 increases, and the evenness of illuminance may be impaired.

In the projection optical system 415, light projection that does not generate the non-irradiation area E2 can also be realized by changing the curvature of the lens surface of the projector lens 431, in addition to the above-described methods in which the position of the condenser lens 430 in the optical-axis direction is shifted. More specifically, the conjugate image of each one of the multiple surface-emitting laser devices 421 is made incident on the projector lens 431, and the image of each one of the multiple surface-emitting laser devices 421 is expanded by changing the curvature of the lens surface of the projector lens 431. Upon that setting, the projector lens 431 is selected that provides an appropriate irradiation area, i.e., the entire irradiation area E2, and does not include the non-irradiation area E3. In such methods, operation is enabled in which only the projector lens 431 is replaced depending on the area to be irradiated with light, without changing the combination and arrangement of the surface-emitting laser 420 and the condenser lens 430. As a result, the work load for setting and adjustment can be lightened.

When the irradiation area are adjusted by the projection optical system 415, a method in which the position of the condenser lens 430 is shifted in the optical-axis direction and a method in which the curvature of the lens surface of the projector lens 431 is changed or the projector lens 431 is replaced may be used in combination.

When the light from each one of the multiple surface-emitting laser devices 421 of the surface-emitting laser 420 is extended at a wide angle by the projection optical system 415, an image on the irradiation face P2 is distorted due to the influence of distortion. In other words, the magnifying power of the image varies depending on the irradiation area. In such cases, even when the light is emitted from the entire irradiation area E3 as described above, unevenness in illuminance occurs due to the distortion on the image plane or the difference in region on the irradiation face P2. Such unevenness in illuminance is caused by the aberration of the projection optical system 415 through which the light diverges and is emitted, and may occur in both the reference state as illustrated in FIG. 30A and the adjustment state of the irradiation area as illustrated in FIG. 31A.

The distortion in the present embodiment may be, for example, pincushion distortion in which the area around the center of the image contracts and the area around the outer edges of the image is expanded, and barrel-like distortion in which the area around the center of the image is expanded and the area around the outer edges of the image contracts. In the pincushion distortion, the distortion of the image on the irradiation face P2 increases and is expanded and the illuminance or the radiation intensity of light per each unit of dimension decreases among the multiple surface-emitting laser devices 421 that are arranged around the outer edges on the light-emitting surface P1 of the surface-emitting laser 420. In the barrel-like distortion, the distortion of the image on the irradiation face P2 increases and is expanded and the illuminance or the radiation intensity of light per each unit of dimension decreases among the multiple surface-emitting laser devices 421 that are arranged around the center of the light-emitting surface P1 of the surface-emitting laser 420.

In the light source module 411, the setting of the surface-emitting laser 420 is changed in order to prevent variation in illuminance on the irradiation face P2 due to the aberration of the projection optical system 415. In other words, in the surface-emitting laser 420, the intensity of light emission per each unit of dimension of the light emitting area corresponding to an irradiation area with a relatively large magnifying power of the projection optical system 415 is made larger than the intensity of light emission per each unit of dimension of the light emitting area corresponding to an irradiation area with a relatively small magnifying power of the projection optical system 415. In order to achieve such evenness in illuminance, there are a first mode in which the intervals among the multiple surface-emitting laser devices 421 are changed and a second mode in which the intensity of light emission of the multiple surface-emitting laser devices 421 is made different.

The first mode in which the evenness in illuminance is to be achieved, where the intervals among the multiple surface-emitting laser devices 421 are changed, is described below. The setting in this mode corresponds to a case in which pincushion distortion occurs in an image on the irradiation face P2 as a result of the light that is emitted from the surface-emitting laser 420 is expanded by the projection optical system 415 and is projected at a wide angle.

Figure 32:
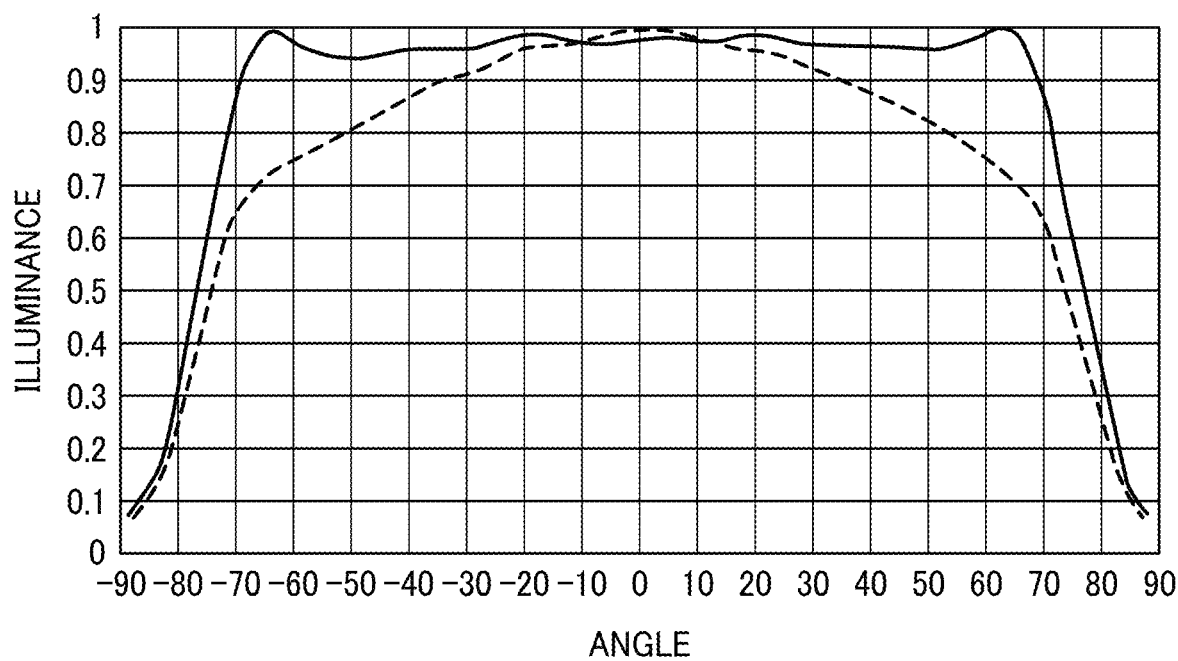
FIG. 32 is a graph illustrating an illuminance distribution on an irradiation face to make a comparison between when multiple light-emitting units of a light source are arranged at even intervals and when the multiple light-emitting units of the light source are arranged with variable density, in the first case according to the present disclosure.

As illustrated in FIG. 32, Tv1 indicates the illumination distribution on the irradiation face P2 when all the surface-emitting laser devices 421 that are adjacent to each other in the surface-emitting laser 420 are arranged at equal intervals. The horizontal axis in the graph of FIG. 32 indicates an angle in the horizontal direction, and the vertical axis in the graph of FIG. 32 indicates the illumination ratio on the irradiation face P2, where the portion with the highest illuminance is assumed to be FIG. 32 is a graph illustrating an illuminance distribution on the irradiation face P2 to make a comparison between when multiple light-emitting units of a light source are arranged at even intervals and when the multiple light-emitting units of the light source are arranged with variable density, in the first case according to the present disclosure.

Figure 33:
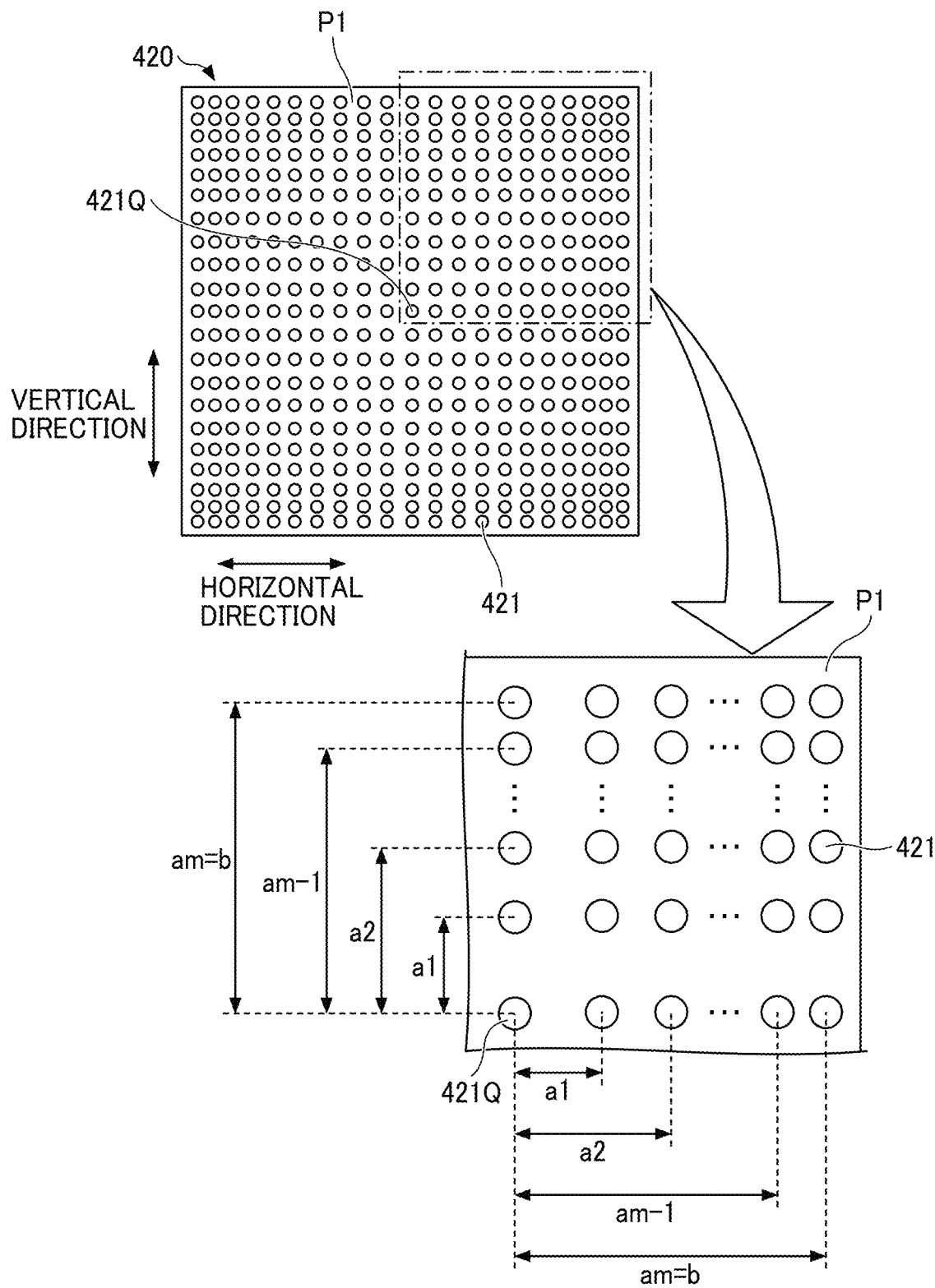
FIG. 33 is a diagram illustrating a plurality of light emitting units that are arranged with variable density in a light source of a light source module, in the first case according to the present disclosure.

FIG. 33 is a diagram illustrating a plurality of light emitting units that are arranged with variable density in the light source of the light source module, in the first case according to the present disclosure.

The illumination distribution Tv1 when the multiple surface-emitting laser devices 421 are evenly arranged has a mountain-like shape in which the intensity is highest at the center of the irradiation area and the intensity decreases toward the outer edges due to the influence of the distortion caused by the projection optical system 415. In this illumination distribution Tv1, the angular range in the horizontal direction that corresponds to 80% of the peak value at which the illuminance is strongest is 106 degrees.

In the first mode according to the preset disclosure, as illustrated in FIG. 33, the surface-emitting laser devices 421 are unevenly arranged in the surface-emitting laser 420, and adjacent ones of the multiple surface-emitting laser devices 421 are arranged at narrower intervals in an area around the outer edges than in an area around the center of the light-emitting surface P1. Due to this configuration, the multiple surface-emitting laser devices 421 are arranged such that the number of surface-emitting laser devices 421 per each unit of dimension increases on the corresponding to light-emitting surface P1 in an area around the outer edges where the image on the irradiation face P2 is expanded at a greater degree and magnifying power and the density in arrangement increases. Accordingly, the degree of evenness in illuminance increases on the irradiation face P2 compared with a case in which the multiple surface-emitting laser devices 421 are arranged at equal intervals.

By way of example, the multiple surface-emitting laser devices 421 are arranged in the light source module 411 as follows. The surface-emitting laser 420 is provided with four-hundred and eleven surface-emitting laser devices 421 in total within the light-emitting surface P1 of square shape whose dimensions in the horizontal direction and the vertical direction are both 1.44 millimeters (mm). More specifically, twenty one surface-emitting laser devices 421 are arranged in each horizontal row and vertical column. With reference to a central surface-emitting laser device 421Q (see FIG. 33) that is in the center both in the horizontal direction and the vertical direction, there are ten surface-emitting laser devices 421 on both sides in the horizontal direction and the vertical direction.

When viewed from the central surface-emitting laser device 421Q, the distance to the closest one of the multiple surface-emitting laser devices 421 is referred to as distance a1, and the distance to the second closes one of the multiple surface-emitting laser devices 421 is referred to as distance a2. Moreover, the distance to the n-th closest one of the multiple surface-emitting laser devices 421 is referred to as distance an, where n denotes a positive integer 1 to m. Assuming that "N=2m+1," where m≥1, denotes the maximum number of multiple surface-emitting laser devices 421 that can be arranged in rows in the horizontal direction and in columns in the vertical direction and b, where "am=b," denotes the maximum range in which the multiple surface-emitting laser devices 421 can be arranged, the distance an satisfies the relation in an equation given below.

$$an = b - \alpha(N - \tfrac{1}{2} - n)\beta$$

In this example, the distance an is 0.7 mm when "N=21," "b=0.7 mm," and "n=10." Under these conditions, the values of constants α and β with which the illuminance on the irradiation plane P2 becomes even are found to be 0.05 and 1.15, respectively, in both the horizontal direction and the vertical direction. In both the horizontal direction and the vertical direction, the distance between the surface-emitting laser devices 421 that are located at the outermost edges of the light-emitting surface P1 and the surface-emitting laser devices 421 that are located inward by one level and closest to those outermost ones has a minimum value at 49.6 micrometers (μm). In both the horizontal direction and the vertical direction, the distance between adjacent ones of the surface-emitting laser devices 421 gradually increases towed the center, and the distance (a1) between the central surface-emitting laser device 4210 and the surface-emitting laser devices 421 that are located outward by one level and closest to the central surface-emitting laser device 421Q has a maximum value at 80.0 μm. In FIG. 32, the illumination distribution Tw1 on the irradiation face P2 when the multiple surface-emitting laser devices 421 are arranged with variable density so as to satisfy the above conditions is illustrated. In the illumination distribution Tw1, compared with the illumination distribution Tv1 in which the multiple surface-emitting laser devices 421 are evenly arranged, the decrease in intensity in the outer edges is improved, and approximately even illuminance is obtained from the center to the outer edges. In the illumination distribution Tw obtained when the multiple surface-emitting laser devices 421 are arranged with variable density, the angular range in the horizontal direction that corresponds to 80% of the peak value at which the illuminance is strongest is 143 degrees. In FIG. 32, the illuminance distribution Tw in the horizontal direction is illustrated. As a result of the arrangement with variable density of the multiple surface-emitting laser devices 421, in a similar manner to the illumination distribution Tw the horizontal direction, the decrease in intensity of the outer edges can be improved also in the illumination distribution Tw in the vertical direction. The above-described conditions and numerical values in the arrangement of the multiple surface-emitting laser devices 421 with variable density are given by way of example, and appropriate conditions and numerical values in the arrangement with variable density differ depending on, for example, the configurations and forms of the light source and the optical system.

An appropriate value for the arrangement of the multiple surface-emitting laser devices 421 with variable density can be calculated and set at the design stage according to the specifications of, for example, the projection optical system 415 and the surface-emitting laser 420. In other words, the aberration in the projection optical system 415 is known at the stage of optical design. Accordingly, the variation in illuminance on the irradiation area, which may be caused by the influence of the aberration, can also be calculated. In an irradiation area of the light-emitting surface P1 of the surface-emitting laser 420, where the image projected onto the irradiation face P2 is widely expanded relative to the other areas and the illuminance per each unit of dimension is low, the density in arrangement of the multiple surface-emitting laser devices 421 is made high on the light-emitting surface P1, and the intervals between adjacent ones of the multiple surface-emitting laser devices 421 are made narrower. By so doing, the intensity of light emission per each unit of dimension increases, and an even illumination distribution can be obtained as desired. If the calculation and design of the arrangement of the multiple surface-emitting laser devices 421 with variable density are performed based on the computer simulation and the optical design of the projection optical system 415, the surface-emitting laser 420 that is optimized for the projection optical system 415 can be produced without the need of time and effort for, for example, measurement and adjustment.

The evenness of illuminance to be achieved by the multiple surface-emitting laser devices 421 that are arranged with variable density can be realized without changing the emission intensity of each one of the multiple surface-emitting laser devices 421 in the surface-emitting laser 420. Accordingly, it is not necessary to perform control for changing the amount of current applied to each one of the multiple surface-emitting laser devices 421. Accordingly, the light source driver 416 that is used to control the current applied to the surface-emitting laser 420 can be downsized. The light source driver 416 in the present case according to the present disclosure corresponds to the drive circuit 120 according to the above embodiments of the present disclosure.

When barrel-like distortion occurs on the image of the irradiation face P2, unlike the embodiment of the present disclosure described with reference to FIG. 33 where pincushion distortion is to be dealt with, the multiple surface-emitting laser devices 421 are arrangement with variable density on the surface-emitting laser 420 such that the intervals between adjacent ones of the multiple surface-emitting laser devices 421 will be narrower in the center of the light-emitting surface P1 rather than in the outer edges.

In the present case according to the present disclosure, the distance between a pair of the multiple surface-emitting laser devices 421 adjacent to each other is made different from each other gradually in each of the horizontal direction and the vertical direction. However, it may be configured so as to includes both a portion where the intervals between adjacent ones of the multiple surface-emitting laser devices 421 are even and a portion where the intervals between adjacent ones of the multiple surface-emitting laser devices 421 differ from one another. For example, the intervals at which the multiple surface-emitting laser devices 421 are arranged may be made even within a predetermined range from the center of the light-emitting surface P1, and the intervals at which the multiple surface-emitting laser devices 421 are arranged may be made different from one another only in the outer edges of the light-emitting surface P1. Alternatively, for example, the intervals at which the multiple surface-emitting laser devices 421 are arranged may be made even within a predetermined range from the outer edges of the light-emitting surface P1, and the intervals at which the multiple surface-emitting laser devices 421 are arranged may be made different from one another only in an area around the center of the light-emitting surface P1. In which region or area of the light-emitting surface P1 and how much distance or interval is set may be selected as desired depending on, for example, the influence of distortion in the projection optical system 415.

Figure 34:
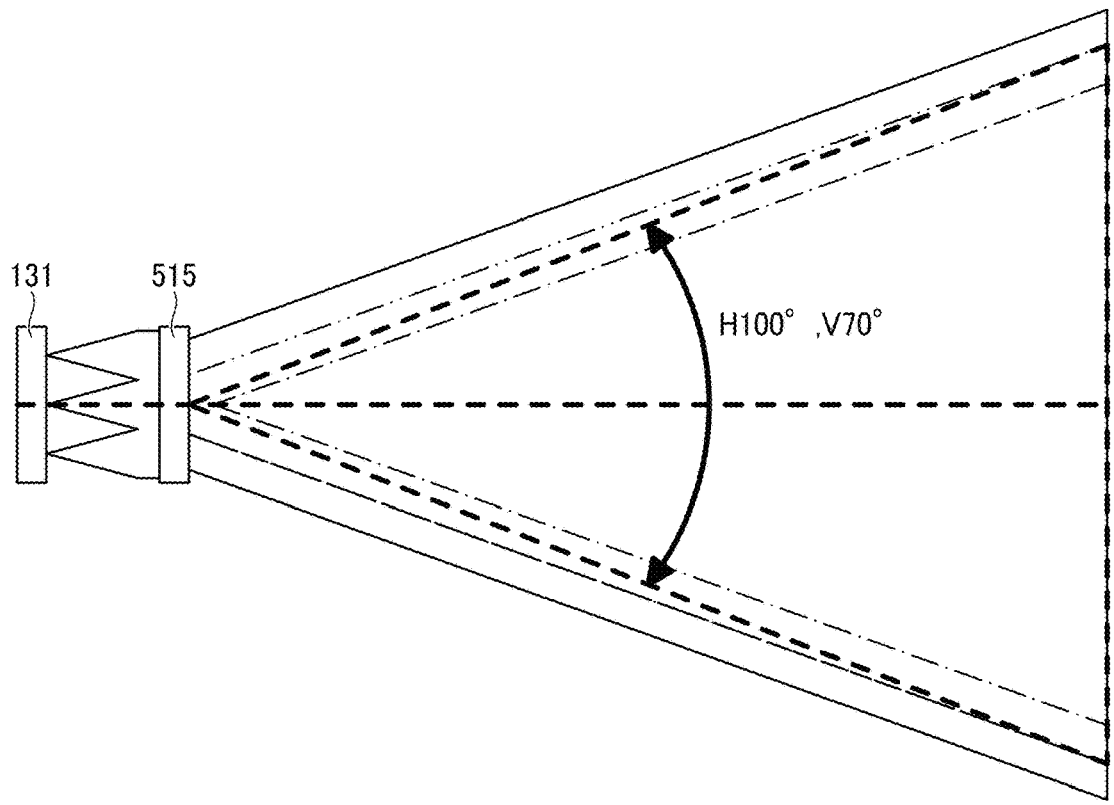
FIG. 34 is a diagram illustrating a projection optical system according to a second case of the present disclosure.

FIG. 34 is a diagram illustrating a projection optical system according to a second case of the present disclosure.

The projection optical system according to the second case of the present disclosure includes a diffractive-optical element (DOE). The DOE is an optical element that diffracts the incident light by a micromachining pattern on the surface of the element and controls the direction of propagation of the light emitted to a desired portion of the irradiation area. In FIG. 34, the DOE 515 is illustrated through which the light L emitted from the laser beam source 131 diverges to 100 degrees in the horizontal direction and 70 degrees in the vertical direction and is projected onto a desired portion of the irradiation area. For example, the width of the laser beam source 131 is approximately 3 millimeters (mm), and the distance between the laser beam source 131 and DOE SIS is approximately 3 mm.

The light L that is emitted from each light-emitting surface of the laser beam source 131 is projected onto a desired portion of the irradiation area as diffraction pattern light. Accordingly, a plurality of diffraction pattern lights that correspond to the number of light emitting points of the VCSEL device 311, the VCSEL device 321, and the VCSEL device 331 are overlapped with each other to form an irradiation area. As a result, an object area can be more evenly irradiated with light.

The projection optical system 132 may be, for example, a diffusing board and a microlens array that can spread the light emitted from the laser beam source 131 and can project the spread light onto a desired irradiation area.

The projection optical system 132 is disposed on, for example, a transparent lid that transmits light. The material of the lid is, for example, glass and resin. The glass according to the present embodiment is, for example, quartz glass or borosilicate glass. Depending on the refractive index of the material, the radius of curvature of a light-concentrating lens and the diffusing diffraction pattern can be designed.

The transparent lid has, for example, a light projecting function by a transmission type diffraction structure for diffusing and projecting the light L of the laser beam source 131 to a desired region, and a light deflecting function by a reflection type diffraction structure for reflecting a part of the light L and guiding the light to the emission-intensity detector 133. The light deflection function may have a diffraction structure formed on a reflector or mirror, or may have a reflective film on the structure formed on a transparent member such as glass.

For example, the patterns are formed on the transparent lid so as to face the laser beam source 131. If the laser beam source 131 has a planar face, the light L emitted from the laser beam source 131 is reflected by the planar face, and some of the light L may return to the laser beam source 131. In such cases, the output power of the laser beam source 131 may be reduced, or the laser beam source 131 may be damaged. When the patterns are formed on the transparent lid so as to face the laser beam source 131, a decrease in output power and damage due to the reflected light can be prevented. Moreover, when the patterns are formed on the transparent lid so as to face the laser beam source 131, contamination and damage on the patterns can be prevented.

The lid including the projection optical system 132 is parallel to, for example, the submount substrate 161, and a gap for obtaining a desired illumination function is arranged between the light-emitting surface of the laser beam source 131 and the lid. The fixation member 162 includes, for example, a spacer. For example, there is an adhesive between the spacer and the submount substrate 161 and there is a spacer between the spacer and the lid.

When the fixation member 162 includes the spacer, the amount of the adhesive included in the fixation member 162 is smaller than that when the spacer is not included. A large amount of adhesive may cause the height of adhesive to vary before solidification due to the surface tension. For this reason, it is desired that the amount of adhesive be small. As the amount of adhesive is smaller, the degree of accuracy of alignment increases. The adhesive is, for example, an ultraviolet curing adhesive or a low-temperature solder. The material of the spacer is, for example, silicon and quartz. Silicon is advantages because the material cost is low and silicon can easily be processed. Quartz has an advantage that it can control the variations in distance between the light-emitting surface of the laser beam source 131 and the lid even when the laser beam source 131 generates heat due to the operation. This is because the difference between the thermal expansion coefficient of quartz and the thermal expansion coefficient of aluminum nitride included in the submount substrate 161 is small.

The spacer may have a shape that matches the outer edges of the submount substrate 161 or the lid, and may have a ventilation slot. When the spacer has a ventilation slot, an increase in the internal pressure of the VCSEL module 160 can be prevented and the distance between the laser beam source 131 and the lid can be easily kept constant even if the laser beam source 131 or the drive circuit 120 generates heat due to the operation.

Seventh Embodiment

A seventh embodiment of the present disclosure is described below. The seventh embodiment of the present disclosure relates to a distance-measuring apparatus including the light source module according to any one of the first to sixth embodiments of the present disclosure.

Figure 35:
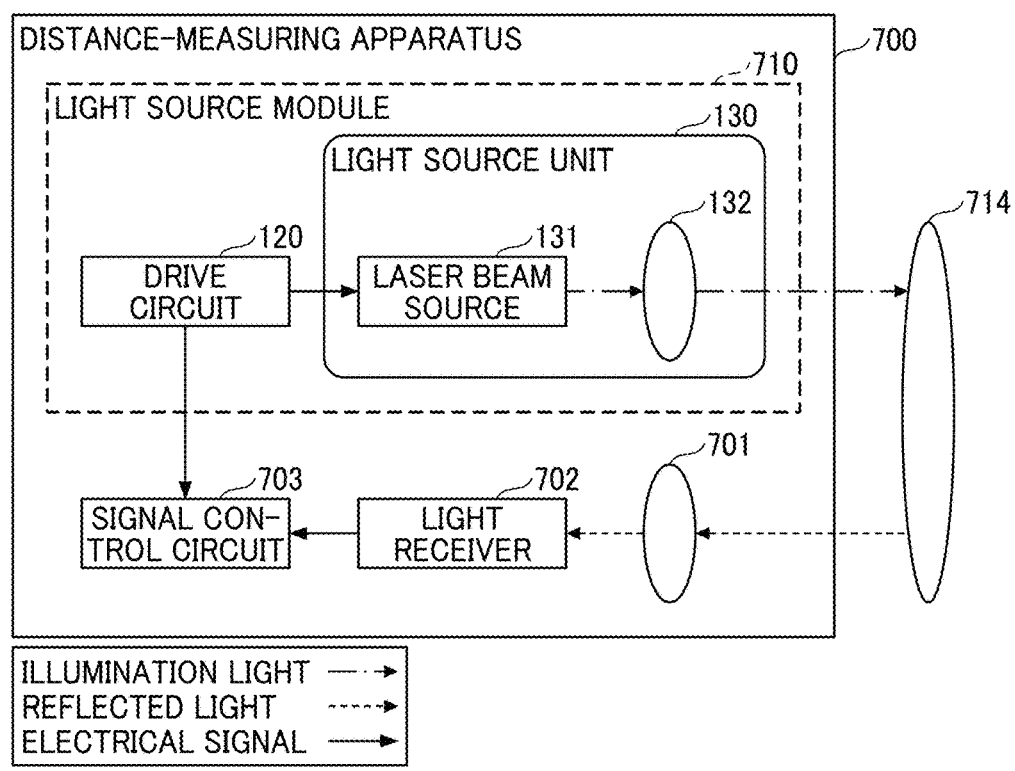
FIG. 35 is a diagram illustrating a configuration of a distance-measuring apparatus according to a seventh embodiment of the present disclosure.

FIG. 35 is a diagram illustrating a configuration of the distance-measuring apparatus 700 according to the seventh embodiment of the present disclosure.

In FIG. 35, each arrow with a solid line indicates a flow of an electrical signal, and each arrow with a broken line indicates a path of the reflected light. Moreover, each arrow with a dot-and-dash line indicates an optical path of the illumination light.

As illustrated in FIG. 35, the distance-measuring apparatus 700 includes a light source module 710, a light-receptive optical system 701, a light receiver 702, and a signal control circuit 703. The light source module 710 according to the present embodiment serves as the light source module according to any one of the first to sixth embodiments. In the present embodiment described with reference to FIG. 35, the light source module 710 includes the entirety of the drive circuit 120 and the light source unit 130. The power supply circuit 110 and the controller 140 are omitted.

The distance-measuring apparatus 700 according to the present embodiment is a distance-measuring apparatus that adopts a TOF method. The distance-measuring apparatus 700 irradiates a to-be-detected object 714 with the laser beam (pulsed light) emitted from the light source unit 130 of the light source module 710, and uses the light receiver 702 to receive the light reflected from the to-be-detected object 714. By so doing, the distance to the to-be-detected object 714 can be measured based on the length of time taken to receive the reflected light.

When the laser beam source 131 is controlled to emit light, the drive circuit 120 of the light source module 710 sends a flash signal to the signal control circuit 703.

The light that is emitted from the light source unit 130 and then reflected by the to-be-detected object 714 is guided to the light receiver 702 through the light-receptive optical system 701 that has a light-concentrating function. The light receiver 702 according to the present embodiment includes a photoelectric conversion element, and performs photoelectric conversion on the received light. By so doing, a light signal is generated, and the generated light signal is sent to the signal control circuit 703.

The signal control circuit 703 according to the present embodiment calculates the distance to the to-be-detected object 714 based on the time difference between the light projection timing and the light reception timing. The light projection timing is a timing at which a flash signal is input from the drive circuit 120, and the light reception timing is a timing at which a light signal is input from the light receiver 702.

As the distance-measuring apparatus 700 configured as described above includes the light source module 710, the stability and accuracy of distance measurement can be enhanced.

A detection device 800 that adopts the distance-measuring apparatus 700 according to the above embodiment of the present disclosure for various types of electronic devices is described below with reference to FIG. 36 to FIG. 40. In the detection device 800, the signal control circuit 703 of the distance-measuring apparatus 700 as illustrated in FIG. 35 is replaced with a plurality of functional blocks as will be described later in detail, and the other basic configuration is common to that of the distance-measuring apparatus 700. In the detection device 800, the light receiver 702 illustrated in FIG. 35 is a detection unit that detects light emitted from the light source module 710 and reflected by the to-be-detected object 714. In FIG. 36 to FIG. 40, for the sake of explanatory convenience in the drawings, the functional blocks of, for example, a determining unit provided for the detection device 800 are described outside the detection device 800.

Figure 36:
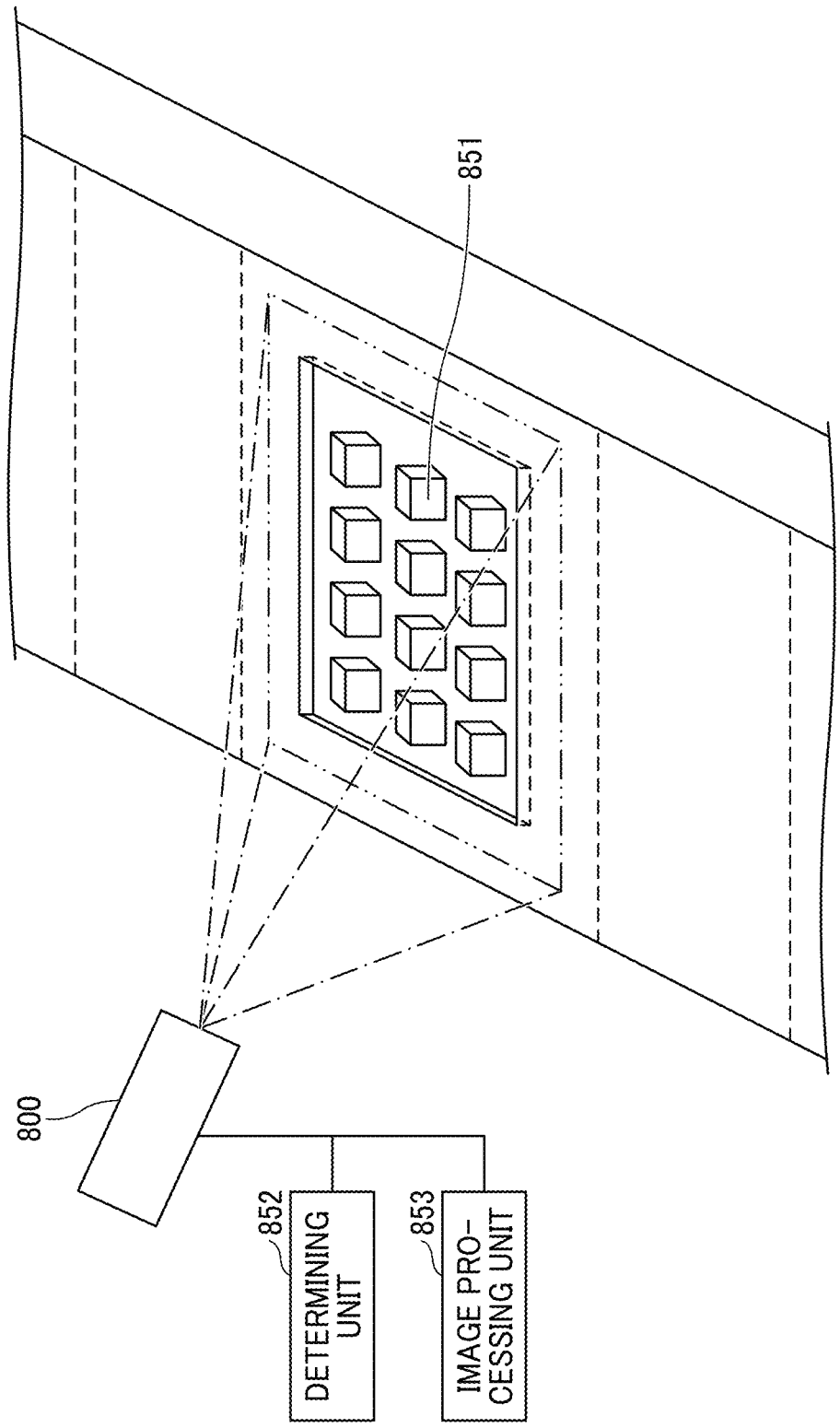
FIG. 36 is a diagram illustrating a case in which a light source module according to an embodiment of the present disclosure is applied to a detection device used to inspect an item.

FIG. 36 is a diagram illustrating a case in which the detection device 800 using the distance-measuring apparatus 700 according to the seventh embodiment of the present disclosure is applied to the inspection of items in factory or the like.

The light that is emitted from the light source module 710 of the detection device 800 is projected to an irradiation area that covers a plurality of items 851, and the reflected light is received by the light receiver 702 that serves as a detector. A determining unit 852 determines, for example, the state of each one of the multiple items 851 based on the information detected by the detector. More specifically, the image processing unit 853 generates image data based on the electrical signal obtained as a result of photoelectric conversion performed by the light receiver 702, and the determining unit 852 determines the state of each one of the multiple items 851 based on the obtained image data. The generated image data indicates the irradiation area of the light emitted from the light source module 710. In other words, the light-receptive optical system 701 and the light receiver 702 in the detection device 800 function as an imaging unit that images the projection region of light from the light source module 710. The determining unit 852 may adopt any known method of image analysis such as pattern matching to determine, for example, the state of each one of the multiple items 851 based on the captured image data.

In the applied case as illustrated in FIG. 36, the light source module 710 of the detection device 800 that can irradiate the irradiation area with light with even illuminance. Due to such a configuration, the variation in illuminance can be reduced even when light is emitted at a wide angle. As a result, a larger number of items 851 can be inspected at the same time with high accuracy, and the work efficiency of inspection is improved. As the detection device 800 that performs detection using the TOF method, not only the front side of each one of the multiple items 851 that faces the detection device 800 but also the information about each one of the multiple items 851 in the depth direction can be obtained. For this reason, compared with the visual inspection using a imaging device known in the art, it is easy to identify, for example, small scratches, chipping or other sorts of damage, defects, and a three-dimensional shape of the item 851, and the accuracy of inspection can be improved. As the irradiation area including the item 851 to be inspected is irradiated with the light emitted from the light source module 710 of the detection device 800, the detection device 800 can be used under dark environments.

Figure 37:
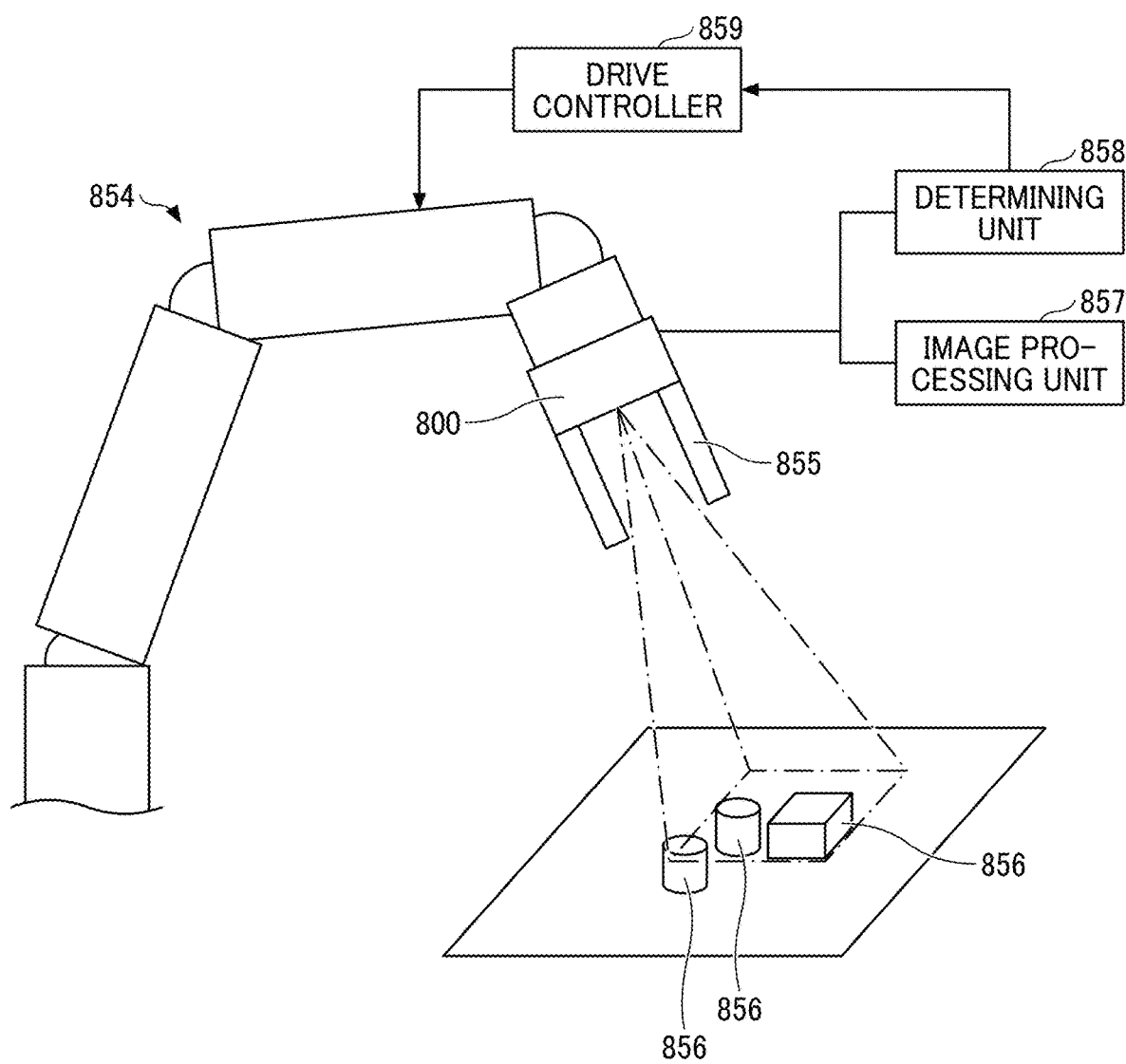
FIG. 37 is a diagram illustrating a case in which a detection device having a light source module according to an embodiment of the present disclosure is applied to moving equipment.

FIG. 37 is a diagram illustrating a case in which the above detection device 800 is applied to the controlling the operation of moving equipment.

An articulated arm 854 that is moving equipment has a plurality of arms connected by bendable joints, and has a hand unit 855 at the leading end. The articulated arm 854 is used in, for example, an assembly line of a factory, and holds one or a plurality of objects 856 using the hand unit 855 when inspecting, carrying, or assembling those objects 856.

The detection device 800 is mounted near the hand unit 855 of the articulated arm 854. The detection device 800 is arranged so that the light-projecting direction matches the direction in which the hand unit 855 faces, is configured to detect the object 856 and its peripheral areas. The light receiver 702 according to the present embodiment receives the reflected light from the irradiation area including the object 856. The image processing unit 857 according to the present embodiment generates image data. The determining unit 858 determines various kinds of information related to the object 856 based on the obtained image data. The information that is to be detected by the detection device 800 is, for example, the distance to the object 856, the shape of the object 856, the position or location of the object 856, and the relative positions of a plurality of objects when there are a plurality of objects 856. Based on the result of the determination made by the determining unit 858, the drive controller 859 controls the operations of the articulated arm 854 and the hand unit 855 to, for example, grip and move the object 856.

In the applied case as illustrated in FIG. 37, in regard to the detection of the object 856 by the detection device 800, advantageous effects similar to those achieved by the detection device 800 as illustrated in FIG. 36 can be achieved. In other words, the accuracy of detection can be improved. Moreover, as the detection device 800 is provided with the articulated arm 854, the object 856 that is to be held can be detected from a short distance. More specifically, as the detection device 800 is attached to a portion of the articulated arm 854 near the hand unit 855, the object 856 that is to be held can be detected from a short distance. For this reason, the accuracy of detection and recognition accuracy can be improved compared with detection from a distance by an imaging device disposed at a position apart from the articulated arm 854.

Figure 38:
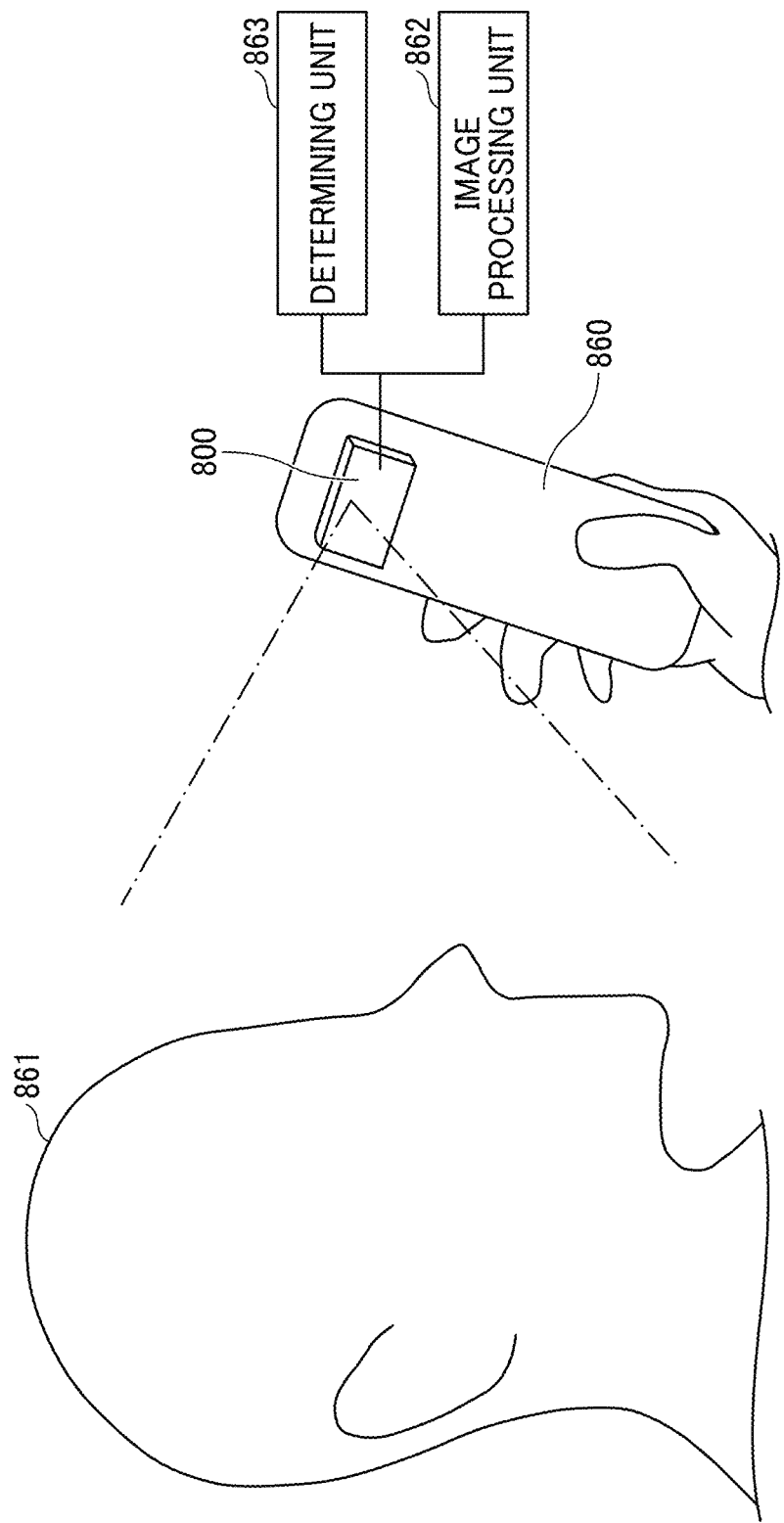
FIG. 38 is a diagram illustrating a case in which a detection device including a light source module according to an embodiment of the present disclosure is applied to a mobile information terminal.

FIG. 38 is a diagram illustrating a case in which the detection device including the light source module according to the above embodiments of the present disclosure is applied to the user authentication performed on an electronic device such as a mobile information terminal.

The mobile information terminal 860 that serves as an electronic device has a function to authenticate a user. Such a function to authenticate a use may be configured by dedicated hardware such as an ASIC, or may be functionally implemented by a control program that is executed by a central processing unit (CPU) that controls the mobile information terminal 860.

When user authentication is performed, light is projected from the light source module 710 of the detection device 800 mounted on the mobile information terminal 860 toward a user 861 who uses the mobile information terminal 860. The light that is reflected by the user 861 and its surrounding area is received by the light receiver 702 of the detection device 800, and the image processing unit 862 generates image data. A determining unit 863 in the present case according to the present disclosure determines the degree of match between the image data of the user 861 generated by the image processing unit 862 and the user information registered in advance, to determine whether the user is a registered user. For example, the determining unit 863 can measure, for example, the shape, edges, contour, and bumps and dips of the face, ears, and head of the user 861, and can use the obtained data as the user information.

In the applied case as illustrated in FIG. 38, in regard to the detection of the user 861 by the detection device 800, advantageous effects similar to those achieved by the detection device 800 as illustrated in FIG. 36 can be achieved. In other words, the accuracy of detection can be improved. In particular, as the light source module 710 emits light with even illuminance at a wide angle to detect the information about the user 861 in wide areas, the amount of information used to recognize the user increases compared with a case in which the detection field is narrow. As a result, the accuracy of detection can be improved.

FIG. 38 illustrates a case in which the detection device 800 according to the above applied case is provided for the mobile information terminal 860. However, no limitation is indicated thereby, and user authentication using the detection device 800 is applicable to, for example, a stationary desktop personal computer (PC), an office automation (OA) apparatus such as a printer, and a security system for a building. In terms of function, the user authentication using the detection device 800 can be used not only for a personal authentication function but also for the scanning of a three-dimensional shape such as a face. Also in this case according to the present disclosure, highly accurate scanning can be realized by mounting the detection device 800 that involves the light source module 710 according to the seventh embodiment of the present disclosure and can emit and project light with even illuminance at a wide angle.

Figure 39:
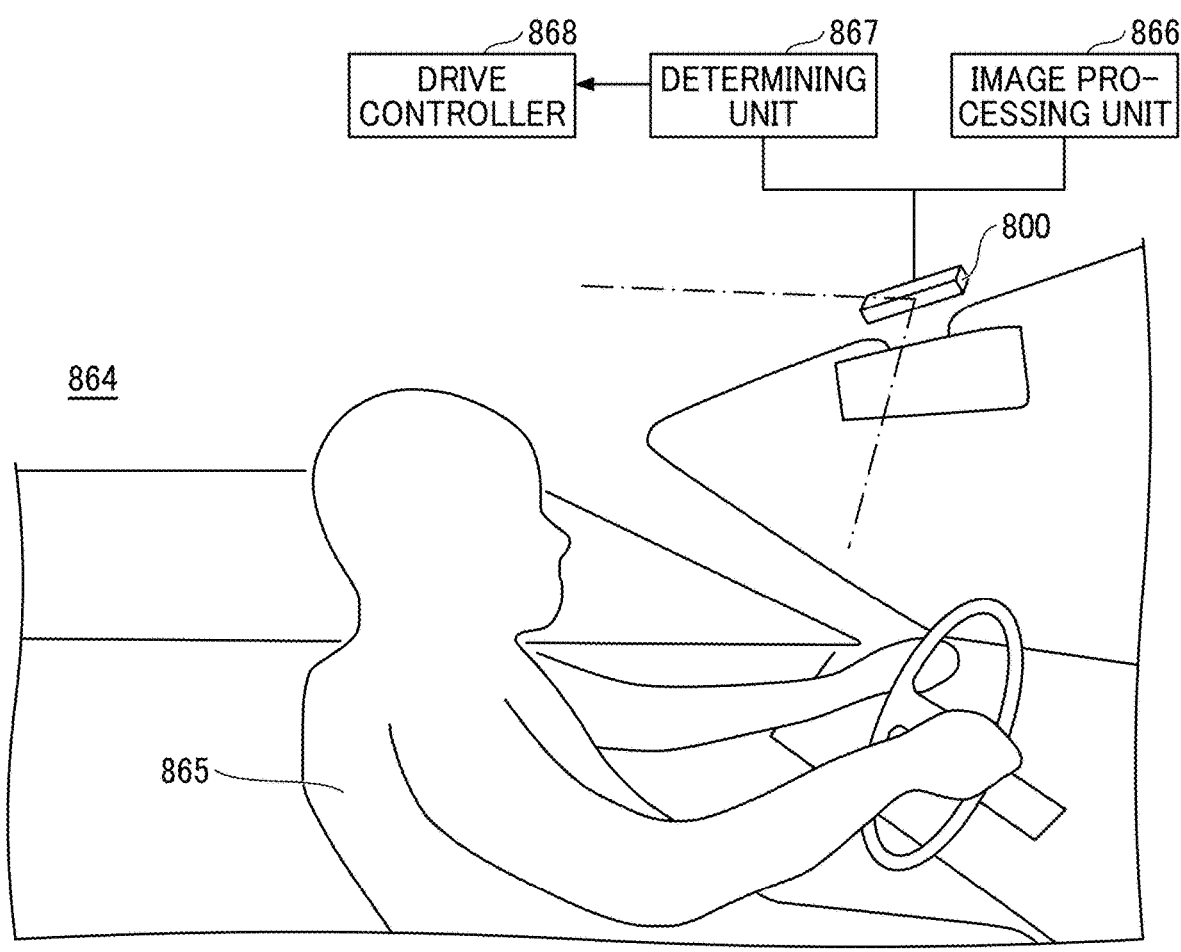
FIG. 39 is a diagram illustrating a case in which a detection device including a light source module according to an embodiment of the present disclosure is applied to a driver-assistance system for a mobile object.

FIG. 39 is a diagram illustrating a case in which the detection device 800 including the light source module according to the above embodiments of the present disclosure is applied to a driver-assistance system of a mobile object such as a car.

The motor vehicle 864 has a driving support function capable of automatically performing a part of driving operations such as deceleration and steering. The driver-assistance function may be configured by dedicated hardware such as an ASIC, or may be implemented by a control program that is stored in a read only memory (ROM) or the like and is executed by an electronic control unit (ECU) that controls an electrical system of the motor vehicle 864.

Light is projected toward a driver 865 who drives the motor vehicle 864 from the light source module 710 of the detection device 800 installed inside the motor vehicle 864. The light that is reflected by the driver 865 and its surrounding area is received by the light receiver 702 of the detection device 800, and the image processing unit 866 generates image data. The determining unit 867 makes a determination on the information about, for example, the face, the facial expressions, and the posture of the driver 865, based on the image data of the driver 865 generated by the image processing unit 866. Based on the result of the determination made by the determining unit 867, the drive controller 868 controls the brake and the steering wheel, and perform driver assistance appropriately depending on the situation or conditions of the driver 865. For example, the drive controller 868 can perform control such as automatic deceleration and automatic stop when inattentive driving and drowsy driver are detected.

In the applied case as illustrated in FIG. 39, in regard to the detection of the state of the driver 865 by the detection device 800, advantageous effects similar to those achieved by the detection device 800 as illustrated in FIG. 36 can be achieved. In other words, the accuracy of detection can be improved. In particular, as the light source module 710 can emit and project light with even illuminance at a wide angle to detect the information about the driver 865 in wide areas, the amount of obtained information increases compared with a case in which the detection field is narrow. As a result, the accuracy of driver assistance can be improved.

FIG. 39 illustrates a case in which the detection device 800 according to the above applied case is provided for the motor vehicle 864. However, no limitation is indicated thereby, and the detection device 800 may be applied to a mobile object other than the motor vehicle, such as an electric train and an aircraft. In addition to the detection of the face and posture of the driver or operator of the mobile object, the object of the detection may be, for example, the state or conditions of passengers in the passenger seats and the state or conditions inside the vehicle other than the passenger seats. In terms of function, in a similar manner to the applied case as illustrated in FIG. 38, the detection device 800 can also be used for personal authentication of the driver. For example, the driver 865 is detected using the detection device 800, and only when the detected driver matches the driver information registered in advance, the driver is allowed to start the engine or to lock or unlock of the door lock.

FIG. 40 is a diagram illustrating a case in which the detection device 800 including the light source module according to the above embodiments of the present disclosure is applied to an autonomous traveling system of the mobile object 870.

Unlike the applied case as illustrated in FIG. 39, the detection device 800 is used to perform sensing on an object outside the mobile object 870 in the applied case as illustrated in FIG. 40. The mobile object 870 is an autonomously traveling mobile object that can automatically travel while recognizing an external situation.

The detection device 800 is mounted on mobile object 870, and the detection device 800 emits light in the directions of travel of the mobile object 870 or toward the peripheral area. In a room 871 which is the moving area of the mobile object 870, a desk 872 is placed in the directions of travel of the mobile object 870. Among the lights projected from the light source module 710 of the detection device 800 mounted on the mobile object 870, the light that is reflected by the desk 872 and its surroundings is received by the light receiver 702 of the detection device 800, and an electrical signal that is obtained as a result of photoelectric conversion is sent to a signal processor 873. The signal processor 873 computes and obtains the information about the layout of the room 871, such as the distance to the desk 872, the position of the desk 872, and the situation or conditions around the desk 872, based on the electrical signal or the like sent from the light receiver 702. The determining unit 874 determines, for example, the route of travel and the moving speed of the mobile object 870, and based on the computed and obtained information, and the drive controller 875 controls the traveling of the mobile object 870 based on the result of the determination made by the determining unit 874. The drive controller 875 controls, for example, the operation of a motor that serves as a driving source.

In the applied case as illustrated in FIG. 40, in regard to the detection of the layout of the room 871 by the detection device 800, advantageous effects similar to those achieved by the detection device 800 as illustrated in FIG. 36 can be achieved. In other words, the accuracy of detection can be improved. In particular, as the light source module 710 can emit and project light with even illuminance at a wide angle to detect the information about the room 871 in wide areas, the amount of obtained information increases compared with a case in which the detection field is narrow. As a result, the accuracy of the autonomous traveling of the mobile object 870 can be improved.

FIG. 40 illustrates an applied case in which the detection device 800 is attached to the mobile object 870 that autonomously travels in the room 871. However, no limitation is indicated thereby, and the detection device 800 may be applied to an autonomously traveling vehicle that travels outdoors, that is, a so-called self-driving vehicle. Alternatively, the detection device 800 may be applied to a driver-assistance system of a mobile object such as a car to be driven by a driver instead of an autonomously traveling vehicle. In such cases, the situation or conditions around the mobile object are detected using the detection device 800, and the driving of the driver can be supported or assisted according to the detected situation or conditions around the mobile object.

The light source module of the present disclosure can be used as an excitation light source of a solid-state laser in addition to the light source of the distance-measuring apparatus. Moreover, the surface-emitting laser module according to the embodiments or their modifications of the present disclosure may be used as a light-source device such as a projector, in combination with an optical element that converts the wavelength of the light exiting from a surface-emitting laser module such as a fluorescent material. Further, the surface-emitting laser module may be used as a light source device for sensing in combination with an optical element that diverges or converges the light emitted from the surface-emitting laser module such as a lens, a mirror, and a diffraction grating.

Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A light source module, comprising:
    a first substrate comprising a plurality of conductive layers and an insulating layer disposed among the plurality of conductive layers, wherein at least one of the plurality of conductive layers forms a common ground plane;
    a light source to emit light, the light source disposed on the first substrate and the light source having a first terminal and a second terminal;
    a field-effect transistor disposed on the first substrate, the field-effect transistor having a third terminal and a fourth terminal; and
    a charge storage unit disposed on the first substrate, the charge storage unit having a fifth terminal and a sixth terminal,
    wherein the first terminal and the sixth terminal are coupled to each other,
    wherein the second terminal and the third terminal are coupled to each other, and
    wherein the fourth terminal and the fifth terminal are coupled to each other via the common ground plane.

2. The light source module according to claim 1, further comprising a second substrate having a thermal conductivity higher than that of the first substrate,
wherein the first substrate is disposed above the second substrate.

3. The light source module according to claim 1, wherein the light source is located between the field-effect transistor and the charge storage unit in plan view.

4. The light source module according to claim 1,
wherein the charge storage unit and the field-effect transistor are disposed in a first direction with reference to the light source, and
wherein the charge storage unit and the field-effect transistor are disposed in a second direction perpendicular to the first direction.

5. The light source module according to claim 1, wherein the light source comprises:
    a third substrate; and
    a plurality of surface-emitting laser devices disposed on one side of the third substrate and configured to emit light through the third substrate.

6. The light source module according to claim 5,
wherein the plurality of surface-emitting laser devices have sides that do not face the third substrate, and
wherein the sides of the plurality of surface-emitting laser devices that do not face the third substrate are bonded to the first substrate.

7. The light source module according to claim 5,
wherein the light source comprises a plurality of sub-arrays electrically connected in series between the first terminal and the second terminal,
wherein each one of the plurality of surface-emitting laser devices belongs to one of the plurality of sub-arrays, and
wherein the plurality of surface-emitting laser devices are coupled to each other in parallel in the sub-arrays.

8. The light source module according to claim 1, wherein the first substrate comprises aluminum nitride.

9. The light source module according to claim 1, wherein the insulating layer is an aluminum nitride layer.

10. The light source module according to claim 1, further comprising a projection optical system on which the light emitted from the light source is incident.

11. The light source module according to claim 10, wherein the projection optical system is configured to deflect some of the light by at least one of diffraction, diffusion, and refraction.

12. The light source module according to claim 11, further comprising
    an emission-intensity detector configured to receive the light deflected by the projection optical system,
    wherein the field-effect transistor is disposed between the light source and the emission-intensity detector.

13. The light source module according to claim 12, wherein the projection optical system overlaps with the light source, the field-effect transistor, and the emission-intensity detector.

14. The light source module according to claim 10, wherein intensity of light emission per each unit of dimension of a light emitting area of the light source corresponding to an irradiation area with a relatively large magnifying power of the projection optical system is made larger than intensity of light emission per each unit of dimension of the light emitting area of the light source corresponding to an irradiation area with a relatively small magnifying power of the projection optical system.

15. A distance-measuring apparatus, comprising:
    a light source module including:

a first substrate comprising a plurality of conductive layers and an insulating layer disposed among the plurality of conductive layers, wherein at least one of the plurality of conductive layers forms a common ground plane;

a light source to emit light, the light source disposed on the first substrate and the light source having a first terminal and a second terminal;

a field-effect transistor disposed on the first substrate, the field-effect transistor having a third terminal and a fourth terminal; and a charge storage unit disposed on the first substrate, the charge storage unit having a fifth terminal and a sixth terminal, wherein the first terminal and the sixth terminal are coupled to each other, wherein the second terminal and the third terminal are coupled to each other, and wherein the fourth terminal and the fifth terminal are coupled to each other via the common ground plane.

16. A mobile object comprising a distance-measuring apparatus including a light source module, the light source module including:

a first substrate comprising a plurality of conductive layers and an insulating layer disposed among the plurality of conductive layers, wherein at least one of the plurality of conductive layers forms a common ground plane;

a light source to emit light, the light source disposed on the first substrate and the light source having a first terminal and a second terminal;

a field-effect transistor disposed on the first substrate, the field-effect transistor having a third terminal and a fourth terminal; and a charge storage unit disposed on the first substrate, the charge storage unit having a fifth terminal and a sixth terminal, wherein the first terminal and the sixth terminal are coupled to each other, wherein the second terminal and the third terminal are coupled to each other, and wherein the fourth terminal and the fifth terminal are coupled to each other via the common ground plane.

17. The light source module according to claim 1, wherein the fourth terminal and the fifth terminal are coupled to each other at the plurality of conductive layers.

* * * * *